(12) United States Patent
Hertel et al.

(10) Patent No.: US 9,361,606 B2
(45) Date of Patent: Jun. 7, 2016

(54) DISPENSING DIGITAL OBJECTS TO AN ELECTRONIC WALLET

(75) Inventors: Philipp Frank Hermann Udo Hertel, San Francisco, CA (US); Alexander Wolfgang Karl Kurt Hertel, Sunnyvale, CA (US); John David Trevor Graham, Victoria (CA); Mark Braverman, Toronto (CA)

(73) Assignee: GOOGLE INC., Mountain View, CA (US)

( * ) Notice: Subject to any disclaimer, the term of this patent is extended or adjusted under 35 U.S.C. 154(b) by 512 days.

(21) Appl. No.: 13/032,422

(22) Filed: Feb. 22, 2011

(65) Prior Publication Data

US 2011/0145049 A1 Jun. 16, 2011

Related U.S. Application Data

(63) Continuation of application No. 12/467,991, filed on May 18, 2009.

(60) Provisional application No. 61/054,162, filed on May 18, 2008, provisional application No. 61/122,240, filed on Dec. 12, 2008.

(51) Int. Cl.
*G06Q 20/02* (2012.01)
*G06Q 20/04* (2012.01)
(Continued)

(52) U.S. Cl.
CPC .............. *G06Q 20/02* (2013.01); *G06Q 20/04* (2013.01); *G06Q 20/10* (2013.01); *G06Q 20/105* (2013.01); *G06Q 30/02* (2013.01); *G06Q 30/0222* (2013.01); *G06Q 30/0275* (2013.01)

(58) Field of Classification Search
USPC ........................................................ 370/338
See application file for complete search history.

(56) References Cited

U.S. PATENT DOCUMENTS 6,141,653 A 10/2000 Conklin et al.
6,260,024 B1 7/2001 Shkedy
(Continued)

FOREIGN PATENT DOCUMENTS

WO    WO 2007/062185 A2    5/2007

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.
(Continued)

*Primary Examiner* — Tsan-Yu J Huang
(74) *Attorney, Agent, or Firm* — Johnson, Marcou & Isaacs, LLC

(57) ABSTRACT

A configuration system and method is disclosed that includes a unified and integrated configuration that is composed of a payment system, an advertising system, and an identity management system such that the unified system has all of the benefits of the individual systems as well as several additional synergistic benefits. Also described are specific configurations including the system's access point architecture, visual wallet simulator user interface, security architecture, coupon handling as well as the system's structure and means for delivering them as targeted advertising, business card handling, membership card handling for the purposes of login management, receipt handling, and the editors and grammars provided for customizing the different types of objects in the system as well as the creation of new custom objects with custom behaviors. The configurations are operable on-line as well as through physical presence transactions.

39 Claims, 38 Drawing Sheets

(51) Int. Cl.
*G06Q 20/10* (2012.01)
*G06Q 30/02* (2012.01)

(56) References Cited

U.S. PATENT DOCUMENTS

| | | | |
|---|---|---|---|
| 6,754,636 | B1 | 6/2004 | Walker et al. |
| 6,920,319 | B2* | 7/2005 | Knutsson et al. ......... 455/422.1 |
| 2001/0037294 | A1 | 11/2001 | Freishtat |
| 2001/0043148 | A1* | 11/2001 | Stewart ........................ 340/988 |
| 2002/0059196 | A1* | 5/2002 | I'Anson et al. ................... 707/3 |
| 2002/0099665 | A1* | 7/2002 | Burger et al. ................... 705/67 |
| 2002/0178074 | A1 | 11/2002 | Bloom |
| 2003/0050776 | A1* | 3/2003 | Blair ............................ 704/235 |
| 2005/0267804 | A1* | 12/2005 | Lonsbury et al. ............... 705/14 |
| 2006/0180664 | A1* | 8/2006 | Barrett et al. ................. 235/383 |
| 2006/0236258 | A1* | 10/2006 | Othmer et al. ................ 715/774 |
| 2007/0168266 | A1* | 7/2007 | Questembert ................... 705/35 |
| 2008/0098082 | A1* | 4/2008 | Chang et al. .................. 709/217 |
| 2008/0225810 | A1* | 9/2008 | Buchwald et al. ............ 370/338 |

OTHER PUBLICATIONS

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>, <http://shopatron.ooi.net/checkout1.phtml>; <http://shopatron.ooi.net/checkout3.phtml?multi=>; <http://shopatron.ooi .netlcheckout4.phtml>.

Patent Examination Report No. 1 for Australian Patent Application No. 2009249272, Sep. 3, 2013, 3 Pages.

Office Action for Canadian Patent Application No. CA 2,728,136, Feb. 22, 2013, 3 Pages.

* cited by examiner

Transaction life cycle — reversed
information flow

Transaction life cycle - reversed flow with signed transaction details

Transaction life cycle - buyer's public ID initiates transaction

Transaction life cycle - seller sends transaction details to buyer

Local drag and drop between programs causes instructions to be sent to remote server Payment receptacle displayed in conjunction with electronic wallet Local drag and drop of credit card image instructs transaction authority to apply credit card to a transaction Local drag and drop of debit image instructs transaction authority to apply a debit to an account held on behalf of the user Multiple local drags and drops instruct transaction authority to apply multiple forms of payment to an online transaction Local drag and drop of address card image instructs transaction authority to apply a shipping address to an online transaction Accessing business card data Linking data sources to business card editor Creating a business card definition Local drag and drop of business card shares card with recipient Sharing a business card with a social network contact by making a selection within the electronic wallet Transaction on a mobile device in a physical store Manual input of transaction code to initiate a transaction Initiating an online transaction Splitting a transaction between multiple buyers using mobile devices Choosing items in a split transaction Coupon setup in a webpage when no user context information is available Coupon setup on a cell phone wallet when the user requests a coupon Coupon setup on a cell phone wallet when the user inputs a coupon code Local drag and drop of coupon between programs causes instructions to be sent to a remote coupon authority Local drag and drop of a coupon image instructs the transaction authority to apply the coupon to a transaction Manual input of access point ID Local drag and drop of member ship card image causes a log in to a website

DISPENSING DIGITAL OBJECTS TO AN ELECTRONIC WALLET

CROSS REFERENCE

This application is a continuation of U.S. application Ser. No. 12/467,991 filed on May 18, 2009, which claims the benefit of U.S. Provisional Application No. 61/054,162, filed May 18, 2008, and U.S. Provisional Application No. 61/122,240, filed Dec. 12, 2008, each of which is hereby incorporated by reference herein.

BACKGROUND

1. Field of Art

The disclosure relates to electronic transaction systems such as electronic commerce systems.

2. Description of the Related Art

Online payment platforms can generally be categorized into two types of systems: account-based and token-based. Account-based systems generally include a web-based interface that leads to one or several account management and transaction processing servers which have access to potentially numerous financial accounts. A seller transfers a transaction to the account-based system in order to handle the payment. Upon transfer, a buyer logs into the account-based system and commits the payment with the press of a button. Known account-based systems include PAYPAL, GOOGLE CHECKOUT, MONEYBOOKERS and BIDPAY. Token-based systems are the other major type of online payment platform. Token-based systems utilize tokens, which are typically implemented as files, which carry actual value. Payment for a good or service with a token-based system is accomplished with the electronic transfer of a token, from the purchaser to the seller. The appeal of the token-based systems is that during a transaction, a user feels as if the user is moving value rather than just hitting a button.

A drawback of current account-based systems is that the user interfaces are unnatural; the button-press payment method does not closely model a customary, in-person transaction so the user is immediately unfamiliar with the transaction process; there are also a wide range of different button-press systems so the user must learn to navigate each one separately. Another drawback of current account-based systems is that their user interfaces are not sufficiently rich in features to allow the wide range of information they require (such as login information, credentials, shipping information, coupons, subscription information, and different payment instruments) to be easily inputted by the user through a small number of mouse clicks or screen touches. Another drawback is that classic account-based systems are limited in terms of security because they are, in general, very limited in how they can interact with a user's computer hardware, so they are largely dependent upon web browsers which are well known to be vulnerable to a wide range of types of malicious attacks. Another drawback is that account based systems do not allow a user to perform much customization because these systems are web-based and therefore controlled by the payment system operator.

Drawbacks of token-based systems are their security risks. For example, token-based systems are generally divorced from their modes of transfer. The tokens are simply files which can be sent to other users electronically. Tokens can therefore be intercepted before they reach their true destination. Furthermore, tokens can be copied and fraudulently double-spent. Mitigating these problems requires awkward software for issuing, verifying and removing tokens after use, making the payment process quite cumbersome. Token-based systems also generally suffer from the same usability problems of account-based systems, because they do not provide users with the ability to easily convey the large amounts of information to complete even ordinary transactions: credentials, shipping information, coupons, subscription information, different payment instruments, and the like.

In addition electronic payment systems today lack intuitive interactive features that allow for quick and easy transaction initiation and completions, and are therefore not capable of handling micropayments. Further, such interfaces are devoid of a look and feel that can be easily translated from the familiar tangible transaction tools such as hard currency, debit cards, credit cards and business cards.

Another major drawback of current online payment systems involves their lack of integration with the real world. Other than credit cards, there are few means of paying which can be used in both the online and real-world setting.

In terms of advertising, once again there is very little cross-pollination between the online and real-world setting. Online advertising is dominated by companies such as GOOGLE as well as a host of smaller 'banner ad' providers. One major problem facing these advertisers is that most users have been trained to ignore their ads. One potential way of solving this problem is to offer users a quid pro quo for viewing advertising such as coupons, and several coupon systems have been proposed, but the market has resisted the wide-scale adoption of coupons as an effective means of advertising online. This is partly due to the clumsy user interface commonly found in these systems, such as coupon codes which need to be typed in, and coupons which must be printed in order to be redeemed, and partly due to the fact that most of these systems are independent from any payment system, so any checkout process involving them would require two transactions—one to receive the coupon's discount, and the second to pay for the remainder of the transaction. A separate problem facing this area is that of stigma; many people do not wish to be seen as cheapskates, and therefore avoid the use of coupons.

Another major problem facing advertisers both online and in the real world is that of targeting. Advertising is typically targeted demographically in order to appeal to the audience of a television show, radio station, or web page. The limitation of this approach is that even within such a demographic, people's tastes vary widely, prompting efforts to develop customized or 'targeted' advertising aimed at individuals. However, the inability of advertisers to gain sufficient personal information about users and to then translate that knowledge into effective automated advertising has hampered these efforts.

In terms of identity management and universal login, the online market has seen remarkably little progress. Several social networking websites such as FACEBOOK and MYSPACE have allowed users to enter some of their personal information online so that it can be shared with friends, but these sites have largely failed to provide a universal means of identity management which is compatible with commercial needs such as subscription administration. Furthermore, the problem of developing a viable universal login service is far from being solved, with the market rejecting efforts such as MICROSOFT'S PASSPORT/WINDOWS LIVE ID. Online users continue to be frustrated by the problem of having to remember the user names and passwords of the many websites at which they are members.

In sum, the current state of the art is lacking, inter alia, in electronic commerce and advertising systems that provide ease of transaction processing, identity theft prevention and management, and user experiences with respect to such transactions.

SUMMARY

A configuration (a system and/or a method) are disclosed that includes a unified and integrated configuration that is composed of a payment system, an advertising system, and an identity management system as well as their associated methods such that the unified system has all of the benefits of the individual systems as well as several additional synergistic benefits. Also described are specific configurations (subsystems and/or methods) including the system's access point architecture, a user interface that acts as a visual wallet simulator, a security architecture, coupon handling as well as the system's structure and means for delivering them as targeted advertising, business card handling, membership card handling for the purposes of login management, receipt handling, and the editors and grammars provided for customizing the different types of objects in the system as well as the creation of new custom objects with custom behaviors. The configurations are operable on-line as well as through physical presence transactions, e.g., mobile transaction through a mobile phone or dedicated device at a physical site for a transaction.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Architecture

Figure 1:
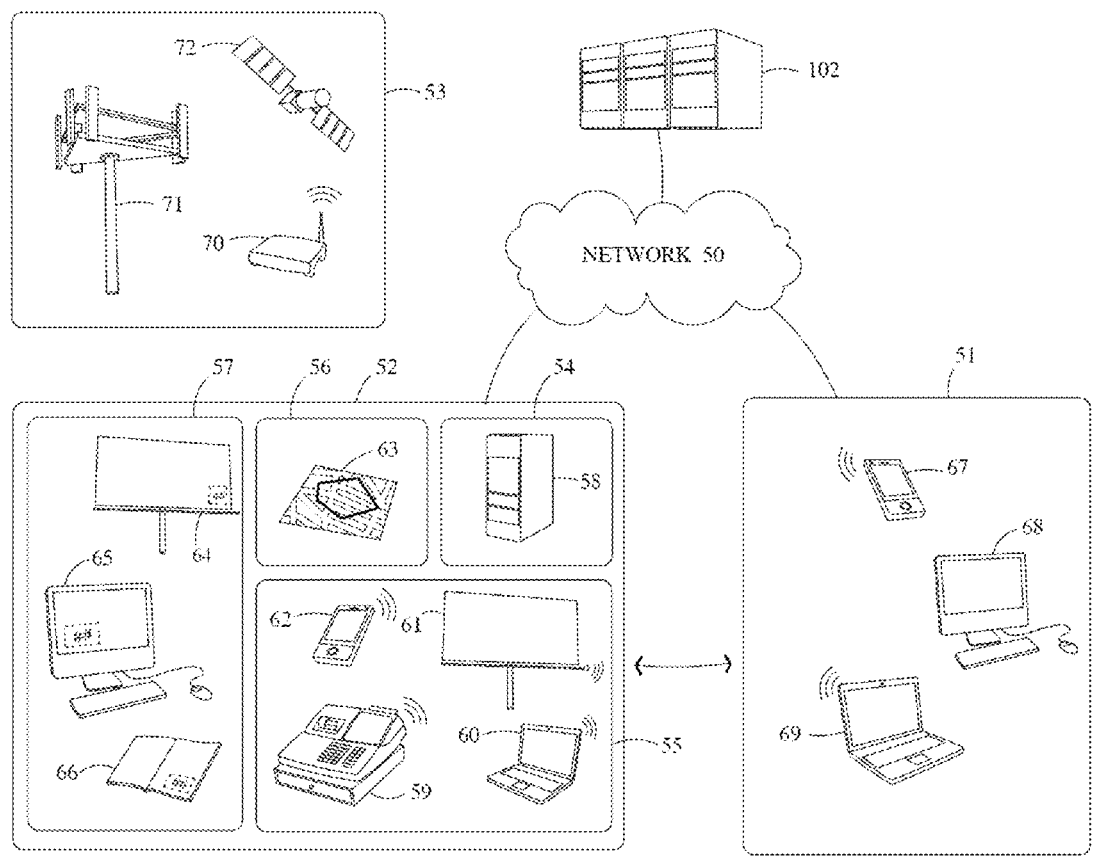
FIG. 1 illustrates one example embodiment of an architecture overview of a transaction configuration.

FIG. 1 illustrates one example embodiment of an architectural system for conducting transactions. The architecture as illustrated includes a central transaction authority 102 (or central authority 102 or transaction authority 102) communicatively coupled with a network 50 such as the Internet with electronic wallets corresponding to users, as well as to system access points 52 owned or operated by people, businesses, and other parties. It is noted that the transaction authority may reside on one or more server computers. The parties access the network by communication network entry points 53 such as routers 70, cell phone towers 71, and satellites 72, which they also access for other purposes such as location determination using, for example, GPS, or cell-phone tower triangulation. It is noted that communication network entry points should not be confused with system access points. The electronic wallet programs provides a mechanism by which the typical user interacts with the businesses and other parties through the system, whereas the access points provide a mechanism by which businesses and other parties interact with the users. Informally, access points should be viewed as a mechanism that matches users with businesses and other parties in order to perform a transaction.

Figure 2:
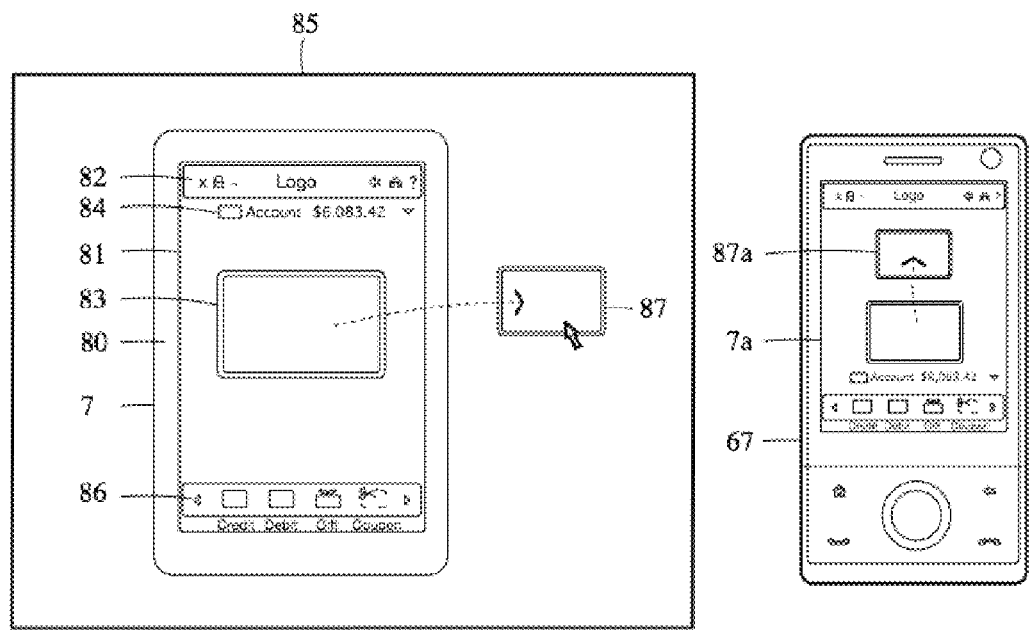
FIG. 2 illustrates two examples of the electronic wallet running on a conventional computer and mobile device and visually depicted through a user interface displayed on their respective screens.

In this embodiment, a user's account resides on a server of the transaction authority 102, and the user's access to that account occurs through the use of one or more wallet simulator programs (also referred to as 'wallet programs', 'digital wallets', and 'electronic wallets') which resides on a consumer computing device 51, for example, a desktop computer 68, a laptop 69, or a mobile device 67. FIG. 2 illustrates two examples of the electronic wallet 7, 7a (here 7 and 7a, but may be generally referred to as 7) running on a computer device and a mobile device and rendered for display through a user interface on a computer 85 screen and a mobile device 67 screen, respectively. The electronic wallet contains various controls 82, 84, 86 affecting its appearance and behavior as well as the state of the user's account. When the user logs in to the authority 102 through a particular electronic wallet, the specifics of a user's account are downloaded into the electronic wallet and become its contents. These contents can include digital representations of the kinds of objects typically found in a real-world purse or wallet. For example, the configuration contains categories of digital objects (also referred to as 'draggable objects') such as digital forms of cash, credit cards, debit cards, gift cards, coupons, receipts, membership cards, business cards, identification cards, photographs, etc., as well as custom-defined types, as well as digital objects or files not found in physical wallets such as digital videos, music, etc.

FIG. 2 illustrates a draggable object 83, displayed in the electronic wallet, as well as being dragged over the desktop 87 and through the wallet on the mobile device 87a. The different types of objects are used to perform different types of transactions in the system. For example, the financial digital objects are used for performing financial transactions, whereas the membership cards are used to perform login transactions, the business cards are used to perform transactions which share information, etc. Since the electronic wallet program can be used both online and in the real world, this allows digital objects to be downloaded both online and in the real world and used both online and in the real world, thereby unifying online and real-world transactions across the areas of payments, advertising, and identity management. Instances of these digital objects are stored at the transaction authority 102 as persistent entities associated with the user's account, and are represented graphically in the user's electronic wallet 7. Such an account system can be easily implemented by a person skilled in the art of relational database design.

In one embodiment, digital objects of each type have two aspects: a definition and instances. The distinction between types, definitions, and instances is illustrated through the examples noted below. The examples are listed as follows below.

In a first example, credit cards are a type of digital object which can be used for making payments in the system. The Bank of America may hold a business account with the system and may specify a credit card definition for a 'BANK OF AMERICA Platinum Plus Visa Card including its visual appearance and behavior. This definition is then stored as a persistent entity associated with BANK OF AMERICA account at the transaction authority. The bank, here BANK OF AMERICA, can then instruct the system to use that credit card definition to mint instances of it and distribute these, which are in effect digital credit cards to users, at which point the instances which themselves can include further instance-specific data such as the card holder's name, the card's account number, and its expiry data, can be associated with users' accounts and are displayed graphically in the user electronic wallet.

In a second example, coupons are a type of digital object which can be used by businesses for advertising and by users who hold them for making payments in the system. The NIKE CORPORATION may hold a business account with the system and may specify a coupon definition which gives a user 25% off of purchases of $100 or more at the NIKE online store and includes a graphic representation which includes a video advertisement. This definition is then stored as a persistent entity associated with a NIKE account at the transaction authority. NIKE can then instruct the system to use that coupon definition to mint instances of it and distribute them to users, at which point the instances can be associated with users' accounts and are displayed graphically in the users' electronic wallets. Again, an instance may contain further instance-specific data like a record of the means by which the user acquired the coupon, for example, whether it was shared to the user, downloaded from a website, or conveyed in some other way.

In a third example, business cards are a type of digital object which can be used by businesses or individuals to share information about themselves within the group of all account holders. An individual user who holds an account with the system may specify a business card definition which can include various forms of user data from various data sources as well as graphics and behavioral logic. This definition is then stored as a persistent entity associated with the user's account. The user can then instruct the system to use that business card definition to mint instances of it and distribute them to contacts, at which point the instances can be associated with the contacts' accounts and are displayed graphically in their electronic wallets. As before, business card instances can also hold further instance specific data, such as notes which the instance holder has associated with the card.

In a fourth example, the system not only provides editors for customizing existing types, but also provides editors for creating custom types, allowing businesses and other parties to create their own categories of objects which can then be further customized by others. For example, a business might create a type of draggable digital 3D object which can have its behavior specified by a custom grammar. The business then provides an editor allowing users or other parties to create their own definitions of 3D objects such as avatars, everyday objects such as cars, cute animals, etc. Users can then download instances of these definitions into their electronic wallets.

Just as a digital object instance is a persistent entity associated with the accounts of the party which holds it, so is a digital object definition a persistent entity associated with the account of the party that created it. The configuration provides editing programs which different parties can use to create highly-customized digital object definitions which are then associated with their accounts. Each type of object has a grammar associated with it which can be used to specify the logic associated with each digital object definition of that type, said logic governing the appearance and behaviour of the digital object instances minted from that definition. Once the instance of a digital object has been associated with a user's account, the user may further customize it by, for example, writing notes on it or changing its graphics, if allowed by the underlying definition. Digital object instances stored with the transaction authority 102 do not store the same information which is also stored in their definitions. They are not just copies of the definition associated with user accounts. Rather, they store identifiers for (or pointers to) their definitions and for data not found in the definition such as the owner of an instance, or a particular credit card's expiry date, or a membership card instance-holder's user name and password at the website that issued the membership card instance.

New digital object instances can be minted and distributed in a variety of ways. For example, instances of the coupon type can be minted and downloaded from the authority 102 to banner ads in websites, whence the user can download the instance. Similarly, instances of the credit card type can be minted when the user inputs the user real credit card's account details and authentication information securely into the electronic wallet 7 and the financial institution that issued the real card and has defined an associated credit card definition in the system and authorizes the minting. In addition, certain digital object types such as coupons, gift cards, business cards, and custom types can be transferred to or shared with others. The different digital object types as well as their editors, grammars, and behaviours are described in more detail below.

The electronic wallet can also contain a digital inventory feature in which the user can store instances of the custom type. Digital object definitions from the custom type can contain any sort of media, and contain logic which governs the behaviour of their instance, potentially in concert with other instances of the custom type stored in the user's digital inventory. For example, a user might specify a digital object definition of a three-dimensional (3D) white knight and a digital object definition of a 3D fire-breathing dragon. Their logic can be coded in such a way that when instances of them are placed into the digital inventory together, their graphic representations appear to fight. In another example, a user may specify a digital object definition of a digital object which can hold a movie. When placed in the digital inventory with the dragon and knight their logic might make their graphical representation stop fighting and simply appear to watch the movie. This can be accomplished by linking motion graphs related to the 3D models to variables available in the digital object definition's behavioural grammar and allowing the objects' logic to access a list of the other inventory members' identifiers and types. Some objects can specify in their logic that other objects should not be able to 'see' them on the list. Instances in the digital inventory can also be imported or exported to or from the user's file system in certain standard file formats. For example, a 3D model can be exported into an appropriate file that supports such file types, for example, AUTOCAD.

Whereas typical users can interact directly with the transaction authority 102 through the electronic wallet 7, and businesses and institutions can interact directly with the authority through various account management programs defined elsewhere in this disclosure, businesses and institutions also provide a means through which electronic wallet users can conduct transactions with them in a secure manner through the system by defining and/or hosting access points 52. Each access point has its own unique identifier and is associated with an account at transaction authority 102. A single account can have many access points associated with it. The main role of access points is to allow user accounts to interact with the accounts of businesses and other parties in an intuitive and secure way. This forms the primary basis for commercial and other information-based transactions between different account holders in the system. In the preferred embodiment, users drag and drop the graphical representations of the digital objects found in the electronic wallet programs to and from user controls associated with an access point in order to interact with the owner of that access point. Alternatively, there are many cases in the digital object is automatically applied.

Access points can take many forms. FIG. 1 illustrates some examples of access points such as online access points 58 hosted on web servers, devices with short-range wireless capabilities 55 such as computers 60, cash registers 59, mobile devices 62, embedded devices which can be found in billboards 61, signs (not shown), store fronts (not shown), etc., codes written on printed media 66, displayed on signs 64, computers 65, or conveyed in any other way such as audibly, as well as specifically-designated geographical areas 63 defined by users and other parties in the system's transaction authority 102. As shown in FIG. 1 access points 52 generally exist on computing devices and other physical objects that are different from the computing devices which run users' electronic wallets. Each of the different forms of access point interacts differently with a user's electronic wallet in order to set up a transaction between the user and the access point owner. There are four general types of access points: online access points 54, short range transmitter access points 55, geographical area access points 56, and manual input access points 57, described further below. In order for the transaction to be carried out, an access point spawns one or more user controls on the computing device which runs the user's electronic wallet. The user can then manipulate the graphical user interface of the electronic wallet and the user controls in order to perform a transaction. In the one embodiment, user interaction includes of dragging and dropping graphical representations of digital objects between the electronic wallet and these user controls, though secondary modes of interaction are also used.

The aforementioned user controls spawned by access points can be displayed on the user's computing device as part of a web page, part of a third party program, or part of the electronic wallet program itself. These user controls come in the form of dispensers, from which users drag digital objects or groups of objects into their electronic wallet programs and in the form of receptacles, to which users drag digital objects or groups of objects from their electronic wallet programs. Dispensers and receptacles exist for every type of digital object in the configuration. In addition, the configuration contains access points for spawning each of the different types of dispensers and receptacles. For example, the configuration contains access points for spawning coupon dispensers, access points for spawning coupon receptacles, access points for spawning membership card dispensers, access points for spawning membership card receptacles, etc. In addition, the configuration also contains access points for spawning controls which combine the functionality of two or more types of controls. For example, a common type of access point spawns a payment receptacle control which can receive all digital objects that can act as payment instruments allowing the user to apply them to a transaction but also acts as a dispenser which allows the user to drag payment instruments back out in order to roll back their application.

In one embodiment, when the user interacts with the user controls to affect the transaction, it communicates with the access point owner's system. In the preferred embodiment, the transaction is set up according to one of the transaction configurations described below and when the user interacts with these user controls, either by dragging and dropping digital objects between them and the user's electronic wallet, or by some other means such as clicking buttons on the controls, it only appears to the user as though he/she is interacting with the access point owner's system. In reality, after the user control is spawned, it is given an identifier which it communicates to the transaction authority 102, either directly or through the user electronic wallet, thereby allowing the transaction authority 102 to identify the transaction which will be carried out between the user and the access point owner. The user's interactions with the user control are then communicated purely with the transaction authority 102, and never with the access point owner's system, carrying out the transaction in a manner that is secure for the user. The access point owner is only informed of events related to the transaction's life cycle such as transaction completion and is not informed of any details of the digital objects which the user is using in relation to the transaction. There are some exceptions in which there is still some communication with the access point owner's system because in these cases, the purpose of the communication is to directly link the user and the access point owner rather than to keep them safely separated. This happens, for example, when the user logs into the access point owner's website by dragging and dropping a membership card into a membership card receptacle, a case in which the access point owner's actual system is directly affected by the transaction.

Just as the configuration provides editors for creating customized digital objects, so does it provide management programs for defining and customizing access points. As before, these programs provide the access point owner with a completely flexible grammar allowing for complete control over the appearance and behaviour of an access point. These management programs are described in more detail below.

Access Point Operation

Figure 3:
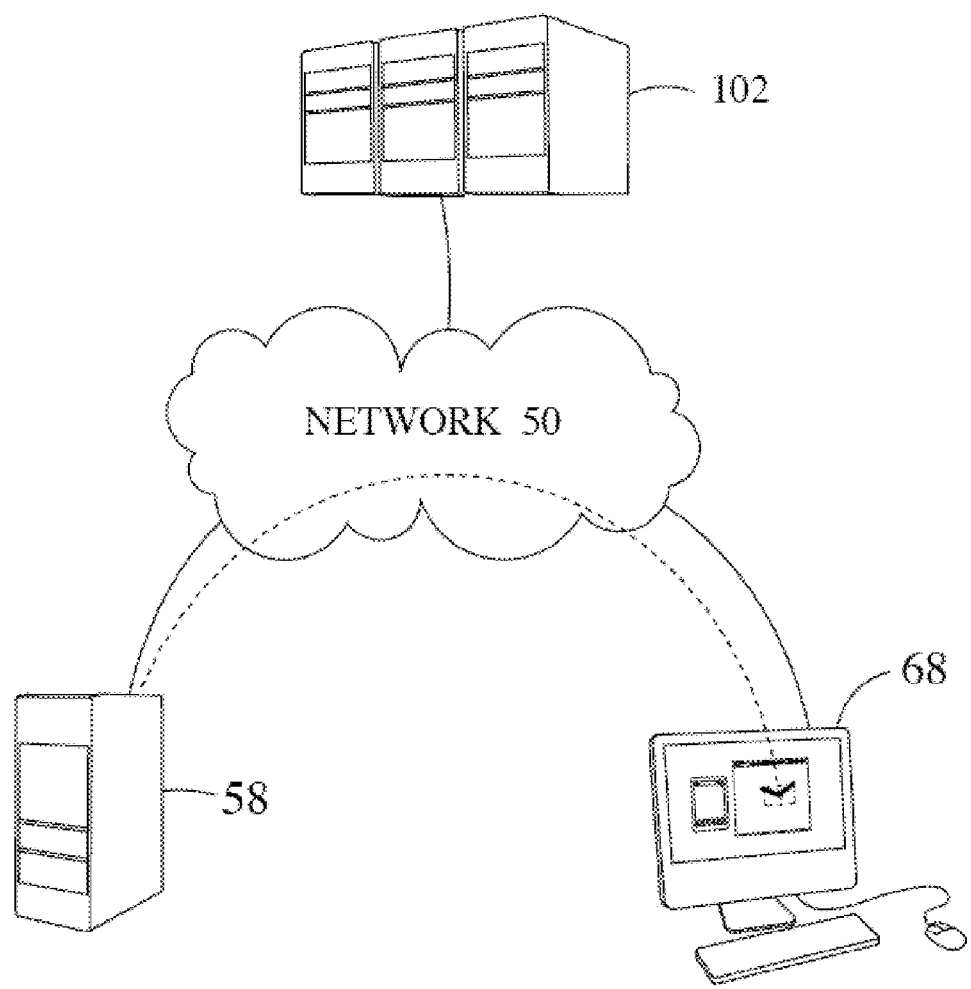
FIG. 3 illustrates an example online access point paradigm.

An example embodiment of an online access point paradigm is illustrated in FIG. 3. A user generally interacts with an online access point 58 through a web browser, for example, MOZILLA FIREFOX, MICROSOFT INTERNET EXPLORER, GOOGLE CHROME, or APPLE SAFARI. Online access points are programs or subroutines running on the web server belonging to the access point owner which is associated with an account on the transaction authority 102. They are responsible for associating the user in a transaction with the access point owner's account on the transaction authority 102. An online access point embeds a user control such as a dispenser or receptacle in a web page that is sent over network 50 to the user's web browser 202, where it is displayed (spawned), or may send a message either directly or through the electronic wallet program over network 50 which spawns a user control in the user's electronic wallet 7.

In order to do this, the access point owner creates an account with the central transaction authority and defines an online access point including its behaviour with the transaction authority 102. The access point is then associated with its owner's account and is given a unique access point identifier. The owner then uses the system's API to embed a server-side tag in a language such as PHP or ASP in the server-side that will generate the page delivered to the user's web browser 202. During page generation, the API converts the tag into an inline frame which points to an address controlled by the system which contains the desired user control and is passed a parameter specifying either a transaction identifier or the access point's identifier. The access point's identifier may be retrieved from the transaction authority 102 by the website's server-side code during page generation, or it may be stored on the website's system. There are numerous ways in which the transaction identifier can be passed to the user control. They depend on what kind of transaction is to be performed and are explained elsewhere in this document.

Once the user control is visible on the user's computing device, in this case shown as 68, the user drags and drops digital objects between the user control and the electronic wallet 7, causing instructions to be sent over network 50 to transaction authority 102 which execute steps in the transaction.

An example of a user interacting with an online access point may involve it spawning a payment receptacle which allows the user to pay for an online purchase from the access point owner's website. Alternatively, an online access point can spawn a coupon dispenser in an online banner ad from which the user can download coupons. Another example is the spawning of a membership card receptacle on a web page which allows the user to log in to the website by dragging and dropping the appropriate membership card onto that receptacle. In further examples, a business card dispenser on a lawyer's web page can allow the user to download the lawyer's business card, or a credit card dispenser on a bank's secure website can allow the user to download a new credit card into the user electronic wallet program. Similarly, an online access point can spawn a business card receptacle allowing a user to drag and drop a business card in order to fill out text fields on a web page, or a business card receptacle on a web page allowing the user to share a new instance of a business card containing the user's email address with the web page owner so the web page owner can manage a mailing list. In order to interact with these access points, the user visits the appropriate web pages and then uses the electronic wallet program to drag and drop graphical objects to and from the receptacles or dispensers spawned on those web pages. In addition, instead of spawning user controls in web pages, online access points can also spawn them in standalone programs or in the electronic wallet program itself.

Figure 4:
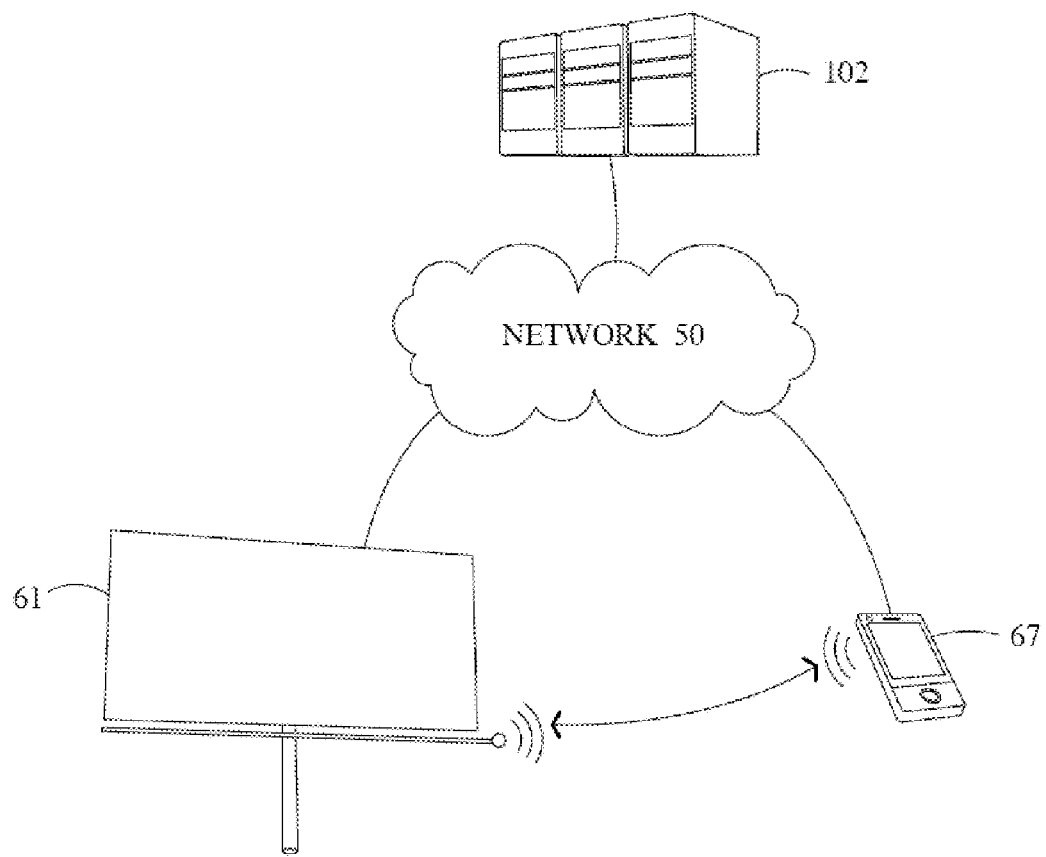
FIG. 4 illustrates an example embodiment of a short-range transmitter access point paradigm.

Next, an example embodiment of a short-range transmitter access point paradigm is illustrated in FIG. 4. A user generally interacts with a short-range transmitter access point 61 (here shown as a billboard containing an embedded device with wireless communications capabilities) by connecting to it wirelessly using an electronic wallet on a mobile device 67. Short-range transmitter access points are programs or subroutines running on computing devices to which the user's electronic wallet is capable of wirelessly connecting such that those programs are associated with accounts on the transaction authority 102. They are responsible for associating the user in a transaction with the access point owner's account on the transaction authority 102. A short-range transmitter access point sends a message to the electronic wallet program containing the access point's identifier which spawns the appropriate user control in the user's electronic wallet 7.

In order to do this, the access point owner creates an account with the transaction authority 102 and defines a short-range transmitter access point including its behaviour at the authority. The access point is then associated with its owner's account and is given a unique access point identifier. The owner then sets up a computing device with wireless communication capabilities. If the device is Internet-enabled, it may log into the transaction authority 102 using an account associated with the short-range transmitter access point owner's account and retrieve its access point identifier. For example, a cashier can log into a cash register using a subaccount of the access point owner's account, which transmits the access point identifier from the transaction authority 102 to the cash register. The cash register is then associated with the correct account, and can carry out transactions with users. Alternatively, Internet-enabled short-range transmitter access points may remotely be given their access point identifiers by an access point owner using an access point management tool, as described elsewhere in this disclosure. Short-range transmitter access points without Internet access, such as a realtor's sign set up to distribute the realtor's business cards, can store their access point identifiers, for example, by downloading the code stored in a predetermined file format on a universal serial bus (USB) key and plugged into the device, or by other similar mechanisms. The access point owner can use a management tool to define the behavior of the access point.

Once the user control is visible on the user's computing device, in this case shown as 67, the user interacts with it, for instance dragging and dropping digital objects between the user control and the electronic wallet 7, causing instructions to be sent over network 50 to transaction authority 102 which execute steps in the transaction.

An example of a user interacting with a short-range transmitter access point may involve a user walking up to a sign located at the front of a store offering coupons from that store. The user connects to the access point, thereby spawning a coupon dispenser in the user's electronic wallet, from which the user can download coupons into the user account. As another example, a user can walk into the lobby of a fitness club where the user has a membership and walk up to a short-range transmitter access point near the entrance to the area of the health club which is restricted to members only. The user connects to the access point, which spawns a membership card receptacle in the user's electronic wallet by sending it a message, through which the user then logs in, thereby gaining admittance. As another example, a user shops at a grocery store, brings the items to the checkout which has an short-range transmitter access point connected to the cash register. It spawns a payment receptacle in the user's electronic wallet, which the user then uses to pay.

As another example, a user may go to the box office of a movie theatre which has an access point that spawns a ticket dispenser, which may include facilities for choosing what to purchase and may also include a payment receptacle. The user selects the ticket from a dispenser, pays, downloads the ticket into the user electronic wallet, proceeds to the entrance which has an access point spawning a ticket receptacle, where the ticket is automatically applied by the user's electronic wallet, thereby gaining admittance. As another example, the user can create a short-range transmitter access point in order to set up a cash register using the user mobile device or laptop in order to take credit card payments at a garage sale. It is noted that short-range transmitter access points can be used in other ways. For example, if the user is walking past a store that contains items in its inventory which the transaction authority calculates the user would like, the access point at the front of the store can cause the user's electronic wallet to ring and automatically spawn an access point containing a message explaining that the store has an item which he/she might want, complete with a coupon or an information object describing the product.

Figure 5:
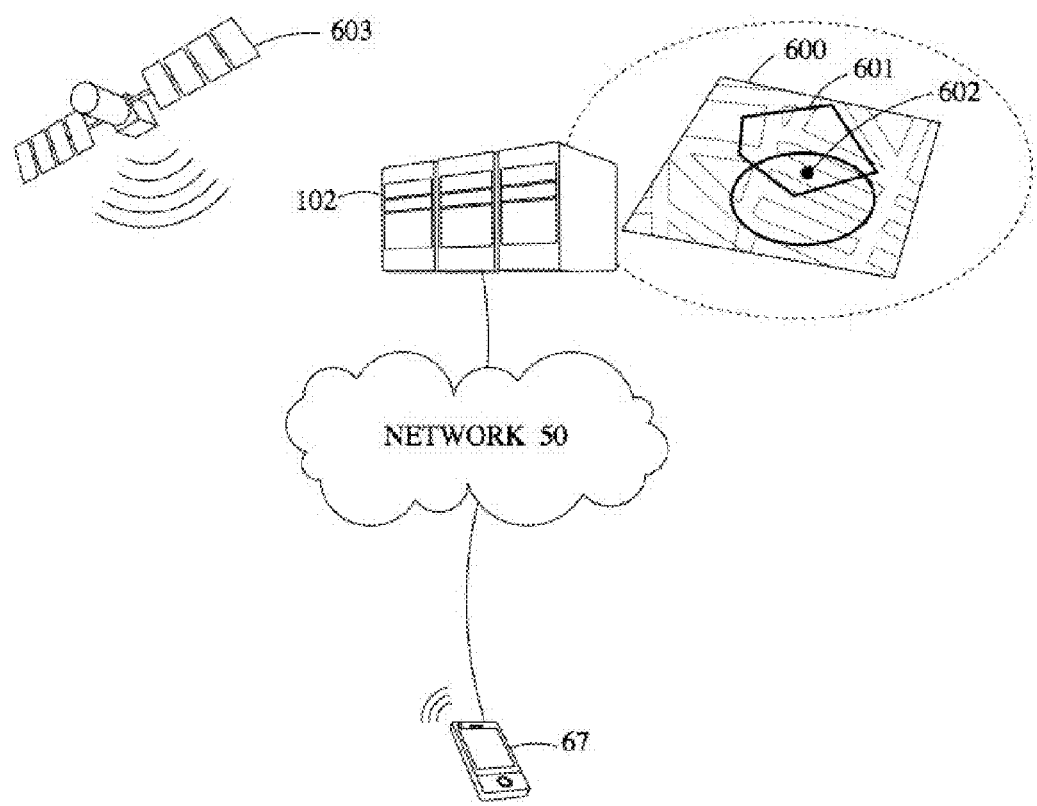
FIG. 5, it illustrates an example embodiment of a geographical area access point paradigm.

Turning now to FIG. 5, it illustrates an example embodiment of a geographical area access point paradigm. A user typically interacts with a geographical area access point 601 directly through the user electronic wallet on a mobile device 67, but may use an electronic wallet on some other device also. Geographical area access points are predefined geographical areas of the globe associated with an account on the transaction authority 102. They are responsible for associating the user in a transaction with the access point owner's account on the transaction authority 102. The electronic wallet program's physical location is established using GPS satellite network 603 or other means elsewhere described, and the location is then sent to the transaction authority 102, which uses the location as well as other information to determine the polygon which the user is located in, thereby also determining the account which the polygon is associated with. The transaction authority 102 then sends a message over network 50 which spawns the appropriate user control in the user's electronic wallet program 7. If the user is within the area of multiple geographical area access points, disambiguation methods may be used to choose one, for example an auction between the various geographical access point owners. In order to do this, the access point owner creates an account with the transaction authority 102 and defines a geographical area as well as the type of access point (including its behavior) associated with that area.

Once the user control is visible on the user's computing device, in this case shown as 67, the user interacts with it, for instance dragging and dropping digital objects between the user control and the electronic wallet program 7, causing instructions to be sent over network 50 to transaction authority 102 which execute steps in the transaction.

An example of a user interacting with a geographical area access point may involve an Italian restaurant which defines a polygonal area in a plaza which is located just up the street from the restaurant. A user enters the plaza and solicits the user mobile electronic wallet to recommend a nearby restaurant. Based on the user's prior purchasing behavior as well as other factors, the system determines that the user would enjoy eating at the Italian restaurant, spawns a coupon dispenser in the user's electronic wallet, which the user then uses to download a coupon. The coupon contains an interactive map which uses the mobile electronic wallet's GPS capability to lead the user directly to the restaurant, where he/she eats and then pays at the restaurant's cash register in part by using the coupon.

As another example, a real-estate company defines a polygon in front of a low-tech billboard offering the business cards of its real-estate agents. A user stands in the polygon and instructs the mobile electronic wallet to download the business cards, at which point a business card dispenser is spawned in the user's digital electronic wallet allowing the user to drag and drop the desired card(s) into the user possession. As another example, a mother defines a polygonal access point hosting a cash dispenser which only her daughter can access in front of the house belonging to her piano teacher which only becomes active at 4 pm. The mother specifies the logic using an access point management tool described elsewhere in this disclosure. The girl attends her piano lesson from 3 pm to 4 pm, at which point she stands in front of the house and uses her electronic wallet to interface with the access point, which spawns a cash dispenser, thereby allowing the girl to claim her reward for attending the music lesson.

As another example, a camp ground defines polygons on its camp sites which spawn payment receptacles, thereby allowing campers to pay at the actual site. As another example, a user specifies a custom-defined type of object which looks like a three-dimensional model of a panda bear by using an editor supplied by the system. As part of the object definition, the user includes logic which accesses weather data online and displays the panda holding an umbrella if it is raining and wearing sunglasses if it is sunny. The user walks down a street and uses his electronic wallet program to define a geographical area access point comprising a point with a five meter radius around it in public, which he associates with a panda dispenser. Other users then visit that location and user their mobile electronic wallets to download the digital panda. Users can also define a geographical area access point and associate logic with it to turn it into a game board, in which the user has grouped other access points. The user could then link digital object instances of the custom type, which can have complementary logic of their own, to define a game. For instance, users holding certain digital object instances while standing in the game board could be marked as players in the game and they could interact by moving other digital object instances around the board from associated access point to associated access point to further some goal, for instance in a real-world game of digitally-enhanced capture-the-flag or tag.

Figure 6:
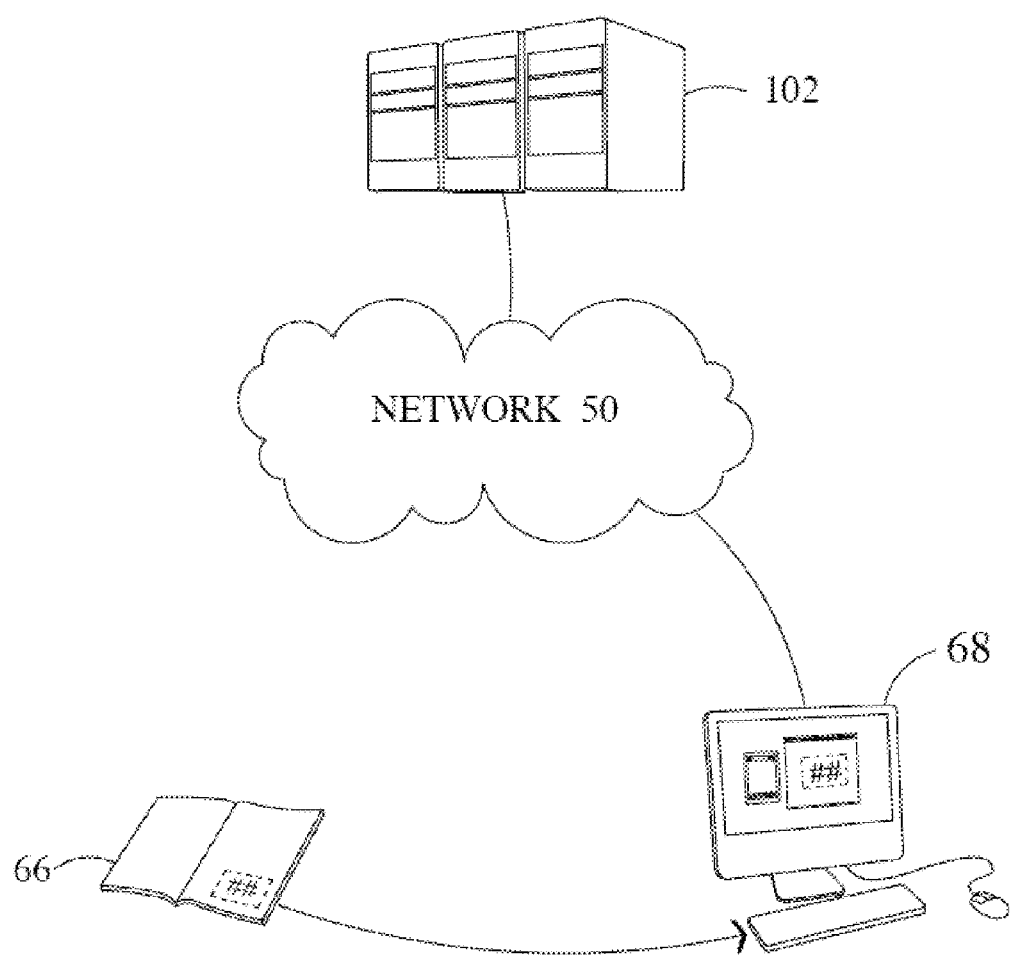
FIG. 6 illustrates an example embodiment of a manual code input access point paradigm.

FIG. 6 illustrates an example embodiment of a manual code input access point paradigm. A user generally interacts with a manual code input access point 66 (here shown as a printed ASCII code in a magazine) by manually inputting the access point code into the electronic wallet program (here shown running on a desktop computer 68). A manual code input access point is an ASCII string associated with an account on the transaction authority 102. It is responsible for associating the user in a transaction with the access point owner's account on the transaction authority 102. The electronic wallet program sends the code over network 50 to the transaction authority 102, which chooses the account corresponding to that code, and sends a message over network 50 which spawns the appropriate user control in a web page or the user's electronic wallet program 7.

In order to do this, the access point owner creates an account with the transaction authority 102 and chooses a code as well as the type of access point (including its behavior) associated with that code. The access point owner then has the code printed on physical media such as signs, billboards, magazines, etc. Because of their completely general nature, codes can similarly be displayed on a web page, or broadcast over television or radio, or even transmitted by flag semaphore, Morse code, or any other mechanism which humans have devised for communicating words to each other.

Once the user control is visible on the user's computing device, in this case shown as 68, the user interacts with it, for instance dragging and dropping digital objects between the user control and the electronic wallet program 7, causing instructions to be sent over network 50 to transaction authority 102 which execute steps in the transaction.

As an example, a perfume company creates an account on the system and uses an editor to create a manual code input access point with the code 'perfume', and programs it to spawn a coupon dispenser which allows users to download a coupon for the perfume being advertised bundled with a custom-defined type which is displayed as a bouquet of flowers. The perfume company then pays for an advertisement in a fashion magazine, and in the corner of this ad it encourages people to access the presently-described system and enter the code. A user enters this code into her electronic wallet program, which spawns the dispenser, allowing her to download the bouquet object and the coupon for later use.

As another example, a user shops online at work while on a break, but the system administrator does not allow employees to install any programs on their work computers, so the user cannot install the electronic wallet program and therefore cannot complete the payment. The user clicks a special button on the payment receptacle which saves the shopping cart and issues the user with a code. The loads the electronic wallet program on a mobile device, enters the code into it, thereby spawning a payment receptacle filled with the items from the shopping cart which were saved from the other computer. The user then completes the payment on the mobile device. Alternatively, the user might choose to go home and complete the payment on his home computer. In this example the code is a transaction identifier rather than just an access point identifier, which allows the transaction details to be associated with the payment receptacle.

As another example, a user visits a ferry dock, but there are no ferries present. The user inquires when the next ferry will arrive, and is informed that a schedule can be downloaded by entering the code 'ferry-schedule' into the electronic wallet on his smart phone. The user says the code into the phone, which through voice recognition software in the electronic wallet program translates it into the correct code, causing the electronic wallet to spawn an information dispenser. The user then downloads a digital schedule object instance (defined from the custom type) or even just a data file such as an ADOBE PDF file and is able to determine when the next ferry will arrive.

As a final example, a user sees a billboard with a code on it for downloading a free gift card. The user takes a picture of the billboard using the digital camera in his smart phone, at which point the electronic wallet uses optical recognition to recognize the code so that the user does not need to type it in. The electronic wallet then spawns a receptacle, which automatically downloads the free gift card into the user's account. The codes described above can be strings of text. Alternatively they can be images such as barcodes of some other structured image which can be used as a code. In addition, the transaction authority can support all the permutations of access point paradigms and digital object types for both receptacles and dispensers as well as any combinations thereof.

Transaction Configurations

A transaction configuration (e.g., a system and/or a method) integrates subsystems/modules for the purposes of online and real-world transactions, for example, payments, advertising, identity management, and the like. The central transaction authority and the subcomponents of the transaction authority are responsible for the different functions of payments, advertising, and identity management shall be referred to as the payment authority/subsystem, the advertising authority/subsystem, and identity management authority/subsystem respectively. In addition, each type of object in the system has a further authority/subsystem governing it. For example, coupons can be implemented as part of the advertising subsystem, and have a coupon authority/subsystem which is a sub-component of the advertising authority. Each subsystem as described herein is configured for stand-alone operation and also can function in combination with others to provide additional synergistic benefits.

FIG. 1a illustrates one example embodiment of a system architecture overview. The system includes a user computing system (or user computer) 100, a network 50, a seller system 101, and a transaction authority system (or transaction authority) 102. The user computer 100 is, for example, a desktop computer, a laptop or network computer, a mobile phone (including smart phone), a mobile computing device such as a personal digital assistant (PDA), or dedicated electronic device for executing an electronic wallet program, which is further described herein. The user computer 100, the seller system 101, and the transaction system 101 are communicatively coupled through the network 50. It is noted that the seller system 101 can be configured through one or more computers that may function as a server (e.g., in communications with the user computer 100) or a server (e.g., in communication with a transaction authority server 102). Similarly, the transaction authority 102 can be configured through one more computers and typically functions as a server (e.g., in communications with the user computer 100 or seller system 101). It is noted that in some configurations described further herein the user computer 100 may be configured in server role. As for the network 50, it is a data or voice communication network or a combination thereof. For example, the network 50 can be the Internet, a mobile phone network, a public switch telephone network, or a combination thereof.

Figure 7:
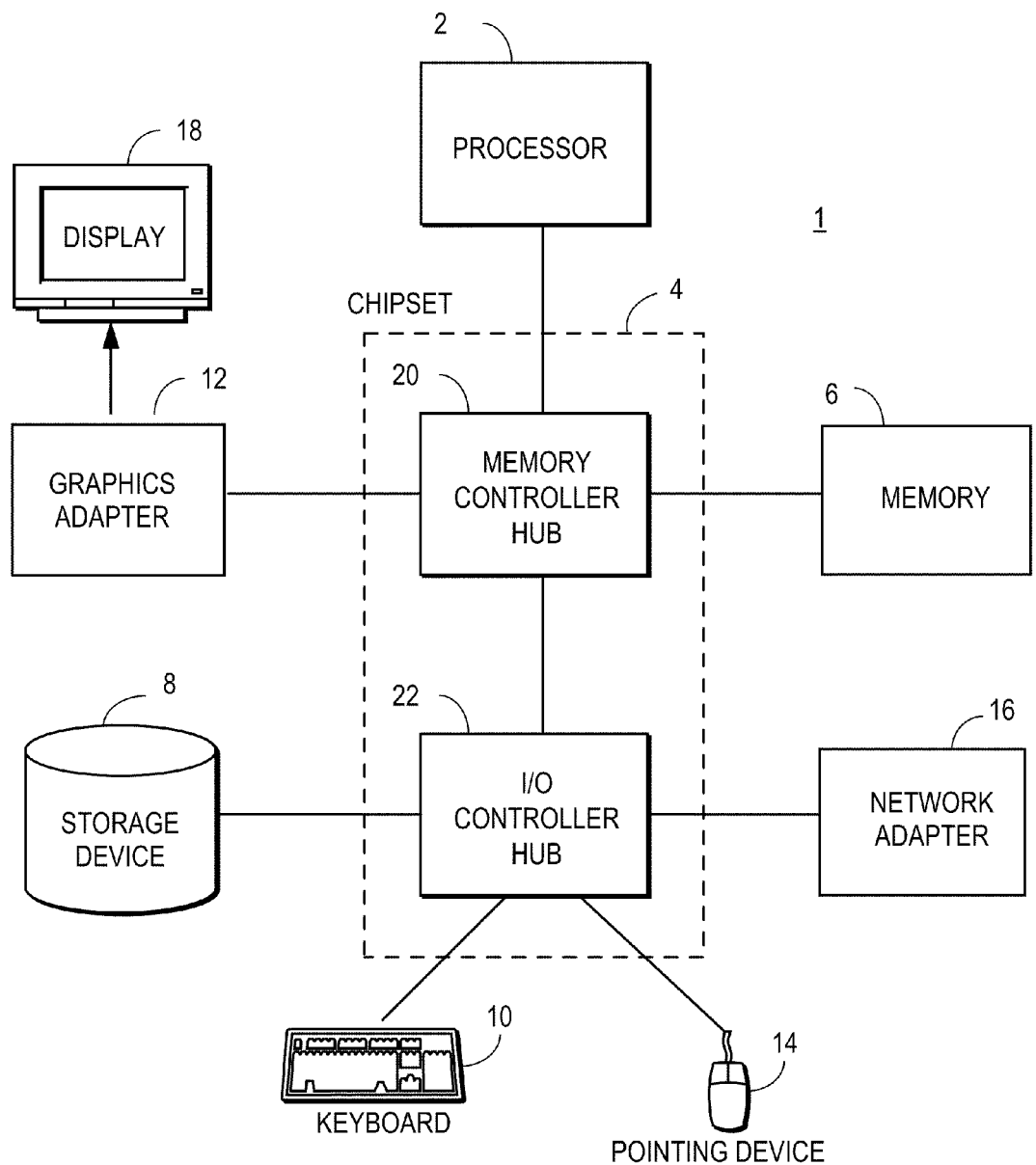
FIG. 7 illustrates one example embodiment of high-level block diagram of a computing system.

FIG. 7 illustrates one embodiment of a high-level architectural block diagram of a computer (or computer system) 1. The architectural block diagram of the computer 1 comprises an example architecture that may be found in the user computer 100, one or more computers of the seller system 101, or one or more computers of the transaction authority 102. Illustrated are at least one processor 2 coupled to a chipset 4. Also coupled to the chipset 4 are a memory 6, a storage device 8, a keyboard 10, a graphics adapter 12, a pointing device 14, and a network adapter 16. A screen (or display) 18 is coupled to the graphics adapter 12. In one embodiment, the functionality of the chipset 4 is provided by a memory controller hub 20 and an I/O controller hub 22. In another embodiment, the memory 6 is coupled directly to the processor 2 instead of the chipset 4.

The storage device 8 is any device capable of holding data, like a hard drive, compact disk read-only memory (CD-ROM), DVD, or a solid-state memory device. The memory 6 holds instructions and data used by the processor 2. The pointing device 14 may be a mouse, track ball, touch screen, or other type of pointing device, and is used in combination with the keyboard 10 to input data into the computer system 1. The graphics adapter 12 displays images and other information on the display 18. The network adapter 16 couples the computer system 1 to a local or wide area network.

As is known in the art, a computer 1 can have different and/or other components than those shown in FIG. 7. In addition, the computer 1 can lack certain illustrated components. In one embodiment, a computer 1 acting as a managed node lacks a keyboard 10, pointing device 14, graphics adapter 12, and/or screen 18. Moreover, the storage device 8 can be local and/or remote from the computer 1 (such as embodied within a storage area network (SAN)).

As is known in the art, the computer 1 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 8, loaded into the memory 6, and executed by the processor 2.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 8:
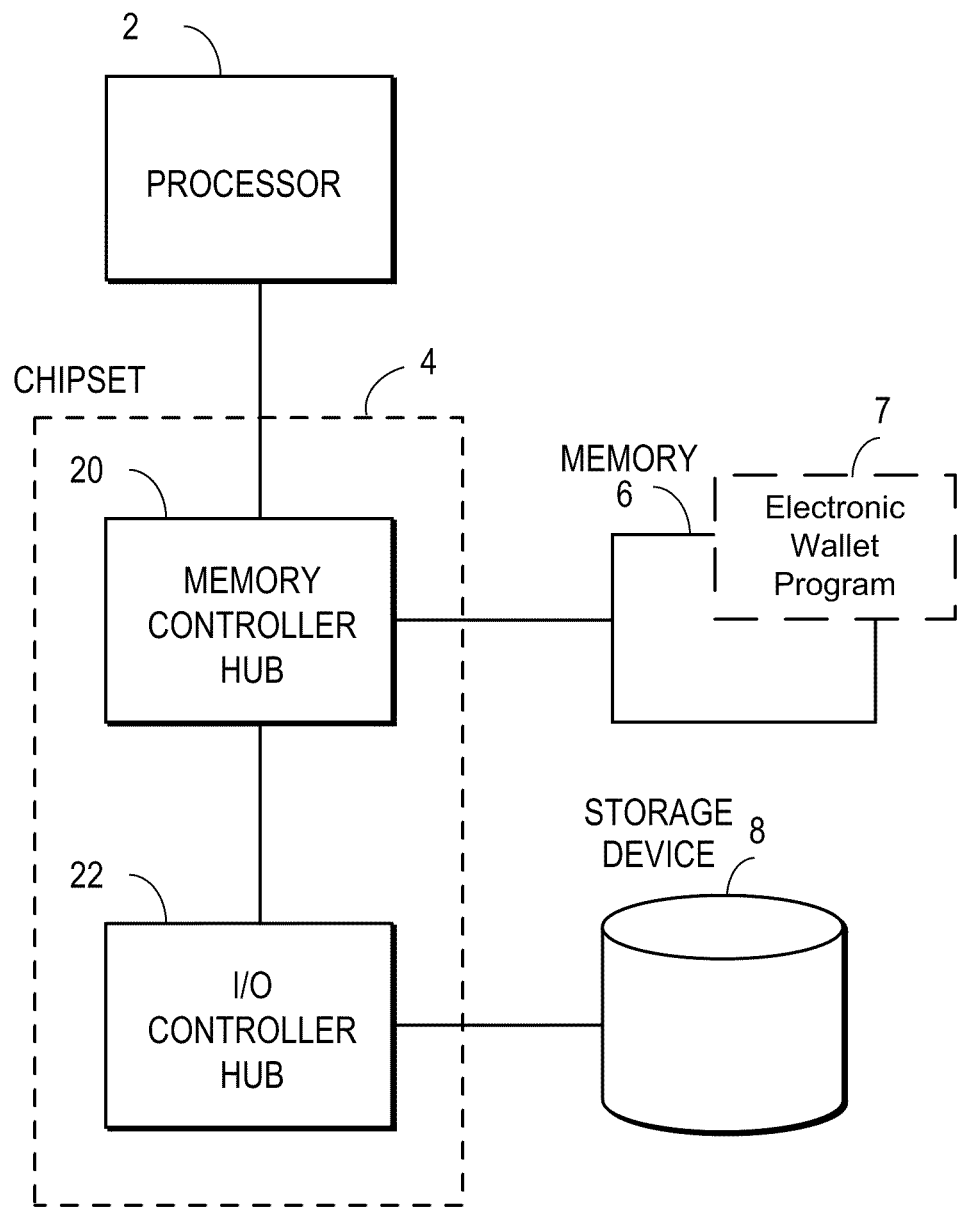
FIG. 8 illustrates an example embodiment of an electronic wallet module during execution by a user computer.

In one aspect, the overall system is presented to the user as an electronic "wallet simulator." The electronic wallet simulator comprises computer program code that corresponds to a physical wallet and its content. The electronic wallet simulator also includes a corresponding user interface as is further described below. For ease of discussion, the electronic wallet simulator will be referenced as an "electronic wallet" or "electronic wallet module." FIG. 8 illustrates an example of an electronic wallet module 7 during execution with the user computer 100. The instructions comprising the electronic wallet 7 are stored in the storage device 8. The instructions are loaded into the memory 6 and thereafter executed by the processor 2 of the user computer 100.

As noted with FIG. 7, the program code comprises instructions storable in a storage device 8 and executable by a processor 2. The electronic wallet module is configured to execute on the user computer 100 and communicatively couples with the seller system 101 and/or transaction authority 102 as further described herein.

When executed by the processor 2, the electronic wallet 7 mimics the look, feel, and functionality of a real wallet which everyone carries in the user pocket. This is accomplished by storing within the digital electronic wallet 7 a digital representation of physical objects typically found in a physical wallet. The digital representations are provided with functionality that mirrors that of the corresponding physical and tangible objects of the physical environment.

By way of example, the electronic wallet 7 can contain digital representations of items such as cash, credit cards, debit cards, gift cards, receipts, coupons, business cards, identity cards, membership cards, etc. which the user can manipulate in order to perform various functions within the context of the overall system. The user interface of the electronic wallet 7 is graphically rich, and all of the objects in it are displayed as visual representations of their real-life analogues. User interaction with the electronic wallet is also very visual, and is within the context of a drag-and-drop system. The drag and drop system is configured to allow the user to issue commands to the system by dragging the digital objects to and from or within the electronic wallet 7. When such actions are undertaken the user interface cursor appropriately changes.

The electronic wallet 7 can be used to interact with the transaction authority 102 through one or more access points. The access points are associated with its payment, advertising, and identity management subsystems. The access points can be located online such as in the case of websites or other programs. Alternately (or in addition) the access points can be associated with physical manifestations, for example, cash registers, signs, billboards, store fronts, trains, or buses, that allow communication couplings, e.g., Bluetooth, WiFi (IEEE 802.11), infra-red, etc., with the user computer 100 executing the electronic wallet 7. In addition, access points to the system can be located in public, in which case they can be more ephemeral and migrant. The user can access the same account both online and in the real world regardless of whether the user is using a compact form of the user computer 100, e.g., notebook or mobile computing device such as a smart phone.

Access points to the transaction authority 102 spawn user controls in the form of dispensers and receptacles for the digital objects which are contained in the electronic wallet. The user's ability to drag and drop the various objects in the electronic wallet 7 to and from these receptacles and dispensers provides a mechanism for the user to interact with the transaction authority 102.

The dispensers and receptacles work in a very flexible way which varies in accordance with the objects which they dispense and receive. For example, in the case of payment objects such as cash, credit cards, and debit cards, the receptacle is a general payment receptacle at which users pay for a transaction after having selected their items either at an online or real-world store. This payment receptacle can similarly act as a dispenser if the user changes the user mind half way through a transaction and decides to drag a payment object which they dropped into the payment receptacle back into their electronic wallet 7. In the case of coupons, the dispensers can take many forms such as banner ads in web pages, whereas their receptacles are the same as the payment receptacle used for payments, since the coupons are a type of payment instrument.

Receptacles and dispensers can also sometimes act differently, even for the same type of digital object because they can have multiple purposes. For example, business cards can be dropped into a receptacle communicatively coupled with text fields that need to be filled out such as an address, automatically filling out those text fields. Alternatively, a business card can also be dragged into a different type of business card receptacle, thereby giving the owner of the receptacle a copy of the card. Membership cards can be used to log in to websites or to gain access to real-world establishments. They are downloaded by dragging them from a membership card dispenser on a website or from a dispenser at a real-world setting such as the front desk of a fitness club at which a user has created an account or negotiated the right to enter to the electronic wallet 7, and it can later be used to log in to that site or gain entrance by dragging it from the electronic wallet 7 to a membership card login receptacle on the site or located at a physical entrance.

Similarly, credit and debit cards can be dragged to the electronic wallet 7 from appropriate dispensers on a secure web page hosted by a bank or other financial institutions. In other cases, objects are automatically pushed into the electronic wallet from a dispenser rather than dragged. For example, after a purchase has been completed, the user receives a digital receipt. However, since the receipt is the transaction authority's confirmation of the completion of the transaction, it is automatically pushed into the electronic wallet 7. Alternatively, if a user leaves a web page after creating a membership card without downloading it, it is automatically pushed into the electronic wallet 7. These examples are given only to illustrate the nature and flexibility of dispensers and receptacles, and should not be construed as limiting.

The system provides computer programs and other facilities for defining the aforementioned "draggable" (or drag and drop) objects. This is done by providing the designer with an editor in the form of a standalone program or program embedded in a web page containing a formal grammar which can be implemented as a programming or scripting language. This grammar is used by designers to precisely specify the behavior of the draggable object. For those who are less comfortable with programming environments, a front-end is provided within the editor which translates a more graphical means of specifying object behavior into the grammar. For example, the system has editors for business cards which can be employed by users to create their own customized business cards. Similarly, the system provides a coupon editor and grammar which allows advertisers to design coupons, including its graphical appearance, terms, conditions, and other logic governing it such as expiry date, value, whether certain objects need to be purchased in order for the coupon to become active, etc.

Editors also allow draggable objects to be defined with more complex conditions as well as conditions which access information within the system such as the user's profile, as well as information outside of the system but accessible on the network, such as weather conditions. For example, a coupon can be defined to be worth a certain discount on a certain item if the customer is a man, and a different discount on a different item if the customer is a woman. Similar editors and grammars are provided by the system to allow the design of membership cards, receipts, credit cards, debit cards, etc. These are examples given only to illustrate the nature and flexibility of the editors and grammars provided by the system, and should not be construed as limiting. In addition, editors are used to provide definitions of their respective draggable objects which are then stored by the system. These definitions are then used to mint these objects when they are created.

The transaction authority 102 similarly provides programs and other facilities for defining, controlling, and managing the aforementioned access points. This is once again done by providing the access point owner with an editor in the form of a standalone program or program embedded in a web page containing a formal grammar which can be implemented as a programming or scripting language. This grammar is used by the access point owner to precisely specify the behavior of the access point, and once again a user-friendly front-end is provided within the editor so that people who are not comfortable with programming can nevertheless use the system without any problems.

By way of example, the editor can be used to define the location of a real-world advertising access point which is centered on a physical sign several feet away from a store's entrance and set it to dispense a certain type of coupon before noon, and a different type of coupon for the rest of the day. Similarly, the system can be used to define the location of a real-world access point centered on a billboard advertising the services of a real estate agent that spawns a business card dispenser which is set to dispense that agent's business cards. These management programs are not necessarily mutually exclusive, and can all be subprograms in a larger management program. For example, a store owner can use the same program to define the location and behavior of a coupon dispenser on the store's web page, the location and behavior of a coupon dispenser spawned by the cash register, the location and behavior of a coupon dispenser spawned by an access point in the plaza in front of the shop, as well as a business card dispenser online, and another one at the cash register. These are examples given only to illustrate the nature and flexibility of the editors and grammars provided by the system, and should not be construed as limiting.

In addition to letting the user interact with businesses and other institutions through access points both online and in the real world, the system also allows users to interact with each other. Users are able to use it to build a social network by creating contacts with other users, and even with businesses. Users can also import contacts from address books and other social networks. Users can then use the electronic wallet 7 to transfer money, gift cards, business cards, etc. with their contacts who also have accounts with the transaction authority, provided that the object is transferable and/or shareable. The system maintains a record of the chain of custody for each object in the system. For example, it can track each individual coupon to see where it originated, who shared it with whom, where it was spent, etc. This tracking ability is very useful for marketing and profiling purposes, allowing the system to bill advertisers only for advertisements that led to sales. Once again, this example should not be construed as limiting.

In addition, the system has many security features. For example, the electronic wallet 7 establishes and maintains an independent connection to the server. The vendor cannot access or tamper with this connection. With most payment systems, vendors have control over some aspect of the buyer's connection to the system, allowing for potential fraud to occur. The presently described system avoids this problem with its unique and secure transaction architecture and life cycle as further described herein.

Secured Transaction Configurations

The configurations described herein provide for private and secured electronic transactions. An electronic transaction generally involves three parties: a buyer, a seller (or vendor), and a transaction system (or transaction authority). The transaction authority holds one or more accounts for the buyer and the seller, and is authorized to facilitate transactions for them. In order for a transaction to proceed, it is necessary for the buyer, the seller, and the transaction authority all to share the details of the transaction.

The configurations disclosed herein provide for a different way to establish a transaction wherein the buyer does not need to trust the vendor with any secret information. In one embodiment, each party runs a piece of software which allows it to communicate with the other parties involved in the transaction over a network connection. The transaction authority executes an online server. The buyer executes an electronic wallet program which communicates with the transaction authority. The seller executes a server that communicates with the transaction authority and can also send messages to the electronic wallet. The vendor connection to the transaction authority is established and maintained without the aid of the buyer, protecting the vendor from tampering by the buyer. Likewise, the buyer's connection to the transaction authority is established and maintained without the aid of the vendor, protecting the buyer from tampering by the vendor.

In one embodiment, a transaction is established in a way that neither the seller nor the buyer must entrust the other with any secret information. The seller initiates the transaction by communicating the details of the transaction, including for example the shopping cart and shipping options, to the transaction authority. The transaction authority then establishes the transaction based on this information and generates a unique transaction identifier. The transaction identifier is then sent back to the seller, who transmits it over to the buyer. The buyer sends the transaction identifier back the transaction authority which uses it to associate that buyer with the pending transaction. The transaction authority then transmits the transaction's details to the buyer. These details can include any or all of the information uploaded by the seller as well as other information, such as the seller's name and the date, etc. The buyer then instructs the transaction authority to complete the transaction using the buyer's desired payment instruments and potentially shipping information without further interaction with the seller. Finally, when the transaction is completed by the buyer, the transaction authority informs the seller of successful completion.

In this manner, the transaction went from establishment to completion without the buyer or the seller ever transmitting any secret information to one another. Furthermore, the transaction was private because the seller never saw how the buyer paid, only that the buyer paid in full. The only fraud which could be perpetrated occurs if the seller transmits an incorrect transaction identifier to the buyer. But even then, since the buyer has an independent channel to the transaction authority, the transaction which the fraudulent identifier returns cannot be misrepresented by the seller to the buyer since its details, including its price, are being sent from the transaction authority to the buyer without tampering from the seller, so the buyer will quickly become aware that fraud is occurring. Furthermore, this sort of fraud exists for all possible payment systems, because a seller can always just present a different price at the check out than they do in the store, which amounts to the same thing.

In order for two independent parties, the buyer and the seller, to know that they are participating in the same transaction, they share at least one piece of data which defines the transaction. In one embodiment this data is shared in the form of the transaction identifier. Furthermore, this piece of data is a shared secret, not a secret which the vendor needs to keep hidden from the buyer or vice versa. In this embodiment, a minimum amount of sharing required for the various parties to know that they are participating in the same transaction. There are numerous ways in which three parties can achieve this minimal level of sharing. The ways of doing so are disclosed below.

The following disclosures make use of the term communications channel to describe the connections used by the various parties to communicate with one another to undertake the transaction. The communications channel can be persistent or intermittently generated on demand. The channels can make use of any kind of underlying communications technology such as the Internet, wireless communications such as Bluetooth, visual signals, the spoken word, the telephone, or any combination of technologies.

Figure 9:
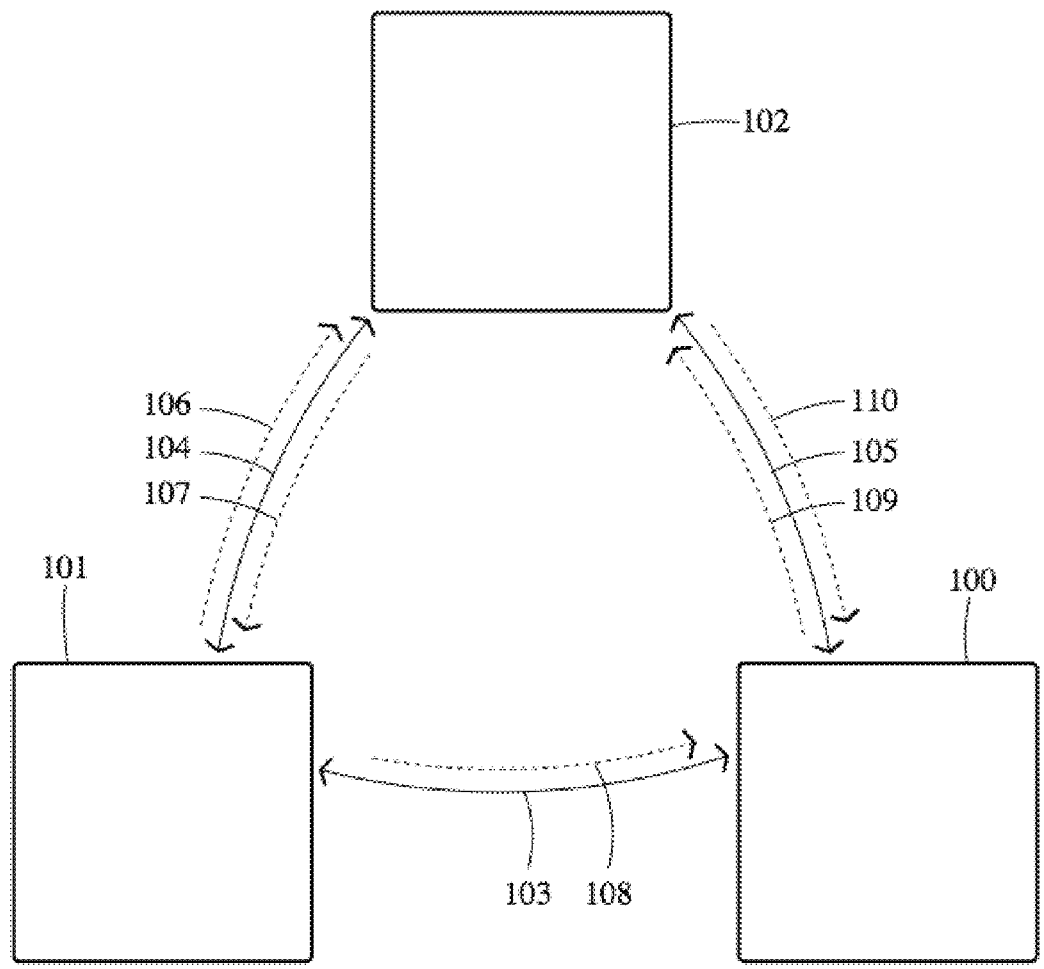
FIG. 9 illustrates one example embodiment of a transaction configuration for initiating and conducting a transaction between a buyer, e.g., through the user computer, and a seller, through a seller system.

As previously noted, the transaction authority 102 provides a mechanism for secured transactions between two entities in a transactions, for example, between a user computer configured to function in a buyer mode and a separate seller system or a seller subsystem configured to operate in a point of sale mode. FIG. 9 illustrates one example embodiment of a transaction configuration for initiating and conducting a transaction between a buyer, e.g., through the user computer 100, and a seller, e.g., through the seller system 101, facilitated by a transaction authority 102. FIG. 9 illustrates three communications channels, 103, 104, 105, 103 connecting the buyer and the seller, 104 connecting the seller to the transaction authority, and 105 connecting the buyer to the transaction authority. In one embodiment, communication channel 104 is established and maintained as needed by seller 101 and transaction authority 102 independently of buyer 100. Similarly, communication channel 105 is established and maintained as needed by buyer 100 and transaction authority 102 independently of seller 101. As described above, any or all of the three communication channels can be composed of various methods of communication and can be persistent or intermittently established.

FIGS. 10, 11, 12, 13, and 14 also make use of the same pieces to describe alternate transaction configurations. Turning to the details of the transaction configuration illustrated and described previously, when the buyer has selected one or more goods or services and indicated to the seller an intent to enter into a transaction using the transaction authority 102, the seller system 101 transmits (or sends) an instruction 106 over a communication channel 104 (e.g., through a network such as network 50) to the transaction authority 102. The instruction 106 for registration of a pending transaction for one or more goods or services, includes the details of the pending transaction (e.g., seller identity, description of items, quantity and price; description of shipping options, etc.) and the terms and conditions for the pending transaction (e.g., immediate sale, as is, etc.). The transaction authority 102 registers the pending transaction and generates a transaction identifier. The transaction identifier is associated with the pending transaction. The transaction system transmits the transaction identifier in an instruction 107 to the seller system 101 over the communication channel 104. The seller system 101 transmits an instruction 108 over a communication channel 103 containing the transaction identifier to the buyer through the electronic wallet 7 on the user computer 100.

The electronic wallet 7 through the user computer 100 transmits an instruction 109 including the transaction identifier to the transaction authority 102. The transaction authority 102 matches the transition identifier with the registered pending transaction. Once matched, the transaction authority 102 transmits over the communication channel 105 an instruction 110 to the electronic wallet 7. The instruction 110 includes the details of the transaction and terms and conditions of the pending transaction to buyer's electronic wallet 100.

At this point the transaction proceeds between the electronic wallet 7 in the user computer 100 and the transaction authority 102 over the communication channel 105. This interaction is directly between the electronic wallet 7 in the user computer 100 and the transaction authority 102 and is separate from seller system 101. When transaction authority 102 determines that electronic wallet 7 has fulfilled the terms and conditions of the pending transaction, the transaction authority 102 transfers resources from one or more buyer accounts associated with the electronic wallet 7 to one or more seller accounts associated with the seller system 101. The transaction authority 102 also is configured to provide separate confirmations of the transfer of resources to buyer's electronic wallet 7 and to the seller system 101 over the respective communication channels 105, 104. In addition, other data relevant for the transaction, for example, shipping details provided by the buyer may be transmitted through the appropriate communication channel. The seller can thereafter provide the goods or services to the buyer according to the terms and conditions of the transaction.

It is noted that there are many ways a buyer can select one or more good or service and indicate intent to use the transaction authority to undertake the transaction. For example, the buyer can make those selections on the seller's webpage. In another example, the buyer can select goods in a physical store and indicate verbally to a cashier the intent use the transaction authority to undertake the transaction.

In the configuration as disclosed, the seller and the buyer share only one piece of information, the transaction identifier. This information is strictly an identifier and conveys no sensitive information; rather it only serves to allow the transaction authority to match the buyer, the seller and the transaction. All sensitive information is exchanged directly between buyer and the transaction authority 102 over a separate channel, or between seller and transaction authority over a separate channel.

Figure 10:
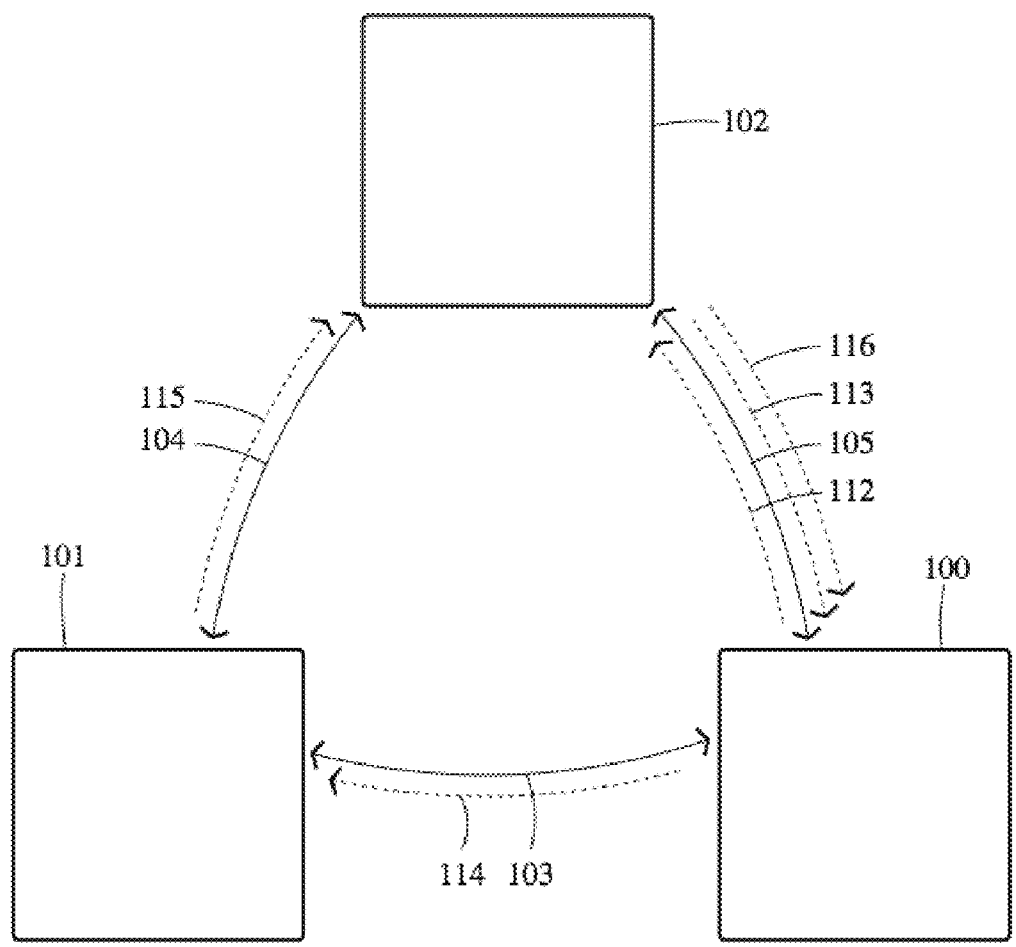
FIG. 10 illustrates one embodiment of a configuration for initiating and conducting a transaction between a buyer and a seller in which transaction identification information flows in the opposite direction from the direction described in FIG. 1.

FIG. 10 illustrates one embodiment of a configuration for initiating and conducting a transaction between a buyer and a seller in which transaction identification information flows in the opposite direction from the direction described in FIG. 1*d*. In this example case, a buyer has selected one or more goods or services for purchase. The buyer electronic wallet 7 on the user computer 100 transmits an instruction 112 over the communication channel 105 to the transaction authority 102 to register a pending transaction. The transaction authority 102 associates a transaction identifier to the pending transaction and transmits a message 113 containing the transaction identifier over communication channel 105 to the electronic wallet 7 on the user computer 100. The electronic wallet 7 on the user computer 100 transmits over communication channel 103 a message 114 containing the transaction identifier to the seller system 101.

The seller system 101 then transmits a message 115 containing the transaction identifier, details of the pending transaction and terms and conditions of the selected one or more goods or services to the transaction authority 102. The transaction system matches the transaction identifier with the pending transaction and associates the details, terms and conditions with the pending transaction. The transaction authority 102 transmits over communication channel a message 116 containing the details of the transaction and terms and conditions of the pending transaction to the electronic wallet 7 of the user computer 100 105.

At this point the transaction proceeds between electronic wallet 7 on the user computer 100 and transaction authority 102 over communication channel 105 separate from the seller system 101. When transaction authority 102 determines that the electronic wallet 7 on the user system 100 has fulfilled the terms and conditions of the pending transaction, the transaction authority 102 transfers resources from one or more buyer accounts to one or more seller accounts. The transaction authority 102 also provides separate confirmations of the transfer of resources to electronic wallet 7 of the user computer 100 and seller system 101 over the respective communication channel 105, 104. Other details optionally can be provided that correspond to the transaction, for example shipping details provided by the buyer. The seller then provides the goods or services to according to the terms and conditions of the transaction.

There are many ways a buyer can select one or more good or service and indicate intent to use the transaction authority to undertake the transaction. For example, the buyer can make those selections on the seller's webpage. In another example, the buyer can select goods in a physical store and indicate verbally to a cashier the intent use the transaction authority 102 to undertake the transaction. In addition, as noted previously, the transaction identifier provides a secured communication linkage for completing a transaction.

Figure 11:
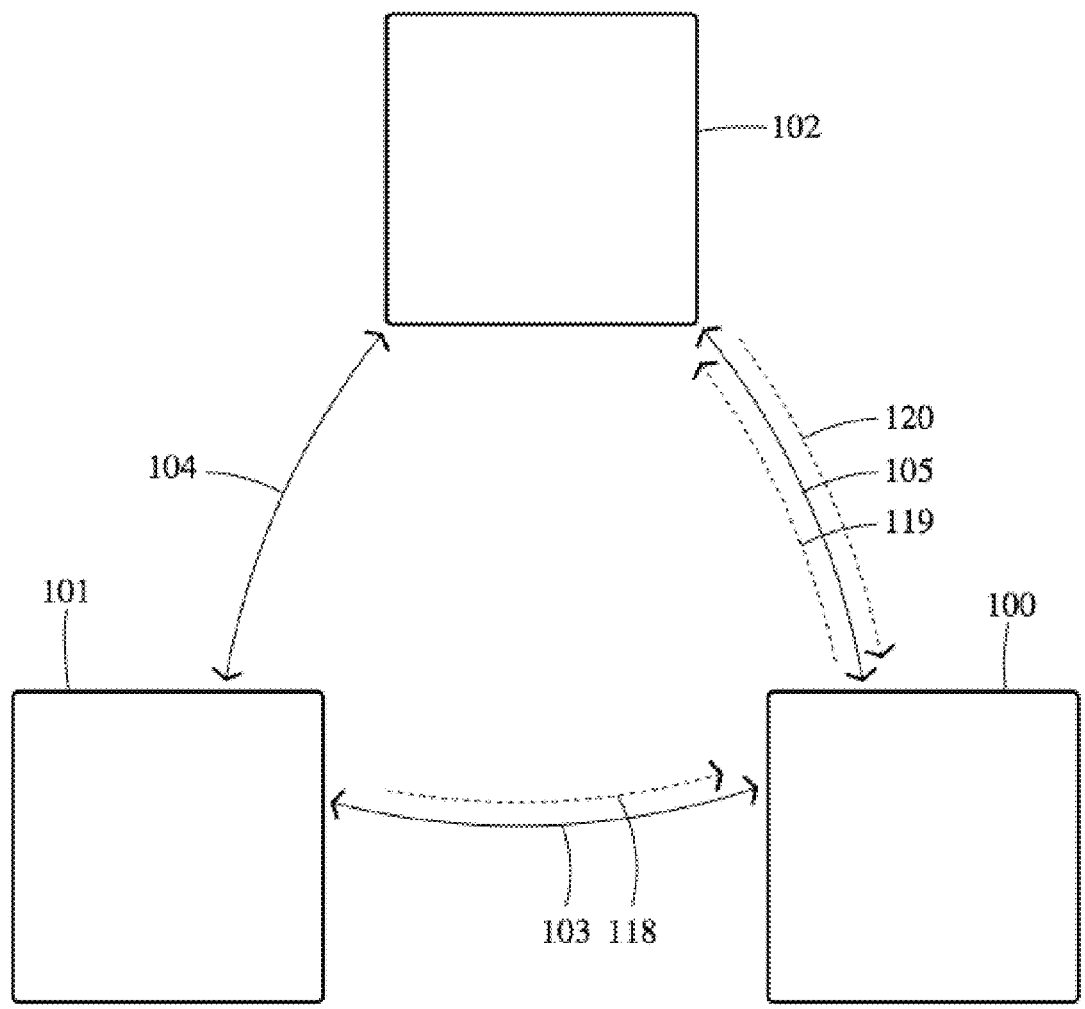
FIG. 11 illustrates an embodiment of a configuration for initiating and conducting a transaction between a buyer and a seller in which transaction identification information and the details of the goods or services in the transaction flow in the opposite direction from the configuration described in FIG. 1*d*.

FIG. 11 illustrates an embodiment of a configuration for initiating and conducting a transaction between a buyer and a seller in which transaction identification information and the details of the goods or services in the transaction flow in the opposite direction from the configuration described in FIG. 1*d*. In this configuration, the buyer has selected one or more goods or services. The seller system 101 transmits a digitally signed message 118 with a seller public identification (ID) along with the details of the pending transaction and terms and conditions of the pending transaction to electronic wallet 7 on the user computer 100 over communication channel 103. The electronic wallet 7 transmits via the user computer 100 a message 119 containing the digitally signed message 118 to the transaction authority 102 over communication channel 105. The electronic wallet 7 also transmits an instruction to the transaction authority 102 to register a pending transaction.

The transaction authority 102 verifies the digitally signed message 118 of the seller. If verified, the transaction authority 102 registers a pending transaction. The transaction authority 102 also associates the details of the pending transaction and terms and conditions corresponding to the pending transaction. The transaction authority 102 then transmits the details of the transaction and terms and conditions of the sale to the electronic wallet 7 on the user computer 100.

At this point the transaction proceeds between electronic wallet 7 on the user computer 100 and transaction authority 102 over communication channel 105, separate from the seller system 101. When transaction authority 102 determines that the buyer has fulfilled the terms and conditions of the pending transaction, the transaction authority transfers resources from one or more buyer accounts to one or more seller accounts. The transaction authority 102 also can provide separate confirmations of the transfer of resources to the electronic wallet 7 and the seller system 101 over the respective communication channels 105, 104. The seller thereafter can provide the goods or services to the buyer according to the terms and conditions of the transaction.

There are many ways a buyer can select one or more good or service and indicate intent to use the transaction authority to undertake the transaction. For example, the buyer can make those selections on the seller's webpage. In another example, the buyer can select goods in a physical store and indicate verbally to a cashier the intent use the transaction authority 102 to undertake the transaction. In addition, as noted previously, the transaction identifier provides a secured communication linkage for completing a transaction.

Figure 12:
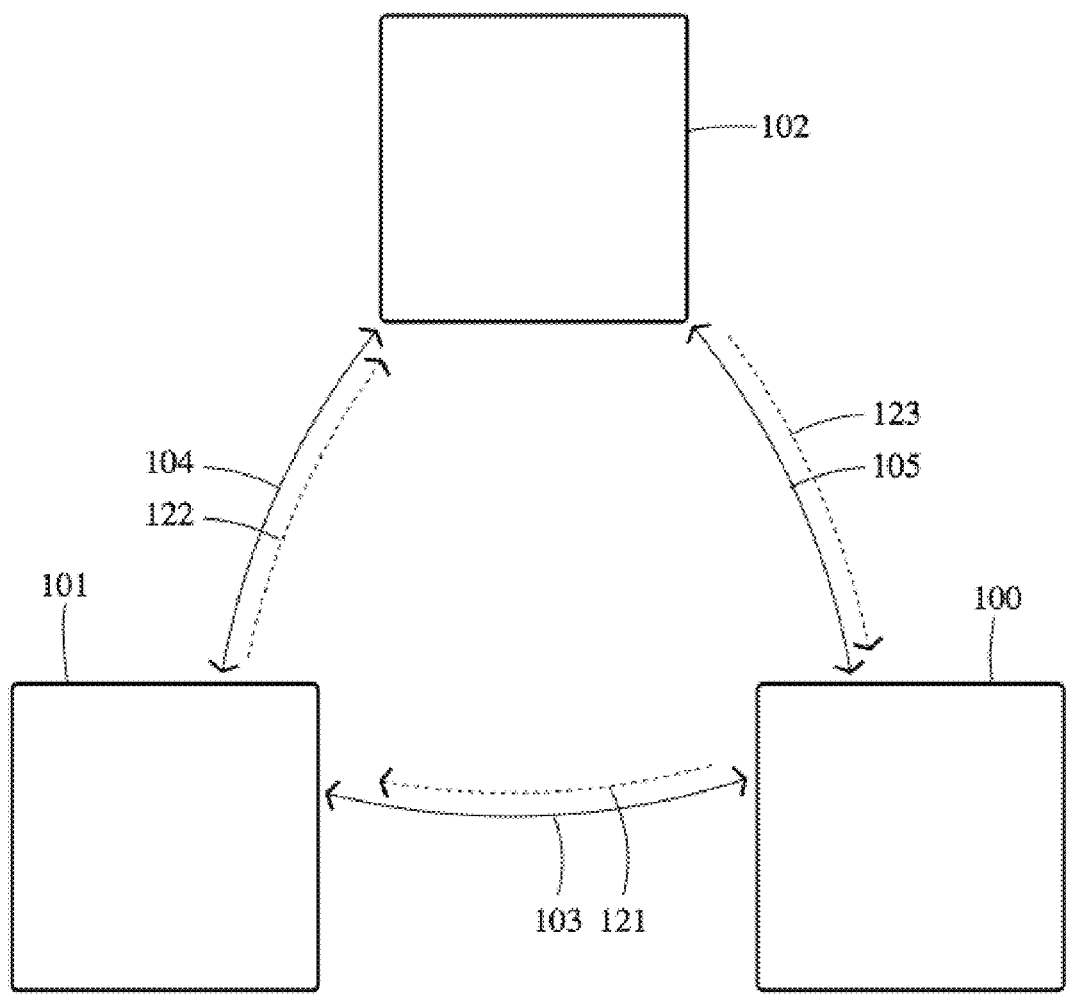
Turning now to FIG. 12, illustrated is an embodiment of a configuration for conducting a transaction between a buyer and a seller in which the buyer provides the seller with a public ID to initiate a transaction.

Turning now to FIG. 12, illustrated is an embodiment of a configuration for conducting a transaction between a buyer and a seller in which the buyer provides the seller with a public ID to initiate a transaction. In this configuration, when the buyer has selected one or more goods or services for a transaction, the buyer transmits through the electronic wallet 7 of the user computer 100 and over communication channel 103, a message 121 containing public ID of the buyer. The seller system 101 transmits a message 122 containing details of the pending transaction and terms and conditions of the transaction involving the selected goods or services to the transaction authority 102. The seller system 101 also transmits to the transaction authority 102 the public ID of the buyer and an instruction to register a pending transaction. The transaction authority 102 registers the pending transaction. In addition, the transaction authority 102 associates the details of the transaction and the terms and conditions of sale with the pending transaction. The transaction authority 102 also matches the public ID of the buyer with the buyer account. The transaction authority 102 then transmits over the communication channel 105 to the electronic wallet 7 on the user computer 100, the details of the pending transaction and the terms and conditions associated with the pending transaction.

At this point the transaction proceeds between electronic wallet 7 on the user computer 100 and transaction authority 102 over communication channel 105, separate from the seller system 101. When transaction authority 102 determines that the buyer has fulfilled the terms and conditions of the pending transaction, the transaction authority transfers resources from one or more buyer accounts to one or more seller accounts. The transaction authority 102 also can provide separate confirmations of the transfer of resources to the electronic wallet 7 and the seller system 101 over the respective communication channels 105, 104. The seller thereafter can provide the goods or services to the buyer according to the terms and conditions of the transaction.

It is noted that there are many ways a buyer can select one or more goods or services and indicate intent to use the transaction authority 102 to undertake the transaction. For example, the buyer can make those selections on the seller's webpage. In another example, the buyer can select goods in a physical store and indicate verbally to a cashier the intent use the transaction authority to undertake the transaction.

In addition, in this configuration the electronic wallet 7 on the user computer 100 transmits no private or confidential information to the seller system 101. The seller system 101 shares only public information with the buyer. All sensitive information is exchanged directly between electronic wallet 7 on the user computer 100 and the transaction authority 102 over a communication channel that is separate from the communication channel between the electronic wallet 7 on the user computer 100 and the seller system 101.

Figure 13:
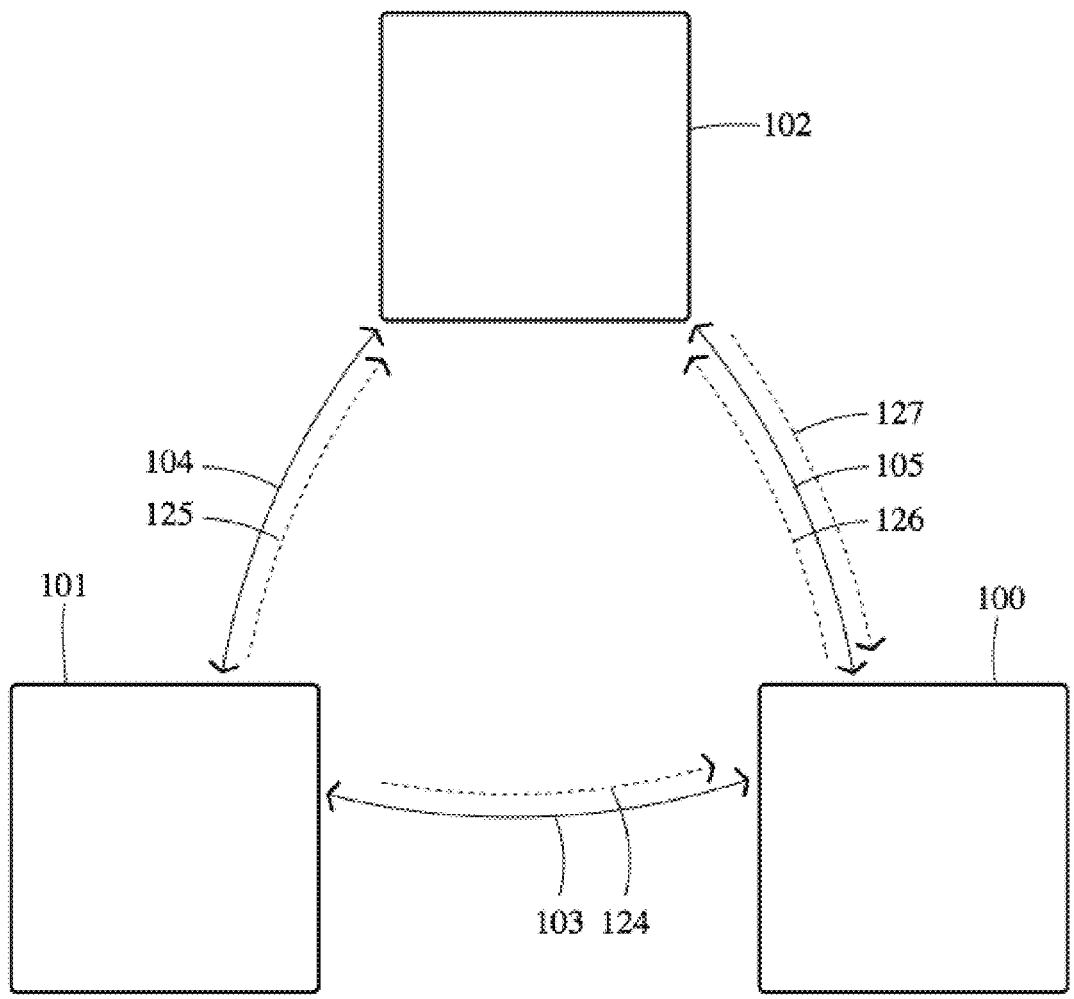
FIG. 13 shows an embodiment of a configuration for conducting a transaction between a buyer and a seller in which the seller generates a transaction identifier to initiate a transaction.

FIG. 13 shows an embodiment of a configuration for conducting a transaction between a buyer and a seller in which the seller generates a transaction identifier to initiate a transaction. In this configuration the buyer has selected one or more goods or services and indicated to the seller system 101 an intent to enter into a transaction using the transaction authority 102. The seller system 101 generates a transaction identifier that is unique relative to other transaction identifiers in the set of transactions operated by the transaction authority 102. There are many ways to ensure that the seller generates identifiers that are unique. For example, large numbers of unique transaction identifier could be given to the sellers in advance of any transactions, a mathematical formula could be communicated to the seller by the transaction authority when the seller creates an account with the authority, which could generate the transaction identifiers uniquely for that seller such as an equation which simply concatenates a transaction identifier that is unique in the seller's system onto the end of the seller's public identifier.

The seller system 101 also transmits a message 125 containing the transaction identifier over communication channel 104 to transaction authority 102. In addition the seller system 101 transmits to the transaction authority 102 an instruction (or in same instruction) to register the pending transaction. The seller system 101 also transmits to transaction authority 102 over communication channel 104, the details of then pending transaction and the terms and conditions associated with the transaction for the goods or services selected by the buyer. The seller system 101 also transmits a message 124 containing this transaction identifier over communication channel 103 to the electronic wallet 7 on the user computer 100. The electronic wallet 7 on the user computer 7 also transmits a message 126 containing the transaction identifier to the transaction authority 102 over the communication channel 105. The transaction authority 102 then matches the transaction identifier received from the electronic wallet 7 with the transaction identifier associated with the pending transaction. If the match is confirmed the transaction authority 102 transmits a message 127 containing the details of the transaction and terms and conditions of sale to the electronic wallet 7 on the user system 100.

There are many ways a buyer can select one or more good or service and indicate intent to use the transaction authority to undertake the transaction. For example, the buyer can make those selections on the seller's webpage. In another example, the buyer can select goods in a physical store and indicate verbally to a cashier the intent use the transaction authority 102 to undertake the transaction. In addition, as noted previously, the transaction identifier provides a secured communication linkage for completing a transaction through separation of the transaction along separate communication links.

Figure 14:
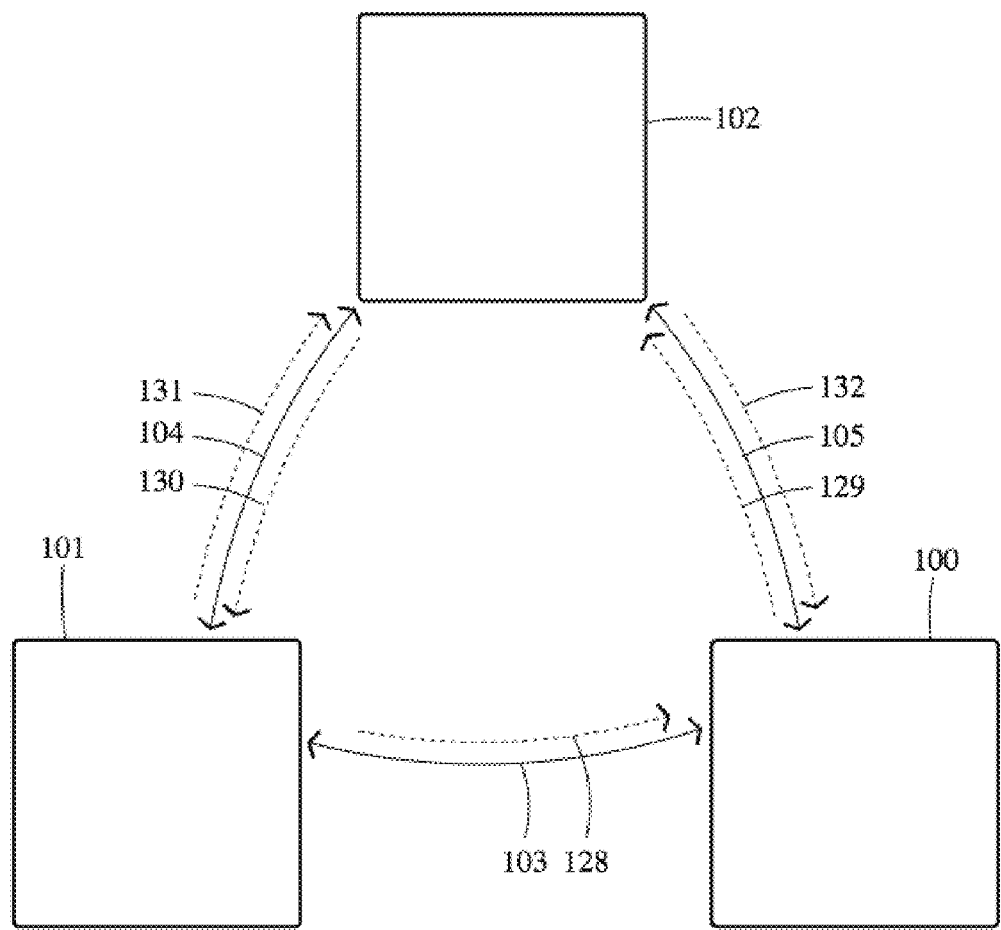
FIG. 14 shows an embodiment of a configuration to conduct a transaction between a buyer and a seller in which the seller sends details of a pending sale to the buyer to initiate the transaction.

FIG. 14 shows an embodiment of a configuration to conduct a transaction between a buyer and a seller in which the seller sends details of a pending sale to the buyer to initiate the transaction. Here, the buyer selects one or more goods or services and indicates to seller system 101 an intent to enter into a transaction using the transaction authority 102. In response, the seller system 101 transmits a message 128 containing details of the pending transaction and terms and conditions for the pending transaction for the selected goods and services to the electronic wallet 7 of the user computer 100 through the communication channel 103. The seller system 101 also transmits the seller system 101 public ID to the electronic wallet 7. The electronic wallet 7 in response transmits to the transaction authority 102 over communication channel 105 a digital message 129 containing the message 128 from the seller system 101 and an instruction to register a pending transaction.

The transaction authority 102 registers the pending transaction and matches public ID of the seller system 101 with an account corresponding to the seller system 101. The transaction authority 102 thereafter transmits a message 130 to the seller system 101 over communication channel 104. The message includes the details of the pending transaction and the terms and conditions of the pending transaction. The seller system 101 matches the details in received message 130 from the transaction authority 102, the details of the original message 128, and transmits in response a message 131 to the transaction authority 102 verifying the authenticity of the pending transaction. The transaction authority 102 in response transmits to the electronic wallet 7 on the user computer 7 over communication channel 105 a message 132 containing a confirmation that the transaction can proceed, A variation of this configuration involves the user completing the transaction before the message 130 is sent to the seller system asking of verification of the transaction details.

At this point the transaction proceeds between electronic wallet 7 on the user computer 100 and transaction authority 102 over communication channel 105, separate from the seller system 101. When transaction authority 102 determines that the buyer has fulfilled the terms and conditions of the pending transaction, the transaction authority transfers resources from one or more buyer accounts to one or more seller accounts. The transaction authority 102 also can provide separate confirmations of the transfer of resources to the electronic wallet 7 and the seller system 101 over the respective communication channels 105, 104. The seller thereafter can provide the goods or services to the buyer according to the terms and conditions of the transaction.

It is noted once more that there are many ways a buyer can select one or more good or service and indicate intent to use the transaction authority to undertake the transaction. For example, the buyer can make those selections on the seller's webpage. In another example, the buyer can select goods in a physical store and indicate verbally to a cashier the intent use the transaction authority 102 to undertake the transaction. In addition, as noted previously, the transaction identifier provides a secured communication linkage for completing a transaction through separation of the transaction along separate communication channels.

Numerous transaction configurations have been disclosed herein, and it is possible for a person skilled in the art to produce others based on minor variations of those already disclosed. For example, there is another transaction configuration which is similar to those disclosed in FIG. 5. In FIG. 5, the seller generates a transaction identifier and shares it with the buyer and the transaction authority. Similarly, it is possible for the user to generate the unique transaction identifier by, for example by concatenating the user's identifier with a suffix unique to any such suffix in any transaction the user has already undertaken, or some other method, and then sharing the transaction identifier with the other parties. Similarly, other minor variations exist which include making changes to the disclosed transaction configurations such as switching the order of some of the configuration's steps, such as sending the various messages in a slightly different order.

If at any time during the initialization of any of these transaction configurations a step fails, for example one party uses the conveyed transaction identifier with the transaction authority, but the authority has no record of the transaction, or the transaction is not in the correct pending state, or there are some other conditions on the transaction which cannot be met such as the transaction violating the conditions of parental controls put in place by the guardian of a user who is a minor, then the violations are stored at the transaction authority 102 for security and debugging purposes and appropriate messages are sent to the parties. If the failure occurs after the user has applied some payment instruments, the failure rolls back their application.

In the preceding descriptions of the various transaction configurations, terminology specifically related to a payment transaction was used solely for the purposes of clarity and concreteness. All multi-party transactions facilitated by the transaction authority can be described in terms of any of the preceding transaction configurations. As such, the fact that terms such as 'buyer' and 'seller' were used above should not be construed as limiting, since the same configurations can be used to undertake login transactions, digital object download transactions including coupon, business card, membership card, gift card, credit card, etc. download transactions, digital object upload transactions, etc. Detailed example embodiments of many of these transactions are provided below. Most are described in terms of the first transaction configuration outlined above but with more details specific to the embodiments' contexts added. Those skilled in the art should be able to examine the relationship between the first transaction configuration and the detailed example embodiments of the various concrete transactions shown below and produce similar detailed example embodiments for each of the transactions based on any of the other transaction configurations. The same is true for transaction types which have only been alluded to briefly since they work in very similar manners to the others. For example, all the digital object upload transactions (those which use object receptacles) use essentially the same data flow and all the digital object download transactions (those which use object dispensers) use essentially the same data flow.

Security Configurations

The configurations as disclosed may integrate various security features to further enhance overall security. For example, in one embodiment the electronic wallet 7 can be configured to require a log-in. A user is typically asked for a username and password when logging in to a system. This login process may include a combination of actions. In addition to convention password access the electronic wallet 7 can be configured to use other features found on the user's computing device such as an attached camera for photo validation during log in. The photo configuration can be further processed by taking various photos of a user face from slightly different angles to reconstruct a partial 3D point cloud of the user face. This can be compared to earlier point clouds associated with the user's account, or more generally a master point cloud associated with the user's account learned by the system over many log in events by that user, to help identify the user. Each successful log in can have its point cloud stored or incorporated into the learned master point cloud. The reason to use a point cloud instead of a 2D image of the face is to keep people from simply holding a photo of the user up to get past the security measure. Instead of a point cloud, some other means of visual comparison can also be used. There is much published work about such details.

In addition to photo comparison or as an alternate, a user may be required to provide some other form of biometric scan, for example, a retina scan, a thumbprint, or speech pattern. The user can input further security questions and their answers through the electronic wallet 7. The user can also answer predefined security questions, which he has already input the answers to at some earlier time. The user can also input a "roaming password", a password that is demanded the first time a user uses an electronic wallet on a computing device from which he/she has not logged into before.

Another optional security requirement may require the user to connect the electronic wallet on a trusted computing device (i.e., one from which the user has successfully logged into previously) to the electronic wallet on a user's other computing device in a secure manner either via a wireless protocol like Bluetooth or over a cable such as USB. The presence of the trusted electronic wallet could be used as further proof that the correct user is attempting to log in. In this manner, the user could use the electronic wallet on the user mobile device to aid in the login process of the electronic wallet on a desktop computer.

In addition to user supplied details for security, the user computing device can be secured through machine profiling. The configurations disclosed herein are considered "out of the browser sandbox." This means that the electronic wallet program has access to machine hardware and software information which would otherwise not be available if the program were hosted in a sandbox environment such as a web page. Therefore, the user computer can be examined in order to create a "fingerprint" of the machine which can aid in the identification of the user. Examples of pieces of data which can be used to produce such a "fingerprint" are the machine's MAC address, the machine's CPU type, the machine's name, the operating system's version, video card manufacturer, BIOS version, which type of anti-virus is installed, etc. Any piece of hardware or software data discoverable by the system can be used. This information can then be forwarded to the payment system during account creation and/or log in. In addition, levels of trust can be assigned to the electronic wallet 7's log in operation by the transaction authority 102 depending on various pieces of information such as how many times the user input the user password incorrectly, the user's IP address, the country the user is in, the user's computer's "fingerprint", etc. If the machine is different than any the user has ever logged into the transaction authority from before, the transaction authority can require the user to answer more security questions, do a biometric scan, make a telephone call, or perform other security tests.

To enable this configuration, a transaction authority 102 server can maintain records associated with the user's account that store the "fingerprint" of every computer which the user has ever logged in from, as well as dates and times when the user was logged in from those computers. The server can also cross-reference these computer "fingerprints" with the IP address of the connection and thereby the approximate physical locations of the computers themselves during each session.

To make the "fingerprint" more difficult to reverse engineer, it may be encrypted using a key unique to each user's account which is accessible only to the real electronic wallet's signed assembly. In some configurations only the transaction authority 102 can decrypt the data, so that it is harder for a hacker to see which pieces of hardware and software data the electronic wallet is consider for that user. Every user can be asked for a different ordered set of hardware and software data.

In one embodiment, upon attempting to log on to the electronic wallet 7 for the first time on a specific computing device, the electronic wallet 7 enters into a secure connection with the transaction authority 102 (using for example SSL) and the user enters the user username and password. This information is sent to the transaction authority 102 along with a bit telling it that this is the first time the user as ever logged in from this computer. The transaction authority 102 reacts to the bit by requesting the roaming password from the user. When the user successfully inputs the roaming password a key-pair associated with the user's account is sent to the electronic wallet and stored in the operating system's keystore in such a way that only the correctly signed assembly of the electronic wallet 7 can access it. The private-key in from the key-pair is used to decrypt the instructions defining the ordered set of hardware and software statistics which the electronic wallet must send back.

The electronic wallet 7 collects all the statistics that have been predefined by the transaction authority as being possible hardware or software statistics of interest and selects the desired ordered set from that larger set. The current time and date are added to this data, along with the computer's IP address, and any other such piece data of data which can keep the encrypted string from being intercepted and simply reused at will. The public key from the key-pair is then used to encrypt the data into one big string and it is sent to the transaction authority 102. The transaction authority 102 decrypts the data, compares the time and IP address to the current time and the electronic wallet's IP address, and if they are the same, associates this "fingerprint" with the user's account. The instructions used to generate the "fingerprint" were already automatically associated with the user's account when the account was created at some previous time.

The next time the user logs in from the same computing device, the electronic wallet 7 enters into a secure connection with the transaction authority 102 as before. The user then enters the user username and password into the electronic wallet. This is sent to the server and validated but this time, the bit described above used by the electronic wallet 7 to claim whether it has logged in from that specific computing device previously or not is set to claim it has. If the login information is correct, the transaction authority 102 requests the key-pair which the electronic wallet 7 has stored in the key-store of the user's operating system the first time it logged in from that computing device, which only it should be able to recover. If the electronic wallet 7 fails to send this, the user is asked for the user roaming password (and must potentially complete other security tasks as well) again, and the validation process continues as above. If the electronic wallet 7 does provide the keys, the "fingerprint" instructions are sent to the user's electronic wallet 7 which follows them to produce the "fingerprint" string as above. If the "fingerprint" does not match any associated with that user's account, then the user is asked for the user roaming password (and must potentially complete other security tasks as well).

If the time or internet protocol (IP) address checks described above fail, then the security tasks which the user must complete are more difficult, since it is likely that their failure would be caused by attempted fraud. In contrast, a computer upgrade could cause the "fingerprint" not to match with those associated with the user's account at the transaction authority. When a user first creates an account with the transaction authority 102, the fingerprinting instructions as well as the key-pair are generated and associated with the user's account, and the user sets the user username and password as well as roaming password and security questions, if the user wants to be able to log in from a different location.

In addition to the above, the transaction authority can also keep a table of all strings that have ever been entered in attempts to log in as that user along with the count of how many times each one has been entered. This can be used to determine whether a potential hacker is attempting to make a systematic search of the space of passwords trying to determine what the user's password might be. The amount of coverage as well as related statistics can be stored so that each new log in attempt only requires a check whether that password has been used before, and then a quick update to the coverage statistics rather than a complete recalculation. The same sort of password logging can be used for any of the security data requested from the system from the roaming password, to biometrics, to the hardware and software fingerprinting.

Another security feature is anti-screen logging. Key-logging is a simple malware attack used on computers to spy on what users are typing. There are several ways to fight this. Some programs use visual representations of keypads to allow a user to log into their system. Such keypads can randomly assign numbers to each rendered key so that the user can log into a system using the mouse, and the position of the mouse clicks cannot be "spied on" to ascertain the password. Such systems can be overcome by "screen-logging" in which a piece of malware repeatedly takes screen-shots of the user's screen contents in order to map the user's mouse clicks to the randomized keys. In order to take a screen-shot, the malware usually gets access to the portion of the operating system's memory in which the operating system is rendering the screen contents. This memory is not protected and is easy to gain access to.

Parallel to this, the system can use hardware-aided rendering of areas of the screen contents. While the computer's operating system is usually responsible for rendering the contents of the screen via the memory mentioned above, programs have the ability to make dedicated hardware render a portion or all of what they need drawn to the screen. The operating system leaves holes in its rendering of the screen contents in the areas which are to be drawn by the hardware in this way. The hardware produces renderings for these areas and stitches these images together with the rest of the screen contents as drawn by the operating system and then sends the final image to the physical screen.

The embodiments disclosed combine the technology of a randomized keypad with hardware rendering to produce a keypad which cannot be screen-logged by simply examining the operating system's unprotected video memory. This is useful because numerous pieces of malware exist which actively attempt to steal online identities by spying on a user's input using a combination of key/mouse/screen logging. The present embodiment is much more secure against all of these attack techniques.

One way to make use of the hardware compositing is to dynamically generate and display a video which displays the keypad in such a way that the user is not aware they are looking at a video. By capturing mouse events over the video, it can be made interactive. In other words, one can make the image displayed by the video change in response to mouse clicks within the video. Standard techniques can then be used to render the video via the dedicated hardware instead of the operating system, for example using YUV-overlay. Other techniques not involving the user of a video are well understood and are often used in the computer gaming industry where the hardware overlay is used for speedy rendering rather than security measures.

In circumstances in which a payment receptacle, further described below, is not part of the electronic wallet 7, a final request for confirmation may be displayed in the electronic wallet 7 when the user completes a transaction, showing all the details of the transaction, for example, contents of a shopping cart and seller domain, so that the user has a final chance to cancel the transaction. The confirmation user interface can be part of the receipt which the user receives at the end of the transaction. By placing the confirmation on the receipt, the user can see what is being confirming while faced with the task. The confirmation request can be associated with a timer which cancels the transaction if the user does not accept it using the interface before the timer expires.

Numerous methods can be used to communicate between local pieces of the system securely. One method that could be used to make sure that only a real copy of one piece of the system can communicate with another piece locally on one computer is to sign the assemblies of these pieces and then provide a secure location on the computing device, such as the operating system's key-store, which holds cryptographic keys which can only be accessed by programs with an assembly that is signed by the proper key. A properly signed assembly can access a key pair that is used for all local communication on the same computer, for example a coupon dispenser communicating with the electronic wallet 7 using an inter-process operating system message. Any program that cannot access the key store due to an assembly that is not properly signed can then not communicate with the other pieces and therefore not pretend to be a piece of the system. Whenever communication between local pieces of the system is described, it is assumed that they can function is such a way. Similarly whenever communication between remote pieces of the system is described, it is assumed that they can function in a way which is secure, for example using SSL 3.0 over the connection, or some other such means. Generally, communication between separate pieces of the described configurations, which are running as separate processes on the same computing device, can use numerous methods to communicate, for example using sockets, shared memory, operating system messages, the file system, communication to back to a remote server, etc.

Timeouts may also be used in various contexts. After a transaction is initiated, a timer starts, and if the correct sequence of events and messages does not occur within a certain interval of time, the transaction is cancelled, thereby reducing or minimizing the amount of time a malicious adversary has to mount an attack. Similarly if an electronic wallet 7 that is logged in remains unused for too long a period of time, it can lock itself, requiring the user to re-authenticate in order to open it. The re-authentication can be done with a different password than the user usually uses, or just with a biometric scan like a thumbprint. The period of time which the electronic wallet 7 waits before locking can be set as a user preference associated with the user's account. The timeout period can be different for different versions of the electronic wallet 7.

The electronic wallet 7 provides an interface which allows parents to set controls so that children cannot misuse the electronic wallet 7. This includes account and password restrictions, as well as restricting the types of websites and products on which the children can use their electronic wallets, and the monetary value of a transaction or aggregation of transactions.

Embedded user controls such as dispensers and receptacles can be embedded in third-party webpage via frame or iframe tags whose addresses are those of a domain of the transaction authority 102 so that they have access to cookies which only pages delivered by transaction authority's domain have and can be used in security checks, and also so that they are not accessible by any scripting code on the hosting page. Alternately, they can also be embedded directly in a third-party webpage, without the use of a frame pointing to the domain of the transaction authority 102. Even when embedded in third-party web pages, such dispensers and receptacles remain secure because the digital objects dragged from or to them carry no private information, but only identifiers which act as pointers which are only understandable to the transaction authority 102 so are not useful if intercepted fraudulently.

The disclosed configurations may also make use of watermarks and security cookies. A user's security cookie exists as a cookie in the cookie-store of each of the browsers he/she may use to make transaction using the payment system. It is an encrypted cookie that holds a unique string associated with the user's user account. This data is different than the user's user ID or password. Since only pages from domains controlled by the payment system operator can decrypt and read the security cookie this data it can be used to make sure that fake receptacles cannot phish for payment data and fraudulently try to apply the payment to a place the user does not intend.

Similarly, each user may have one or more images associated with an account, which forms a watermark for the user. The watermark may contain other data as well, such as colors and patterns and strings. If a receptacle is provided by the correct domain in an iframe and is therefore able to read the security cookie, it can transmit it in an encrypted form back to the system and receive the user's watermark. Alternatively, the watermark itself can be stored as a security cookie. This watermark can then be displayed in the receptacle in order to give the user visual feedback that the receptacle is not fraudulent.

The electronic wallet can contain a news feed which informs the user of all recent interesting activity related to the user's account. For example, it can inform the user of recent transactions. This can be a security feature as it provides a convenient interface for marking a transaction as fraudulent, which the user would use if he/she logs in and notices a transaction they did not make highlighted in the news feed. Similarly, the news feed can display log in information. If, for example, the last log in occurred from an IP address that is in a very different place when it is geo-located than the log in before that one, this can be displayed prominently as a warning in the news feed, and the user can be given instructions what he/she should do if the log in was not performed by them. To create such a news feed, every event in the system, such as a log in or the completion of a transaction can create an entry associated with the user's account which describes the details of the event. The events could be of different types which could determine how they are displayed in the news feed and what level and type of interactivity they have.

Next, the system can be configured with role-specific identifiers. Every entity in the system, including user accounts and digital objects can have a variety of identifiers which are each only used for specific purposes. This allows information to be controlled in specific ways. For example, during the coupon download procedure as described below, a coupon identifier can be transmitted from the coupon dispenser to the electronic wallet in order for the user to claim the coupon. The identifier that is transmitted in that context could be the coupon's "Download Identifier", which could only be used to download the coupon, but could not be used to spend it. When a user applies the coupon to a transaction, the user's electronic wallet has to transmit a different identifier to the transaction authority, the coupon's "Spend Identifier". Similarly, when sharing an instance of a coupon with another user its "Share Identifier" might be sent, which allows the other user's electronic wallet to instruct the coupon authority to access the coupon instance so the coupon authority can mint a new instance based on its definition, but would not provide the recipient with the "Spend Identifier" of the first user's coupon instance. This provides each entity related to an account many unique identifiers, each of which can only be used to uniquely specify the entity in a specific context.

When a user connects to a cash register using the mobile electronic wallet 7, the user can transmit the user "Public Identifier" to the cash register to allow it to download the user's public name and public image for disambiguation and identification purposes. The transaction authority 102 on the other hand would use the user's "Private Identifier" for all of its internal dealings with the user's account. This identifier never leaves the transaction authority 102 because the user's other role-specific identifiers are used outside. Another example is for a money transfer. The receiving user is able to see who the transfer was from, but only from the sender's "Public Identifier". The same is true for contacts in the social network. It is noted that typically every type of entity has at least a "Private Identifier" and a "Public Identifier", but some may have many more if they are entities, such as most of the digital object, that are used in various contexts.

Payment Functional Overview

A transaction configuration includes at least two roles. One role includes users. Users are people who use the payment configuration to conduct financial transactions through the electronic wallet 7. Financial transactions include, for example, payment for transactions using their electronic wallets 7 or to transmitting money to one another using money transfers through the electronic wallet 7. The other role is the seller (or vendor). The seller is an individual or institution that uses the payment configuration as a mechanism to permit their customers to pay for goods or services. In this context, the terms seller can also extent to entities that collect donations, e.g., goodwill institutions or religious institutions.

Transaction configuration may also include a trusted transaction authority as described earlier which can facilitate the transaction between the buyer and seller.

As further disclosed herein, the transaction configuration includes the electronic wallet 7 executing on the user computer 100. The electronic wallet 7 includes a graphical user interface configured to receive input from a user for interaction with the electronic wallet 7. The user interface of the electronic wallet user 7 can be configured for "drag and drop" interaction. The drag and drop interaction can be configured for use on touch sensitive screens of a user computer 100 and non-touch sensitive screens of a user system, for example, having a navigation joystick or mouse control. The drag and drop system is configured to drag and drop payment instruments and identification into payment receptacles in order to respectively pay for purchases and fill out shipping addresses. In one embodiment the electronic wallet 7 is pre-populated with digital versions of familiar objects which are commonly found in real wallets. The digital objects include a digital representation of a physical manifestation or a logical manifestation when a physical manifestation may not exist (e.g., a membership card that is only provided in graphical form as a card on a screen of a user computer 101 and not in physical form). More details on the user interface objects are provided elsewhere in the disclosure with additional description of the user interface.

In the preferred embodiment of the system, each digital object associated with a user's account is represented in the user's electronic wallet 7 in part by an identifier which the transaction authority 102 can use to identify the records related to the digital object which is at the transaction authority 102. When the user initiates the drag of the graphical representation of one of the digital objects stored in the electronic wallet 7, the electronic wallet 7 creates an entry in a table (drag table) which stores the identifier of the object and a number which is randomly generated at that time and is not found elsewhere in the table. The random number is part of the data conveyed by the drag.

If the graphical representation of the digital object is successfully dropped into a receptacle, then the random number is sent from the receptacle back to the electronic wallet by means such as an operating system message, shared memory, a socket connection, the file system, etc., which allows the electronic wallet 7 to match the number in the table to retrieve the digital object's identity. The entry containing the random number and the identifier is then removed from the table. This bounce back shows the electronic wallet program that the digital object was successfully dragged and dropped into a receptacle and prompts the electronic wallet to send an instruction containing the digital object's code to the transaction authority 102 in order to carry out the appropriate operation.

If the drag is not successful, the electronic wallet 7 removes the entry from the table. In the detailed embodiments of the various transactions described later, it is often mentioned that the user controls, such as the dispensers and receptacles, can communicate directly with the transaction authority, or alternately can communicate with the transaction authority via the electronic wallet. The first method is easily enabled using AJAX or sockets, or something similar. The use of the drag table is a method which enables the second method of communication. It does so in a way that is very secure, since the user controls are not even passed the digital objects' identifiers with the transaction authority let alone data that is meaningful if stolen.

In addition, the electronic wallet 7 is secured from phishing and similar security threats. The electronic wallet comprises in one embodiment a standalone program that is not susceptible to phishing like web-based systems. As a standalone program the electronic wallet 7 has access to information which is unavailable to programs located in web browsers, such as the hardware configuration information on which the application is executing, thereby making it possible to enhance security beyond what is possible in payment systems located in web browsers. In addition, the transaction architecture ensures that no user secrets are ever shared with a seller, therefore further securing the system from seller fraud.

The electronic wallet 7 is also suited for micropayment type applications in a cost effective configuration. The drag and drop architecture applied to a "coin purse" user interface of the electronic wallet permits transfer of coins corresponding to physical coins through a drag and drop operation that takes a few seconds to complete. Upon completion a transaction can be completed quickly without worries about having to log in and authenticate on third party sites, for example, video or music download or game playing web sites.

The electronic wallet 7 also helps unify the online and physical commerce environments. For example, user may access the same system and the same account online using a desktop version of the electronic wallet 7, and in the real world using a mobile version of the electronic wallet 7. Additional unification occurs with integration of advertising and identity management.

The electronic wallet 7 is also configured for receipt management. When a purchase is made, the electronic wallet 7 automatically receives a receipt immediately in electronic form. This receipt is available for immediate organization, search, storage, and other manipulation. Receipts can also be issued for visiting an access point even if no purchase was made. For example, this might be useful for tourists collecting digital souvenirs for their scrapbooks, for children at theme parks who wish to prove that they went on every ride, for sports in which the participants must go to a series of checkpoints such as orienteering, etc. Since receipts have a very general grammar just like every other type of object in the system, complex behaviors are possible such as a zoo being able to automatically issue a coupon if a visitor has walked past every exhibit.

Payment Configuration

The electronic wallet 7 includes a user interface through which a user applies payment instruments to transactions. The electronic wallet 7 is used in conjunction with payment receptacles, which might be located in the electronic wallet 7 itself or may be embedded in web pages or third-party programs.

The seller system can include a shopping cart. The shopping cart is the digital representation of the set of goods and service which a user wishes to purchase from a seller. The shopping cart can be configured to include specified shipping methods, or even a selection of potential shipping methods which the user will select one of during the payment process. Each item in a shopping cart may include media such as an image or video, an item code such as a universal product code (UPC), an item price per unit, a currency, a quantity, a description, and other details corresponding to a transaction. The items chosen for purchase in a real-world store can also be considered to form a shopping cart once they have been scanned into a cash register.

Figure 15:
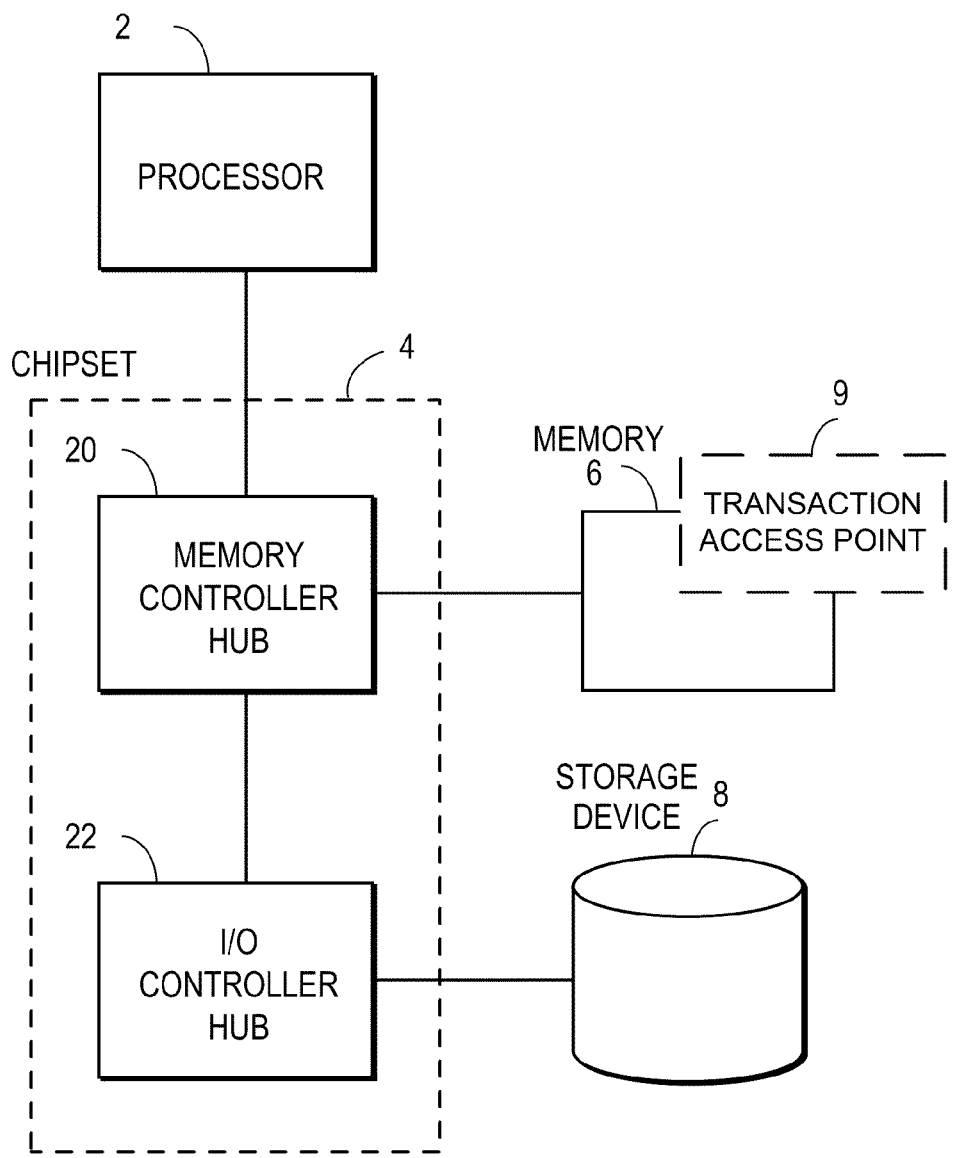
FIG. 15 illustrates an example of a transaction access point module during execution by a seller computer in the seller system.

The seller system also includes a transaction access point (or access point). FIG. 15 illustrates an example of a transaction access point 9 during execution by a seller computer in the seller system. A transaction access point (or transaction access point module) is a program that may be in an applet, widget, or script code form and executable through a processor 2 of a computer 1. The transaction access point program may be written with the aid of an application programming interface (API) opened up to sellers. The API includes code for the seller system to represent the vendor to the transaction authority 102 during a transaction. The transaction is set up when the electronic wallet 7 and the access point interface. This can occur by way of any of the transaction configurations disclosed earlier.

In the online version of a transaction life cycle, for example, as described with previously, the transaction access point is responsible for sending the transaction details to the transaction authority 102. In this respect, the transaction access point is function component of the seller system 101. The transaction access point receives the transaction identifier from the transaction authority, and conveying the transaction identifier to the user, potentially along with a page embedding a payment receptacle. The transaction access point can also receive notification of the transaction's outcome in order to update the page to reflect the event. In this version the transaction access point can be thought of as code, for example ASP or PHP code, running on the vendor's web server or local computer to execute these functions.

In physical environment transactions, the transaction access point can be code that is embedded into a computerized cash register (e.g., having computing components similar to the computer 1). The code may any language that is compatible with native code of the cash register, for example, C# .Net, Java, ANSI C++, etc. As part of the cash register's normal functionality, the cashier uses it to scan physical items that the user has chosen to purchase. The transaction access point then packages these items into a shopping cart and uses them to initialize a transaction.

As previously noted, the transaction authority 102 is configured to facilitate completion of a transaction. As noted, the transaction authority 102 has one or more servers configured to store and process information pertaining to transactions and payments. Processing includes authentication of parties to the transaction, management of payment instruments associated with a transaction, including application of appropriate payment instruments applied to particular transactions, transfers and management of user and seller accounts, and a status of transactions, for example, pending, completed, cancelled, refunded, and the like.

A payment instrument is a digital object associated with a user account stored in a database of the transaction authority. The payment instrument may be a graphical representation within the electronic wallet 7 and can be applied to a transaction in order to transfer value from a user to a vendor, or group of vendors. The payment instruments can be cash, credit cards, debit cards, gift cards, coupons, or any other vehicles used to convey value from one entity to another. The payment instruments may also be in the form of coupons, which are further described below. Many payment instruments, such as credit cards and debit cards have accounts associated with them at other financial institutions such as banks, credit card companies, payment gateways, or other financial entities. The account may have associated currencies which become associated with the payment instrument. The transaction authority 102 acts as a bridge between the payment instrument and the various financial institutions which will be instructed to transfer funds during a transaction. The transaction authority 102 may also provide users with financial accounts directly which can have payment instruments associated with them. When a payment instrument is applied to a transaction, the actions taken by the system can depend on the details of the account. For example, the payment can be put into some form of escrow or can be transferred immediately.

In one embodiment, the payment instruments are digital objects. As such they have definitions and instances. Examples of such digital objects include credit cards, debit cards, gift cards, coupons, and cash. Digital objects such as credit cards and debit cards can have their definitions created by financial institutions that issue such cards. For example, there can be a definition for a Bank of America Visa Gold Card, which Visa and/or the Bank of America define as having certain graphics associated with it. An individual's digital Bank of America Visa Gold Card can then be associated with that definition and include information specific to that user, such as the account number and expiry date and even a security code such as a personal identification number (PIN). As with other digital objects, the electronic wallet 7 contains a graphical representation which can be manipulated to affect the underlying entity. A user can customize the graphics of the card so that a user defined graphic is shown in place of the graphic defined by the definition. A definition might also not be generated by the financial institution itself, but may be automatically generated by the transaction authority 102 on behalf of the institution.

The payment configuration also is configured to generate digital receipts upon successful completion of a transaction. The receipt is available for transmission to the electronic wallet 7 at the user computer. The electronic wallet 7 may display receipts in a number of ways, for example, as a graphical representation of a digital object, on a timeline, or in a table. As with any of the digital objects in the system, a seller may define (free form or through template) a receipt definition which allows the seller to control the layout and graphical look of the receipts issued for their various transactions by using provided as described elsewhere in this disclosure.

In addition, receipts can contain simple controls to halt and refund the transaction or a portion of the transaction. This may apply if, for example, the items in the transaction have not yet shipped. The receipt may also contain controls to give feedback about the purchasing experience. These feedback controls may be as simple as a thumbs up or thumbs down, or a 5 star scale, or as complex as a detailed questionnaire. A user may choose the level of feedback they would like to provide for a given transaction. User participation can be encouraged by rewarding feedback with benefits such as coupons. Receipts for transactions which require shipping can also contain maps and the shipment's tracking codes so that the location of the shipment is automatically displayed to the user on the receipt or elsewhere. This can be achieved simply by providing the shipping companies with a convenient API with which to get the data from them or potentially by scraping the data from existing facilities like the shipping company's websites.

In addition to the above, a digital receipt may be used to return an item under warranty or a seller return policy. This is done by connecting to a physical transaction access point using the user electronic wallet 7 and selecting refund. This opens a receipt receptacle which allows the user to transfer the receipt to the cashier of the seller. The cashier uses a graphical user interface in the cash register to mark an object from the shopping cart as being returned. This then causes money to be refunded to the user via the transaction authority 102 and an appropriate payment instrument's underlying financial account. If there is choice, for example if a transaction was paid for using more than one instrument, the user can choose how much to return to each. Once an item is returned, the user's receipt can be updated to reflect that it has been returned, for example a red line can be drawn through it.

The electronic wallet 7 can be configured to include a pending transaction table. A user can choose to store any pending transaction, which would then be put into the table and allow the user to complete the transaction at a later date. The transaction may have its associated payments rolled back or not when it is stored in the table. Placing a transaction into the pending transaction table can turn off the transaction's cancellation timer. If a transaction is reactivated by selecting it from the table in some way, this action may open a payment receptacle in the electronic wallet 7 or in a web browser and load the details and state of the transaction so that the user can continue with the payment. It is noted that some transactions might be set by the vendor as being not storable. Transactions which might benefit from being not storable might include in-store transactions, transactions for digital content like a video or MP3 download, and the like. If a transaction is set as not storable the user interface may just not display the control used by the user to store the transaction.

Initializing a Web Transaction

An electronic wallet 7 user can initiate execution of a web-based transaction by filling a shopping cart in a conventional process through a seller website accessed through a conventional web browser on the user computer. At checkout, a user selects a transaction payment method on the webpage that corresponds to use of the electronic wallet 7. The selection on the webpage initializes a transaction. Selection of the electronic wallet 7 for checkout causes an applet or script loaded on the seller webpage to send an AJAX request back to the transaction access point, which is a website server corresponding to the seller system 101. The transaction access point transmits the transaction details to the transaction authority 102. The transaction authority 102 registers the new transaction and returns a unique transaction identifier to the transaction access point at the seller system 101. The transaction access point then returns the identifier to the applet/script, which transmits the identifier to the electronic wallet 7. Approximately simultaneously, the applet/script can cause a payment receptacle to appear embedded in the seller webpage as viewed by the user at the user computer.

Once the electronic wallet 7 receives the transaction identifier, the transaction identifier is transmitted to a server of the transaction authority 102. The transaction authority 102 matches the transaction identifier to the pending transaction registered by the vendor and downloads the transaction details to the electronic wallet 7. In response, the electronic wallet 7 transmits the details to the payment receptacle. The payment receptacle displays the details corresponding to the transaction. The transaction is ready for the user to interact with it in order to pay for the transaction.

In another embodiment, the payment receptacle can be displayed in the electronic wallet 7 rather than be embedded within the seller website. The flow of information is same as described, except that the applet/script on the seller webpage does not cause the payment receptacle to become embedded in the seller webpage. Instead, the user interface of the electronic wallet 7 displays a payment receptacle and this receptacle receives the transaction data which the electronic wallet receives from the transaction authority 102. It is noted that the location of the payment receptacle can be a user preference.

Figure 29:
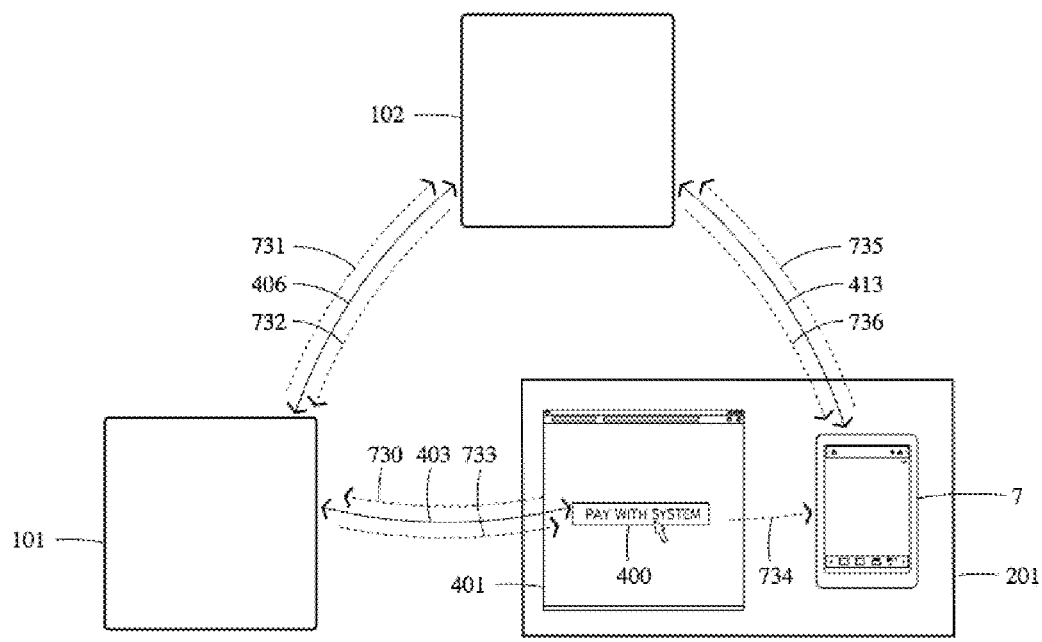
FIG. 29 illustrates an example embodiment of a process for initiating a simplified online transaction between a vendor's website and a buyer's electronic wallet.

FIG. 29 illustrates an example embodiment of a process for initiating an online transaction between a seller (or vendor) website and a buyer electronic wallet 7. When one or more goods or services has been selected on a seller's website, the buyer clicks on button 400 on webpage 401 which causes message 730 to be sent over network channel 403 to seller 404 indicating the buyer's intent to use the present system to undertake the transaction. In this embodiment, this message 730 is sent from webpage 401 using an AJAX call, but other well-known methods exist. The seller 404 then sends message 731, including the details, terms and conditions of sale of the one or more goods and services, over communication channel 406 to instruct the transaction authority 102 to register a pending transaction. The transaction authority 102 registers the pending transaction and generates a transaction identifier, associates the identifier with the pending transaction, and sends the transaction identifier in instruction 732 to the seller 404 over communication channel 406.

The seller 404 then sends instruction 733 containing the transaction identifier to webpage 401 over communication channel 403 as a response to the AJAX call (message 730). The webpage 401 then sends the transaction identifier in message 734 to electronic wallet 7. In the one embodiment, this is done using an operating system message, but other well-known methods exist. Buyer's electronic wallet 7 sends instruction 735 including the transaction identifier to transaction authority 102 over communication channel 413. Transaction authority then matches the transaction identifier with the registered pending transaction and sends instruction 736 including the details, terms and conditions of the pending transaction over communication channel 413 to buyer's electronic wallet 7.

At this point, one of two events occurs. Either the details of the transaction are then displayed in a payment receptacle (not shown) in electronic wallet 7, or a message (not shown) is sent from electronic wallet 7, which includes the details of the transaction, to the webpage 401 where the details are displayed in a payment receptacle (not shown) embedded in an inline frame which uses the transaction authority 102 as its content provider. In this preferred embodiment, the embedded payment receptacle is always in the webpage 401, but the inline frame that contains it has height=0, so it is not visible, and two messages are sent from the electronic wallet 7, one of which is sent to the webpage 401 instructing it to increase the height of the inline frame, and the other of which is sent to the inline frame to initialize the contents of the payment receptacle. In either of these cases, the buyer then carries out the steps necessary to complete the transaction through the electronic wallet 7 and the payment receptacle (not shown) without any interaction with the seller whatsoever.

In this system, the seller and the buyer share only one piece of information, the transaction identifier, which is a trivial piece of data that conveys no sensitive information of any kind, and only serves to allow the transaction authority to match the buyer, the seller and the transaction authority. This example shows in detail the one embodiment of a transaction configuration described earlier in this disclosure. Once the relationship between this example and the embodiment of the transaction configuration is understood, it will be clear to someone skilled in the art that the other disclosed embodiments of the transaction configuration can be similarly implemented.

Figure 16:
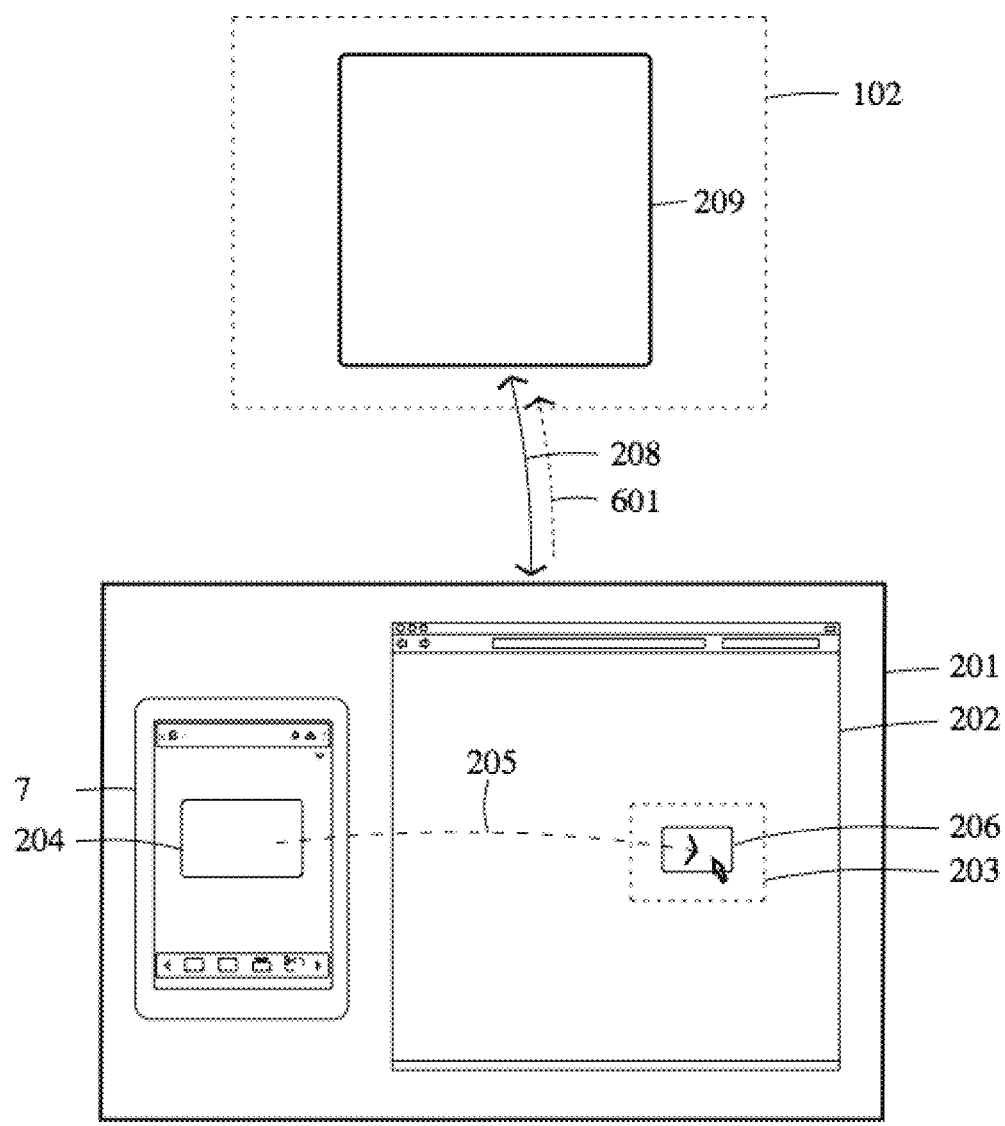
FIG. 16 illustrates an example embodiment of a drag and drop operation between an electronic wallet and a browser program through which a website associated with a seller system is accessed.

Payment in a Pending Transaction:

Turning next to payment in a transaction that has already been initialized as described above, in one embodiment a user pays by selecting a payment instrument from within the electronic wallet 7 and dragging and dropping its graphical representation into the payment receptacle. FIG. 16 illustrates an example embodiment of a drag and drop operation. As illustrated, the configuration for illustrating the drag and drop operation includes a screen 201 of the user computer 100 communicatively coupled with a remote server 209 of the transaction authority 102 through a communication channel (e.g., through the network 50). Executing on the user computer 100 is a browser program and the electronic wallet 7. The figure illustrates a user interface of the electronic wallet 7 and a user interface 202 of a browser program (for ease of discussion the browser program will be referenced as 202 and is understood to refer to the processing or display as is appropriately understood for those skilled in the art. In addition, it is noted that the electronic wallet 7 program may be interchangeably referenced in some contexts with reference to its user interface. Within the browser program a webpage corresponding to a website associated with a seller system 101 is displayed on the screen 201 to the user. The user interacts with the webpage through the web browser 202.

Continuing, when a user is ready to make payment for goods or services displayed in the payment receptacle shown on the web browser 202, it sets in motion a process to apply a user's chosen method or methods of payment. Specifically, the user drags the graphical representation of an object 204 corresponding to a payment instrument from its drag origin (the electronic wallet 7) to drop onto a target 203 in web browser program 202. The target 203 corresponds to a payment receptacle, further described below. The payment receptacle may be within the electronic wallet 7, but in this figure it is illustrated within the seller website shown in the web browser 202. When the graphical representation of an object 204 is dropped on drop target 203, a user interface may open in the receptacle asking the user to specify a value such as a dollar amount to charge against the payment instrument if it is an object such as a credit card, debit card, or gift card which can be used for charges of various sizes. It is noted that a default amount can be set that corresponds to a total outstanding balance. If the payment instrument is something like cash which has a predetermined constant face value then that face value is used. An instruction 207 is then transmitted over communication channel 208 (e.g., through the network 50) to remote server 209 of the transaction authority 102. This instruction informs the transaction authority 102 to apply the payment instrument.

The payment receptacle is configured to communicate with the transaction authority 102 either through the electronic wallet 7 as described previously in the discussion of the drag table, directly from the receptacle, or even through the seller website to apply the payment instrument at the specified value to the transaction. Depending on factors such as the details of the account underlying the payment instrument and the details of the transaction, the response may cause the transaction authority 102 to apply the charge directly or put the charge into some form of escrow or cause the transaction authority to instruct a financial institution to do so. If the payment instrument includes a coupon, the payment receptacle may convey instructions to the system to determine its value and apply it to the transaction, as described below.

Figure 17:
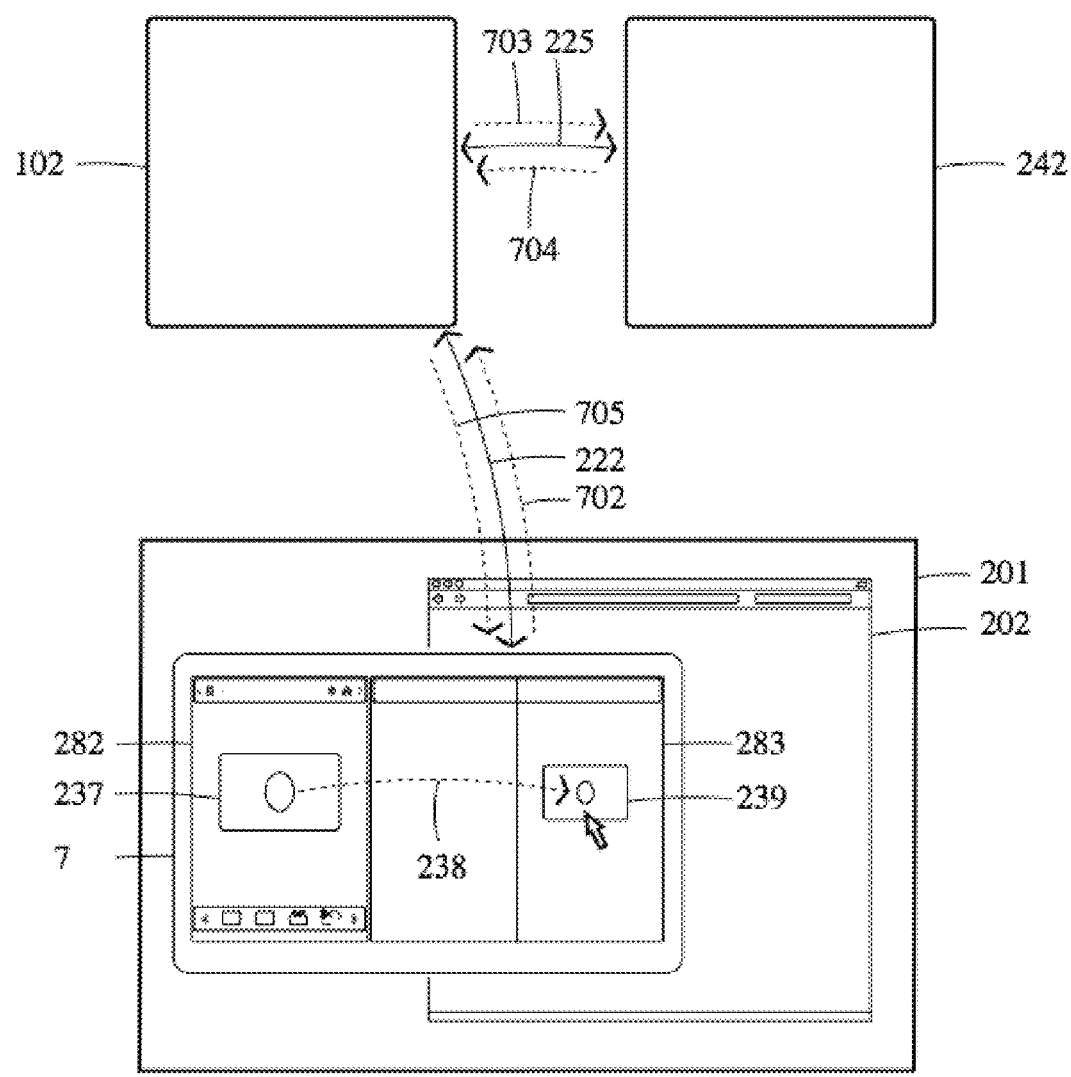
FIG. 17 illustrates an example embodiment of initiating (or providing) for display and execution a payment receptacle.

FIG. 17 illustrates one embodiment of initiating (or providing) for display and execution a payment receptacle embedded in the electronic wallet 7. The figure illustrates a transaction authority 102, a credit card payment gateway 242, and the screen 201 of user computer 100. The transaction authority 102, the credit card payment gateway 242, and the user computer 101 are communicatively coupled through a network (not shown), e.g., network 50. As in FIG. 8, the screen 201 of the user computer 101 displays a user interface of a web browser 202 and a user interface 282 of the electronic wallet 7. Here, the user interface of the electronic wallet 7 is referenced differently because this configuration illustrates a payment receptacle 283 coupled with the user interface 282 of the electronic wallet 7. The electronic wallet 7 can be configured in this mode to either incorporate the payment receptacle program 283 or run in conjunction with the payment receptacle program 283. Again, however, the electronic wallet 7 may be interchangeably referenced through the user interface 282 or the electronic wallet 7 and is understood to refer to the processing or display as is appropriately understood for those skilled in the art. Also displayed in the figure is a graphical representative digital object 237 representative of a credit card. This example shows the application of a credit card payment to a pending transaction.

In this example, the user selects the digital object 237 corresponding to the credit card displayed in electronic wallet program 282 and moves it by a drag 238 to drop on a target 239. The target 239 in this example is the payment receptacle module 283 displayed in electronic wallet 282, separate from web page 202 on computer screen 201. When the digital object 237 corresponding to the credit card is dropped on drop target 239, payment receptacle program 283 transmits through the user computer 100 an instruction 702 containing identification information of the credit card over a communication channel 222 (preferably secured) to the transaction authority 102. In one embodiment this identification information is just the digital object's identifier, but could be the credit card number or portion thereof, expiration date, name as appears on card, a random number linked to the drag table as described earlier, or any combination of such data, etc. The instruction informs the transaction authority 102 to apply the credit card to the pending transaction being hosted by payment receptacle program 283.

Figure 18:
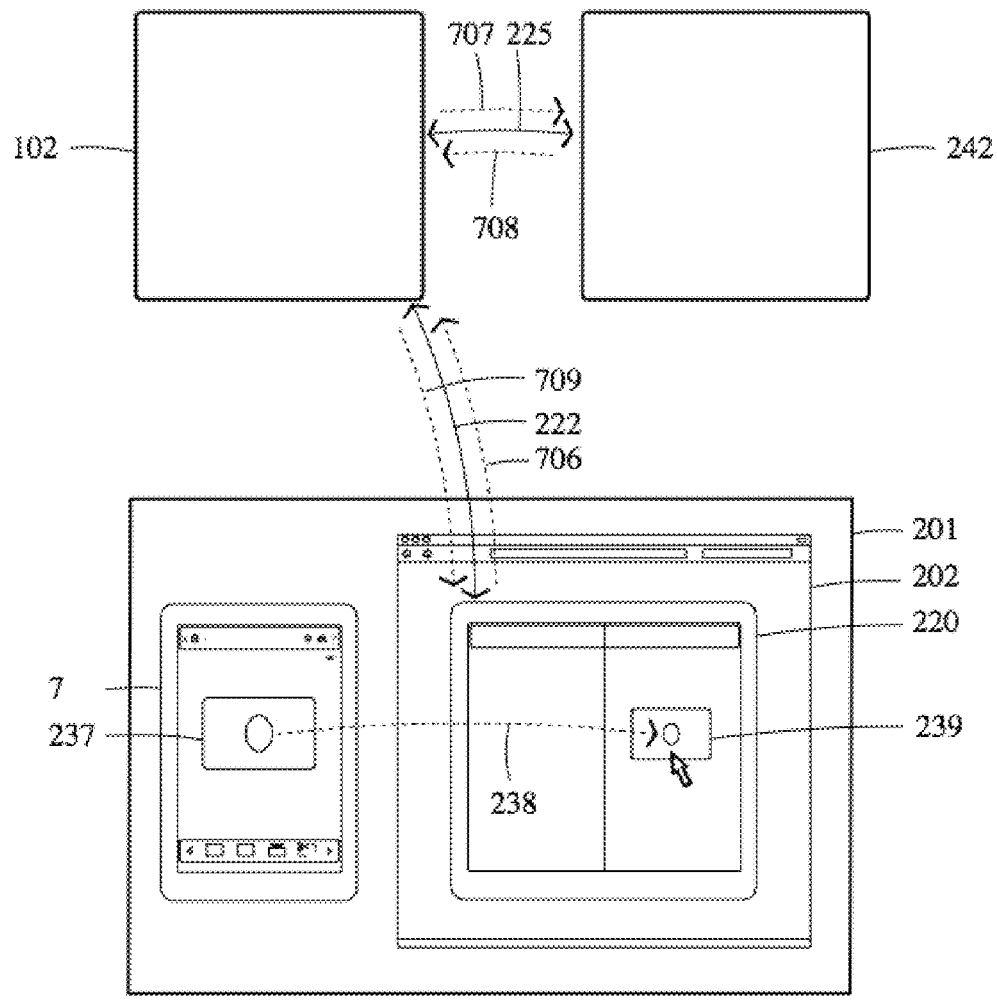
FIG. 18 illustrates one example embodiment of a process for applying a payment to a transaction in which a third-party payment authority is included.

Referring to FIG. 18, it illustrates one example embodiment of a process for applying a payment to a transaction in which a third-party payment authority is included. The third-party payment authority may be a credit card company or other payment authority, for example, a bank or payment clearinghouse. Here, the transaction authority 102 registers the request for credit as a pending payment and transmits a message 707 over a communication channel 225 to the credit card payment gateway 242. The message containing the identification details of the credit card and the amount of credit to apply to the transaction as requested by the user associated with the credit card. The credit card payment gateway 242 carries out its independent process to approve or decline the request.

If the credit request is approved, credit card payment gateway 242 returns a message 708 to the transaction authority 102 indicating approval for the pending transaction. The transaction authority 102 records the approval and transmits a message 709 to the payment receptacle program 220 over communication channel 222 instructing the payment receptacle program 220 to display a graphical representation of credit card 237 along with the approved value of the credit card payment. If, however, the credit request is not approved, the credit card payment gateway 242 returns a message to the transaction authority 102 declining the transaction. In this instance the transaction authority 102 cancels the pending credit card payment and returns a message to payment receptacle program 220 to display a message that the credit card payment has been declined.

Figure 19:
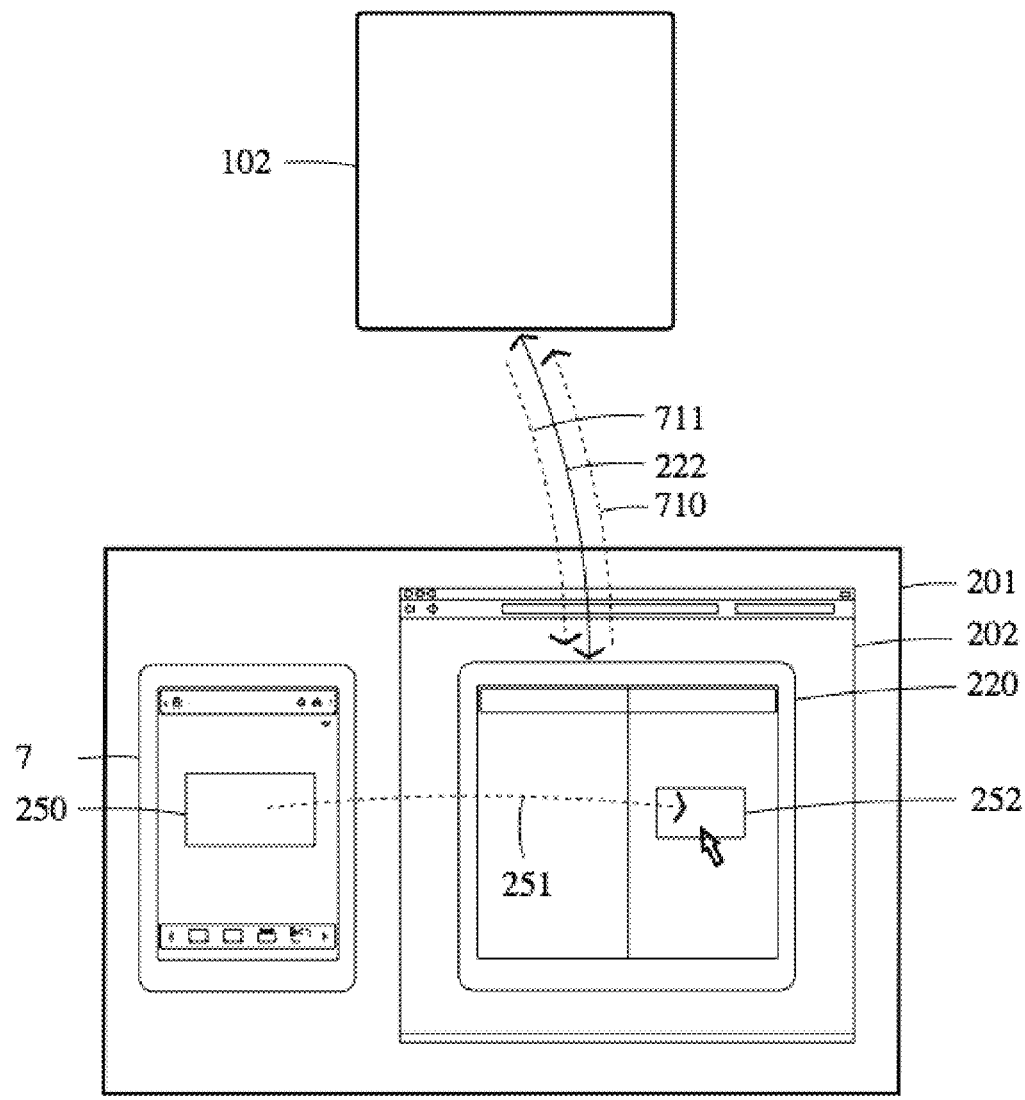
FIG. 19 illustrates an example embodiment in which a digital object from an electronic wallet corresponds to a debit card and an associated transaction process to apply towards a transaction purchase price.

Turning to FIG. 19, it illustrates an example embodiment in which a digital object from the electronic wallet 7 corresponds to a debit card and an associated transaction process to apply it towards the transaction purchase price. In this example, there is the screen 201 of the user computer 100 and the transaction authority 102. The user computer 100 and the transaction authority 102 are communicatively coupled together (e.g., through the network 50). Within the screen 201 there is shown an electronic wallet 7 and the user interface of the browser program 202. Also shown are a payment receptacle 220 and a digital object 250 corresponding to a debit card. The payment receptacle 220 in this example is communicatively coupled with the webpage of the website within the browser program 201. Thus, the payment receptacle 220 is displayed as part of web page on screen 201.

In this example, the user selects a the digital object (here, a graphical representation) 250 corresponding to the debit card and moves it with drag 251 to drop target 252 in payment receptacle 220. When the digital object 250 corresponding to the debit card 250 is dropped on drop target 252, the payment receptacle 220 transmits an instruction 710 over communication channel 222 (preferably secured) to the transaction authority 102 to apply it. In response to receiving the instruction, the transaction authority 223 checks an account held by the user of electronic wallet 7 to determine whether sufficient resources are available for the payment requested. If sufficient resources are available, the transaction authority 102 places the amount requested in escrow and returns message 711 to the payment receptacle 220. The message instructs the payment receptacle 220 to display a digital object 252 corresponding to a graphical representation of debit card along with details of the debit payment requested.

When the transaction authority 102 has determined that the user has fulfilled the terms and conditions of the pending transaction, the transaction authority 102 transfers the resources from escrow to the account of the recipient of the user's payment. If, however, sufficient resources are not available in the user account, the transaction authority 102 returns a message (not shown) to the payment receptacle 220 instructing it to display that the request has been declined. The message may also include an instruction for the payment receptacle 220 to remove the digital object corresponding to the graphical representation of the debit card 250.

In this embodiment, the digital object corresponding to the graphical representation of debit card 250 can be displayed in forms other than conventional debit cards. For example, the digital object 250 can be displayed in the form of cash currency. Each graphical representation of a coin or bill may have the specific value of that coin or bill associated with it. When the graphical representation of a particular bill is dragged and dropped into the drop target 252, the instruction sent to the transaction authority 102 carries the request to debit the user account by the face value of the bill represented. In this example, if sufficient resources are available in the user's account, the transaction authority 102 transmits a message 711 to the receptacle 220 to display the graphical representation the bill in the receptacle 220, along with the details of the amount to be debited.

If after selection and approved application of the first payment instrument an outstanding balance continues to remain, the user can then drag and drop another payment instrument of a same type in order to apply additional payment instruments toward the same transaction. The process may continue until the outstanding balance is met, with the payment receptacle providing visual details to the user about, which payment instruments have been applied in what amount toward the transaction and the transaction authority 102 keeping track of how much has been paid as well as the size of the outstanding balance.

Figure 20:
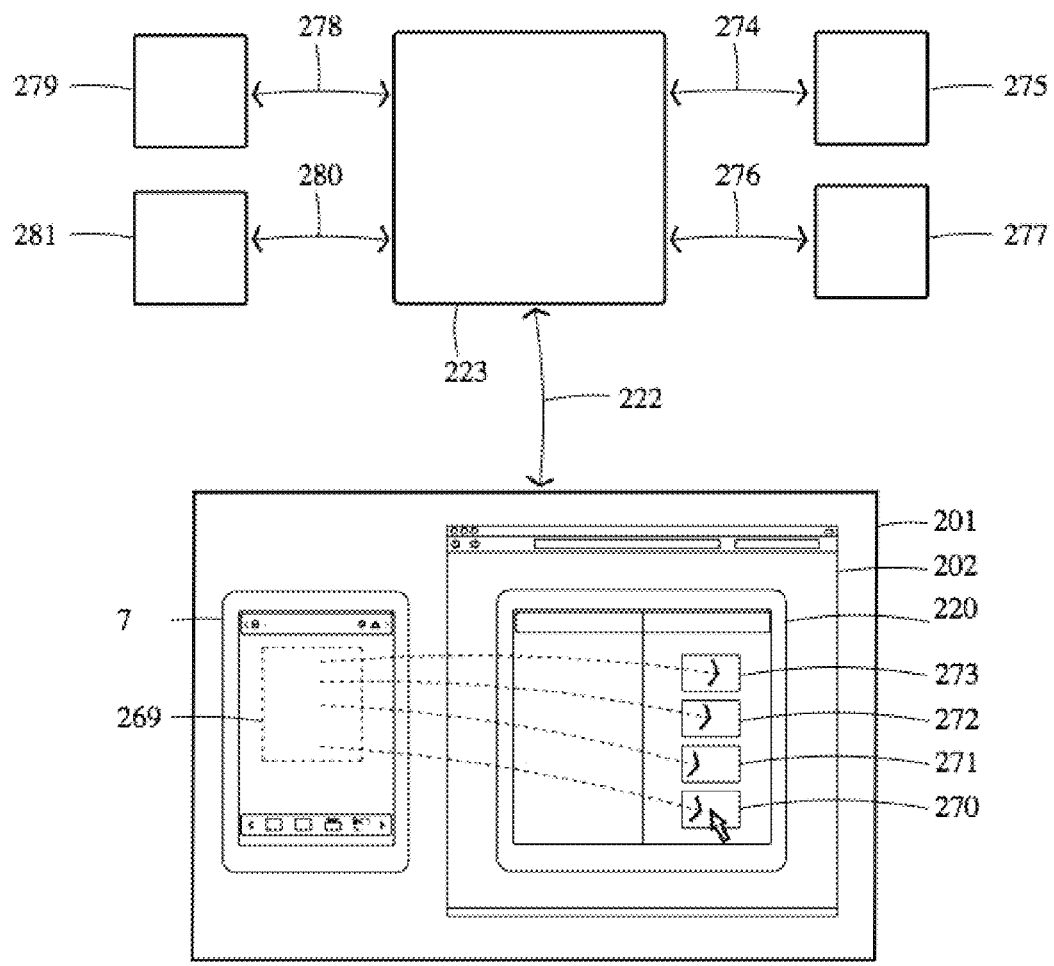
FIG. 20 illustrates one example embodiment of a process for applying multiple forms of payment to a single online transaction.

In one embodiment, if after selection and approved application of the first payment instrument an outstanding balance continues to remain, the user can then drag and drop another payment instrument of a different type or the same type in order to apply additional payment instruments toward the same transaction. FIG. 20 illustrates one example embodiment of a process for applying multiple forms of payment to a single online transaction. In this example, there is the screen 201 of the user computer 100 and the transaction authority 102. The user computer 100 and the transaction authority 102 are communicatively coupled together (e.g., through the network 50). Within the screen 201 there is shown a user interface of the electronic wallet 7 and the user interface of the browser program 202. Also shown are a payment receptacle 220 and multiple digital objects 270, 271, 272, 273, each corresponding to a payment form, at least two of which are unique relative to each other. In this example case, for ease of explanation all four 270, 271, 272, 273 will be considered unique. For example, the four payment forms 270, 271, 272, 273 may correspond to a credit card, a debit card, a coupon, and cash (or any other form of payment). In addition, there are shown four payment gateways 275, 277, 279, 281, each corresponding to a payment form represented by a digital object 270, 271, 272, 273. As in the above example, the payment receptacle 220 in this example is communicatively coupled with the webpage of the website within the browser program 201. Thus, the payment receptacle 220 is displayed as part of web page on screen 201.

With respect to the transaction, the user drags graphical representations of the digital objects 270, 271, 272, 273 corresponding to the differing payment forms from a drag origin 269 to a target area (not shown) in the payment receptacle 220. As each graphical representation a payment form 270, 271, 272 and 273 is dropped on its respective drop target, the payment receptacle program 220 transmits a message over a communication channel 222 (preferably secured) instructing the transaction authority 102 to apply the payment form to the pending transaction. Each payment instrument can be applied in a separately from the others, or payment instruments can be bundled together and applied together. The business card may also be bundled with payment instruments to conveniently apply both at once. The transaction authority 102 then carries out the steps described previously with respect to application of a payment to a transaction by communicating with the respective payment gateways 275, 277, 279, 281 associated with each payment form 270, 271, 272, 273. Each time the drag of a graphical representation of a form of payment results in a successful application of payment to the pending transaction, the transaction authority 102 transmits an instruction over the communication channel 222 to the payment receptacle 220 to display a graphical representation of that of payment form adjacent to the details of the payment in a transaction summary (not shown), for example, as described previously.

It is noted that the transaction authority need not impose any artificial limit on the number and type of payment instruments applied to the same transaction, though certain coupons, for example, may contain logic precluding their use with certain other coupons or forms of payment. A successful application of a payment instrument can cause certain transaction data which may or may not be visible in the payment receptacle 220, for example the outstanding transaction balance, to be updated. It also is noted that this payment process may continue until the outstanding balance is met, with the payment receptacle providing visual details to the user about which payment instruments have been applied in what amount toward the transaction and the transaction authority 102 keeping track of how much has been paid as well as the size of the outstanding balance.

Once applied to the transaction, the payment instrument can be graphically represented in the payment receptacle 220. In order to rollback the application of the payment instrument, the user can simply drag and drop it back from the payment receptacle to the electronic wallet 7. The rollback of the application works in a similar way to the application. In one example embodiment, a drag back to the electronic wallet 7 from the payment receptacle 220 causes the electronic wallet 7 to communicate with a server in the transaction authority 102 to roll back the application. This rollback process also includes communication with the underlying financial institution of the payment instrument, when necessary. The transaction authority 102 response is processed by the electronic wallet 7 and conveyed back to the payment receptacle 220. The payment receptacle 220 updates certain transaction data such as the outstanding balance in response to the rollback authorization.

Specifying Shipping Details

The payment receptacle 220 may include a display of one or more shipping options, which can be communicated to it as part of the shipping details. The shipping options may include shipping address, shipping method, and shipping format and price. A shipping option may already be pre-selected based on past transactions history or information gleaned during transaction initialization as part of the shopping cart. If the potential shipping options are displayed in the payment receptacle, the user can select to change the desired shipping type which updates the transaction's price both in the receptacle, and in the transaction authority's server.

The user can fill in shipping information (e.g., the ship-to address) by typing information into provided fields in the payment receptacle. Alternatively, the shipping information may be automatically filled-in based on the user's history. Alternatively, the shipping information may be part of the transaction details uploaded to the system during the initialization of the transaction.

Figure 21:
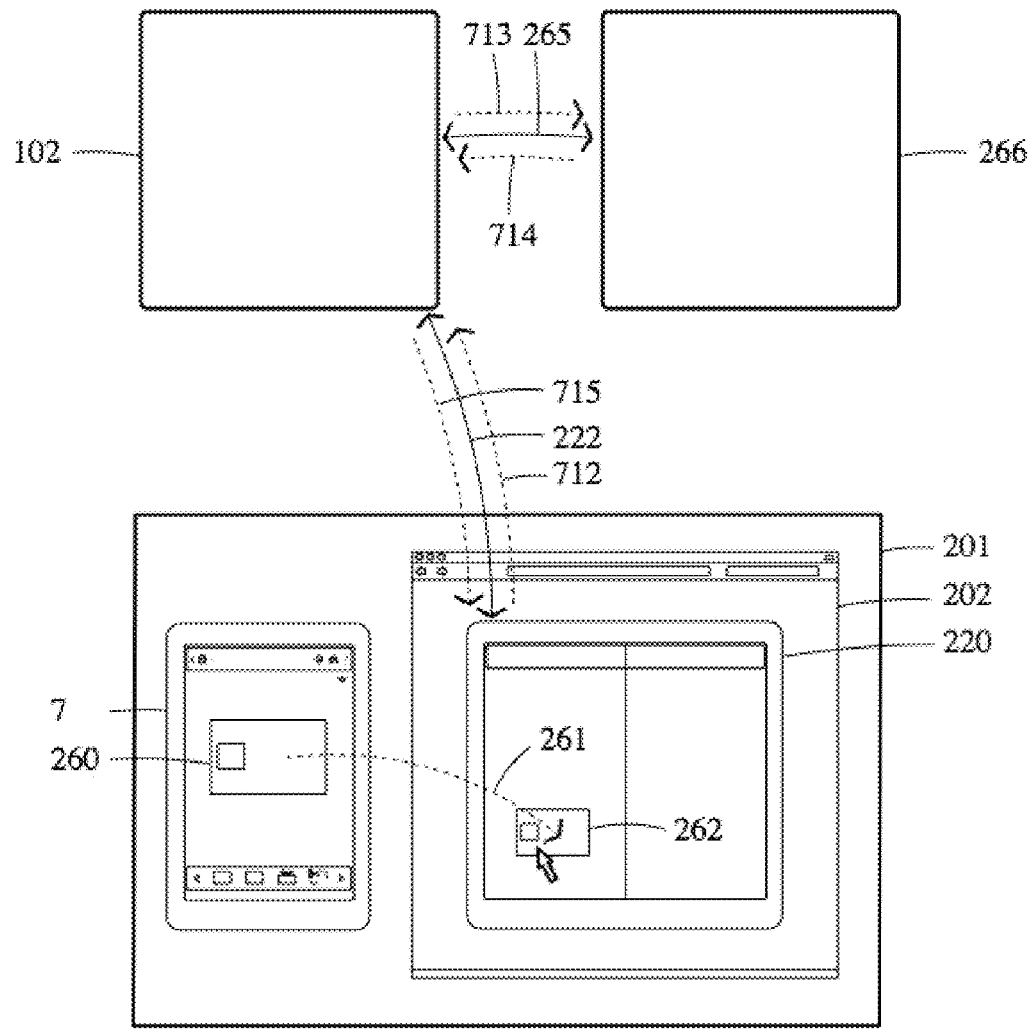
FIG. 21 illustrates one example embodiment of a process for applying a shipping address to an online transaction.

The shipping information may also be filled in by a drag and drop into the payment receptacle through a pre-populated piece of information or identification, for example, a business card. FIG. 21 illustrates one example embodiment of a process for applying a shipping address to an online transaction. In this example, there is the screen 201 of the user computer 100, the transaction authority 102, and a business card authority 266. The user computer 100, the transaction authority 102, and the business card authority 266 are communicatively coupled together (e.g., through the network 50). Within the screen 201 there is shown a user interface of the electronic wallet 7 and the user interface of the browser program 202. Also shown are a payment receptacle 220 and a digital object 260 corresponding to a business card. The payment receptacle 220 in this example is communicatively coupled with the webpage of the website within the browser program 201. Thus, the payment receptacle 220 is displayed as part of web page on screen 201.

In order to apply the address from the business card to the transaction as a shipping address, the user selects the digital object 260 corresponding to a graphical representation of a business card 260 from the electronic wallet 7 and moves it with drag 261 to drop target 262 in payment receptacle program 220. When the graphical representation of a business card 260 is dropped on drop target 262, the payment receptacle program 220 transmits a message 712 over the communication channel 222 to the transaction authority 102. The message includes business card 260's identifier. Upon receipt, the transaction authority 102 transmits a message 713 over a communication channel 265 to the business card authority 266. The message 713 requests a piece of data associated with the business card 260. The business card authority 266 retrieves the data from one of the business card's data sources which it has permission to access and returns it in a message 714 to the transaction authority 102. In response, the transaction authority 102 associates the data with the pending transaction. The transaction authority 102 transmits the data with message 715 over communication channel 222. In addition the transaction authority 102 instructs the payment receptacle program 220 to display a graphical representation of business card 260 along with a text representation of the address data associated with that card. The shipping data is now updated and viewable for the user. More details on business card configurations are provided below.

Completion of a Pending Transaction:

Once an outstanding balance of a transaction reaches zero, it is ready to proceed to completion. In response the payment receptacle 220 displays a 'Complete Transaction' button that is user selectable. First, it is noted that for security purposes the status of a transaction is calculated based on the value of all the payments applied to the transaction as stored by the transaction authority 102 and the payment receptacle 220. Before selection of the 'Complete Transaction' button by the user, the transaction is still pending and the user can choose to rollback the application of any of the payment instruments or change shipping information as he/she desires. Once the user selects the 'Complete Transaction' button, the transaction authority 102 is instructed to complete the transaction. This may include closing escrow or transferring funds as needed between a variety of payment gateways and financial institutions depending on the details of the payment instruments which were applied to the transaction.

Once completed successfully, the transaction authority 102 associates a digital receipt with the user account and sends it to the electronic wallet 7. The transaction authority 102 also notifies the seller of the successful transaction and provides a transaction report to the seller. The transaction report may include details such as the chosen shipping method, which coupons, if any, were used, the histories of the coupons, (for example were they virally shared or simply downloaded), where were they downloaded from, and the like. This transaction report may be sent to the securely to the seller system 101 or associated with a seller account at the transaction authority 102 for later perusal.

Along with a digital receipt, a user may receive coupons or a business card from the seller or affiliated sellers. The user may also receive other digital media as a thank you gift, such as for instance a 3D model of a panda which the user can store in a digital inventory. The type of media associated with the receipt may depend on any number of factors. Examples of such factors include whether the user has a membership card for the seller website or an affiliated site, whether the user is a frequent customer, whether the seller or an affiliate is having an advertising campaign on a specific product related to the purchase and the like.

Transaction Cancellation:

During the course of a pending transaction, a user may choose to cancel the transaction in the payment receptacle 220. A cancellation action transmits an instruction to the transaction authority 102 to rollback all of the applied payment instruments. Similarly, a transaction is cancelled if the user closes the web browser or navigates away from the page which contains the payment receptacle 220. Further, each transaction may include a timer associated with it that cancels the transaction after a certain pre-determined period of inactivity. This could ensure that the transaction will cancel at some point if it is not explicitly cancelled or the browser is closed voluntarily or involuntarily prior to completion of a transaction.

Executing a Transaction Through a Mobile Device

The configuration disclosed can be used for transactions conducted through a mobile device such as a mobile phone executing the electronic wallet 7. In an example transaction scenario, a user interacts with a cashier at physical service or goods retailer as done in a conventional checkout process at such institutions. The cashier rings up the sale through a cash register/transaction access point as in conventional processes. The user can indicate that they want to pay with the configurations disclosed herein. Here, the user may use a mobile phone to establish a communication link (e.g., BLUETOOTH or near field communication) with the transaction access point, e.g., the cash register. If there are multiple transaction access points in range, numerous methods can be used for disambiguation, for example signal strength or explicit user selection of the correct register. One the cashier side, the cashier can also disambiguate users if more than one is concurrently connected, again based on information such as signal strength or explicit user selection.

In conjunction with connecting with the transaction access point, the electronic wallet 7 on the mobile phone may transmit a public image and/or public name. The public image and/or public name is received by the transaction access point and displayed to the cashier. In response, the cashier selects the received public image and/or public name corresponding to the user. This beneficially increases security because a transaction is subject to a visual confirmation. Moreover, the public image and/or public name selected may be visually shown to the user and/or confirmed via a transmission from the transaction access point to the electronic wallet 7.

Once the electronic wallet 7 and the transaction access point have disambiguated one another, the parties can enter into a transaction according to one of the transaction configurations described with FIGS. 9 through 14, or variations thereof. In one example embodiment the transaction access point transmits the transaction details to the transaction authority 102. The transaction authority 102 registers the transaction details as a pending transaction and returns a new transaction identifier. The transaction access point sends the transaction identifier to the electronic wallet 7 of the mobile phone. The electronic wallet 7 of the mobile phone receives the transaction identifier and transmits it to the transaction authority 102 to download the transaction details. At this time, the user may reject the transaction or proceed with payment. The payment options may be predefined within the electronic wallet 7 and displayed to the user in a selectable form, e.g., list or menu. The predefined payment options may include payment by a particular payment instrument or combination of payment instruments that can be applied and executed as described previously. Alternately, the user can elect to pay using another method which opens the payment receptacle 220 on a screen of the phone.

Once the payment option is selected the user pays in a manner similar to the process described previously. For example, the user drags and drops (e.g., with touch sensitive screen embodiments of a mobile phone) payment instruments in order to pay. In the phone version the payment receptacle 220 can be configured for display on the screen of the mobile phone as a part of the electronic wallet 7. If the phone does not have a touch screen then selectable software and/or hardware buttons on the mobile phone can be used to scroll through payment instruments and apply them or roll them back. It is noted that the electronic wallet 7 in the mobile phone configuration may be coupled to the same accounts as the electronic wallet on other user computing devices, e.g., a desktop computer. This beneficially provides a user with access to the all the same forms of payment options including gift cards and coupons downloaded from various sources, regardless of the physical device interfaced with the user. When the transaction is complete, the cashier is notified and the user receives a digital receipt potentially combined with other media such as coupons as previously described.

It is noted that numerous techniques can be used to ensure that the mobile device based electronic wallet 7 only connects with authorized cash registers. Standard cryptographic methods can be used to ensure that only valid cash registers and valid electronic wallets can read the information which the other sends. Further, hardware details, such as the Bluetooth MAC address or similar data for other protocols, can be included in the encrypted data and compared against the MAC address of the connection to make it harder for a hacker to redirect it to an unauthorized cash register or device.

Figure 27:
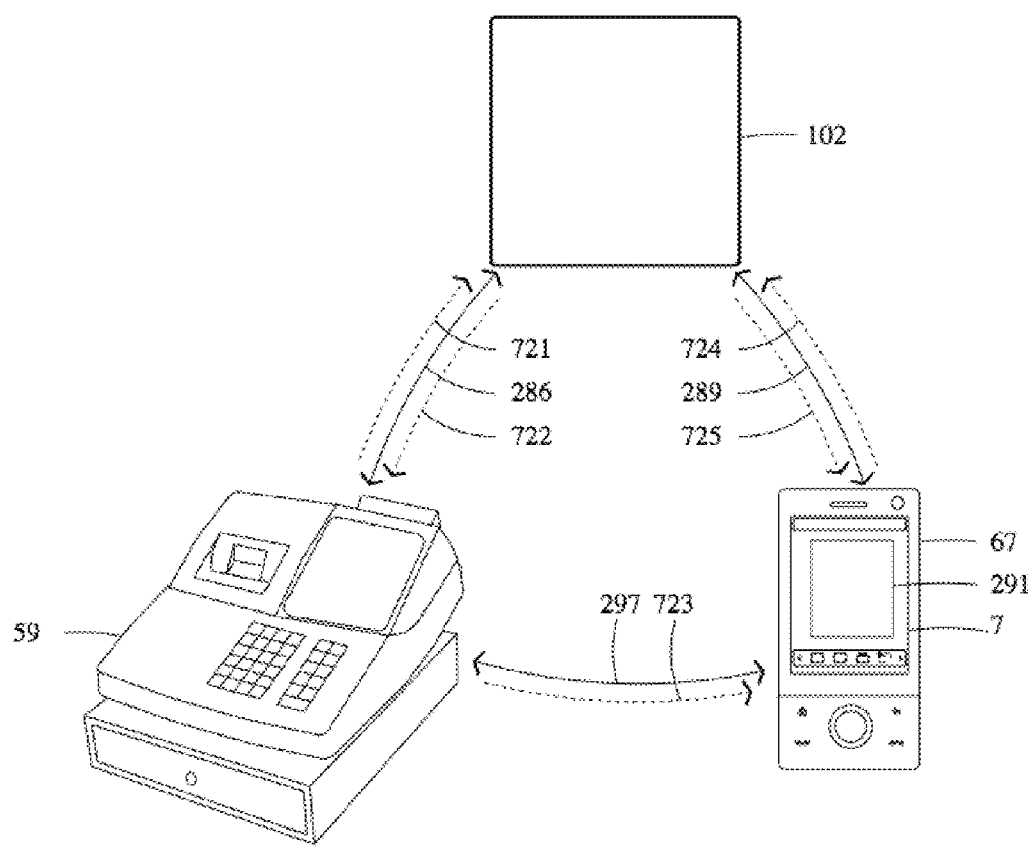
FIG. 27 illustrates an example embodiment of a process to use a mobile device to make a payment in a physical store using wireless communication with a cash register.

FIG. 27 illustrates an example embodiment of a process to use a mobile device to initialize a transaction in a physical store using wireless communication with a cash register. The buyer indicates physically to seller 284 an intent to pay undertake a transaction for one or more goods or services through the transaction authority 102. Seller's cash register 284 sends a message 721 which includes the details, terms and conditions of sale to the transaction authority 102 over network channel 286. The transaction authority 102, registers a pending transaction, generates a transaction identifier, associates it with the pending transaction and returns a message 722, which includes the transaction identifier, over communication channel 286 to the seller cash register 284.

The seller cash register 284 sends the transaction identifier in message 723 over wireless communication channel 297 to the buyer's electronic wallet 7 on mobile device 67. Electronic wallet 7 then sends message 724 to the transaction authority 102 requesting the details of the pending transaction associated with transaction identifier 292. The transaction authority 102 then returns message 725 to electronic wallet 7 instructing it to display the details of the pending transaction. The buyer proceeds with the transaction by further communication with the transaction authority 102 through selections made in electronic wallet 7. When the transaction authority 102 determines that the buyer has fulfilled the terms and conditions of sale, the transaction authority 102 transfers resources from one or more buyer accounts to one or more seller accounts and sends separate confirmations to electronic wallet 7 and seller's cash register 284 that the transaction has completed.

The process of returning a purchased item can also be configured. As in the case of a payment, a user and the cashier first disambiguate one another during connection. As before, this can be done using very short range radio protocols, but could also be done explicitly. The user chooses to transmit a receipt back to the cash register by associating it with the receptacle, either using drag and drop or some other mechanisms. This transmits the transaction identifier associated with the receipt back to the cash register. The cashier then uses the transaction identifier to retrieve the correct transaction details from the transaction authority and manipulates the transaction as necessary, refunding the item if appropriate. This manipulates the transaction's record at the transaction authority. When the cashier is done, the system automatically notifies the user and updates the receipt displayed in the user's electronic wallet. Receipts can be shared in a manner similar to business cards or coupons in order to allow, for example, a wife to return something which a husband bought by mistake.

Verbal or Visual Transaction Identification

In some scenarios a user may shop via a computer that does not include an electronic wallet 7 associate with the user. A web page of a seller system 101 may determine that such electronic wallet 7 is not present. Rather than enable a payment receptacle 220, the website may transmit a transaction identifier to the user to complete the transaction at a later time. In this case the transaction identifier may include a predetermined expiry time, e.g., 2 days. This permits the user to complete the transaction through an electronic wallet 7, e.g., located on another device, within the time period associated with the transaction identifier. To complete a transaction, a user would enter the transaction identifier into an electronic wallet 7 enabled on another device. Entry of the transaction identifier initiates a process to claim the transaction and then complete it.

It is noted that the process of executing a transaction using a transaction identifier may also be initiated in instances where a valid electronic wallet 7 is executing. Such instances may be initiated by a purchaser or a seller. This method beneficially provides a user with additional security comfort, particularly when engaged in a transaction in which the user does not trust the environment in which their private information is susceptible to interception, for example, in a public network access location. Likewise, if a user orders home delivery of a service or good, for example, a pizza from a restaurant, rather than provide credit card details over the phone to the restaurant, the restaurant can provide the user with the transaction identifier. The user can then input this into an electronic wallet 7 enabled on a user computer device 100 to complete the transaction. Alternately, as previously described, the user could establish the transaction by providing a transaction identifier to the restaurant to allow the restaurant (i.e., the seller) to complete the transaction through the seller system 101 using one of the processes previously described.

Figure 28:
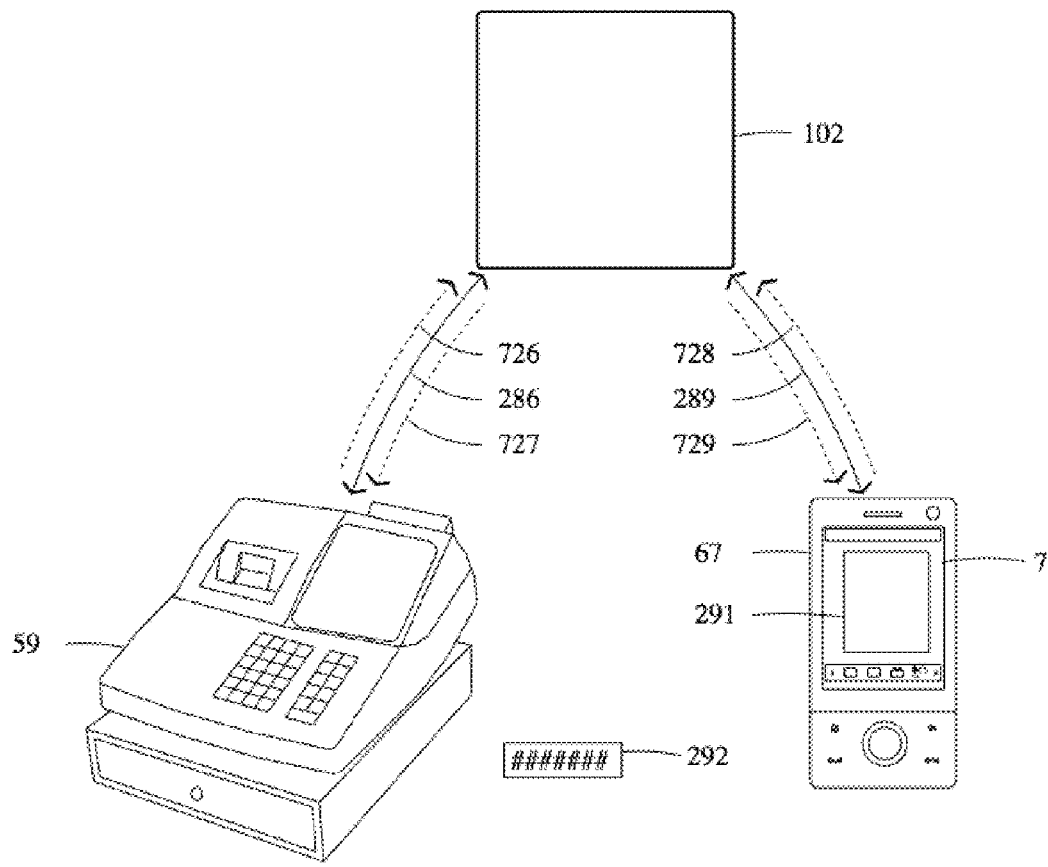
FIG. 28 illustrates an example embodiment of a process to use a mobile device to make a payment by manually inputting a transaction code.

FIG. 28 illustrates an example embodiment of a process to use a mobile device to make a payment by manually inputting a transaction code. The buyer indicates physically to seller's cash register 284 an intent to undertake a transaction through the transaction authority 102. Seller's cash register 284 sends a message 726 which includes the details, terms and conditions of the transaction to the transaction authority 102 over network channel 286. The transaction authority 102, registers a pending transaction, generates a transaction identifier 292, associates it with the pending transaction and returns a message 727, which includes transaction identifier 292, over communication channel 286 to seller's cash register 284. The seller communicates transaction identifier 292 visually or verbally to the user, and the user inputs the transaction identifier 292 into the electronic wallet 7 on mobile device 67 using a traditional input textbox (not shown), or through other input means such as taking a digital photograph with a mobile device 67 camera, or speech recognition of verbal input (all not shown).

The electronic wallet 7 sends message 728 to the transaction authority 102 requesting the details of the pending transaction associated with transaction identifier 292. The transaction authority 102 then returns message 729 to the electronic wallet 7 instructing it to display the details of the pending transaction. The buyer proceeds with the transaction by further communication with the transaction authority 102 through selections made in the electronic wallet 7. When the transaction authority 102 determines that the buyer has fulfilled the terms and conditions of sale, the transaction authority 102 then transfers resources from one or more buyer accounts to one or more seller accounts and sends separate confirmations to the electronic wallet 7 and the seller cash register 284 that the transaction has completed.

Split Payment Process

In some scenarios it may be desirable to efficiently divide a single transaction among two or more purchasers (or buyers). To achieve this, the process associates more than one buyer account with the transaction and then calculates each buyer's paid amount by grouping the payments associated with the transaction by their owner's identifier.

In one embodiment, this functionality would be used in a restaurant to conveniently split the bill among multiple patrons in a single party. Once again, any of the transaction configurations described above can be used, or any variation on the transaction configurations disclosed herein or in fact any other model of transaction. In one embodiment, the restaurant creates a new pending transaction with the system that is marked as splittable and prints the transaction identifier it receives from the system onto the bill. Each of the patrons who would like to use the system to pay enters the transaction identifier into the user electronic wallet 7. This accesses the system and downloads the transaction details, including the shopping cart. The electronic wallet 7 then provides the buyers with a convenient interface for claiming items from the shopping cart. As the buyers claim items, the items become unavailable to the other buyers. Each buyer's outstanding balance complete with prorated tax and tip can be displayed. A convenient interface can be provided to specify the size of the tip. For example, a slider can be provided that allows the user to select between percentages. Alternatively to the buyers selecting items from the shopping cart, the buyers can just select a certain percentage share or dollar value of the entire bill. The interface can also allow users to claim a portion of an item, if that is preferable.

Once the buyer has chosen a share of the bill, the buyer can complete the transaction as before, by applying payment instruments to the payment receptacle. When a buyer completes the share of the transaction the seller is notified via the user transaction access point about how much of the outstanding balance has been paid. This notice can explain how much of the paid value has been applied to the core of the bill, how much has been applied to tax, and how much to tip, as well as which items have been paid for giving the seller an easy way to inform customers using another form of payment what is still owed. The seller can then choose to close the transaction by, for example, entering the amount paid by other means, thereby informing the system that the transaction is complete.

As before, each buyer receives a receipt detailing the user part in the transaction, and potentially giving different associated media to different buyers. For example, a regular customer (one who has performed many transactions with that seller, or one who has a membership account with that seller, or one who is in some other way explicitly affiliated with that seller) receives an invitation ticket to a customer appreciation day, while another buyer who participated in the same transaction might receive a more general coupon, or even nothing with a receipt.

A similar method can be used whereby an online transaction can be shared among multiple electronic wallet users. One way to do this is for one user to be the primary purchaser who communicates with the seller's transaction access point to initialize the transaction. Once the transaction is established, that user can then choose to share the pending transaction with a number of contacts, who can each choose to accept or reject the transaction. If they accept it, it becomes associated with their accounts and they can pay for a portion of the shopping cart as described above, using their computer-based electronic wallets or their mobile device-based electronic wallets. Each sharing event can have a time limit associated with it and if a user has not either accepted or rejected the transaction in the given time limit, the transaction can automatically be rejected by them. If all of the users have either rejected the transaction or paid their share and the total has not been reached, the payers can all be notified, or alternatively only the primary purchaser can be notified, and he/she can either add more payments himself/herself or can try to share the transaction with more contacts etc. Since all of the contacts may not be online simultaneously, the transaction can be stored as pending while the timers associated with the sharing have not run out.

Figure 30:
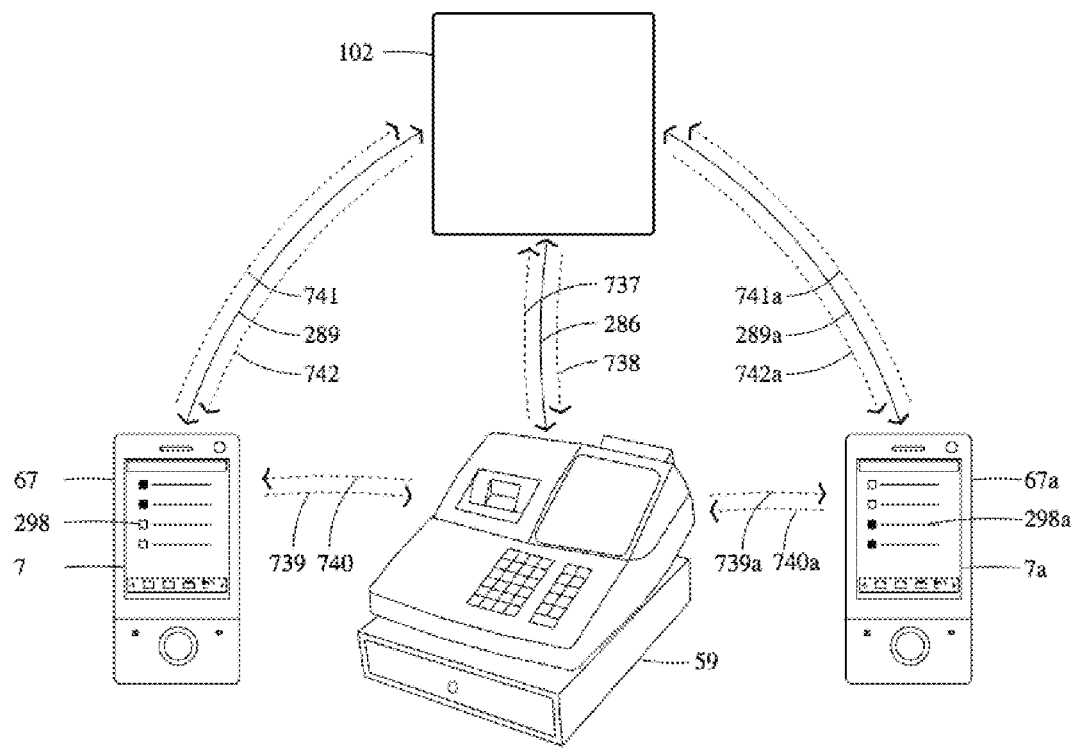
FIG. 30 illustrates an example embodiment of a process where one or more buyers split the cost of a transaction in a store such as a restaurant, where at least one buyer uses the transaction authority for his share of the bill.

FIG. 30 illustrates an example embodiment of a process where one or more buyers split the cost of a transaction in a store such as a restaurant, where at least one buyer uses the transaction authority 102 for his share of the bill. For clarity, this example shows two buyers, both with electronic wallets, splitting one transaction. Here, two buyers indicate physically to the seller that they wish to share the transaction through the transaction authority 102. The seller cash register 284 transmits a message 737 which includes the details, terms and conditions of the transaction, along with an indication that the transaction may be split between buyers, to transaction authority 102 over network channel 286. The transaction authority 102 registers a pending transaction, generates a transaction identifier, associates it with the pending transaction and returns a message 738, which includes the transaction identifier over communication channel 286 to seller's cash register 284. The seller cash register 284 then associates a short ID string for disambiguation purposes (for example, three numerical digits or the name under which the restaurant reservation was made) with this transaction identifier.

At this point each buyer must become associated with the correct transaction, and this can be done in several ways as described earlier in the disclosure in the section related to the various transaction configurations, but for this embodiment we describe that the seller verbally or visually communicates the short ID string to both buyers, and each buyer inputs this short ID string into their electronic wallets 7 and 7a. The electronic wallets 7, 7a then send messages 739, 739a respectively by wireless communication such as Bluetooth to seller's cash register 284 requesting the full transaction identifier as provided by transaction authority 102, and seller's cash register 284 responds with messages 740, 740a respectively including the transaction identifier. The electronic wallets 7, 7a then send messages 741, 741a respectively to transaction authority 102 requesting the details of the pending transaction associated with the transaction identifier. Transaction authority 102 then returns messages 742, 742a respectively to electronic wallets 7, 7a instructing them both to display the details 298 and 298a of the pending transaction.

At this point each buyer responds by selecting from the details 298 and 298a of the pending transaction the items or portion they intend to pay for. As each item or portion is selected by the two buyers, messages are sent by their respective electronic wallets 7, 7a to transaction authority 102 which updates the pending transaction and sends messages to each electronic wallets 7, 7a to update the details of transaction showing the items chosen by each buyer. When all items have been chosen by one of the buyers, each buyer selects to complete the transaction causing messages to be sent to the transaction authority 102. Transaction authority 102 then sends each buyer an updated summary of their respective portions of the transactions, and each buyer then proceeds to complete their portion of the transaction in the manner described elsewhere in this disclosure for simple one party transactions. As each buyer completes his portion of the transaction, transaction authority 102 transfers resources from one or more of the buyer's accounts to one or more of the seller's account and sends confirmation to seller's cash register 284 and sends a receipt to the buyer's electronic wallet program. Any portions of the transaction that are not completed as described above remain shown as unpaid on the seller's cash register 284, allowing one or more of the buyers to pay with an alternate payment method if desired.

As shown above, this system enables all buyers in a shared transaction to pay separately and by any means of payment as long as at least one buyer pays through transaction authority 102. It also allows all buyers who pay through transaction authority 102 to use all forms of payment in their accounts including digital coupons. Because each buyer sees only his own form of payment when paying through his electronic wallet program, the stigma of using coupons is eliminated.

In other similar embodiments, the buyers receive the short ID string for identifying the correct transaction by wireless means. For example, seller's cash register 284 can broadcast the short ID string to all mobile devices with open electronic wallet programs within wireless range. Buyers can select to receive the list of short ID strings for all pending transactions in the vicinity, and select the correct string based on further information from the seller for the purpose of disambiguation. At this point the transaction continues as described above, after the point at which the buyer has inputted the correct short ID string. Alternatively, the all short transaction IDs broadcast by seller's cash register 284 can be bundled with the full transaction identifier, such that when each buyer individually selects the correct short ID string, their electronic wallets 7, 7a send the transaction identifier directly to payment authority 102 over communication channels 289, 289a respectively, and the transaction process proceeds as described above at the point where transaction authority 102 returns the details of the transaction to the buyers. Another embodiment, which has been described more fully elsewhere in this disclosure, involves the buyers logging in to the cash register which then displays their public names and public images such that the seller can select the correct buyers and group them for a particular transaction.

In these embodiments, the short ID strings are only provided to the buyers for convenience in the process of disambiguating between several possible pending transactions. It will be clear to someone skilled in the art that the full transaction identifier can also be used directly by buyers to identify the correct transaction, either by selecting it from a list that was wirelessly received or manually inputting it in some way into the electronic wallet. Any permutation of access point types and transaction configurations can be used.

Figure 31:
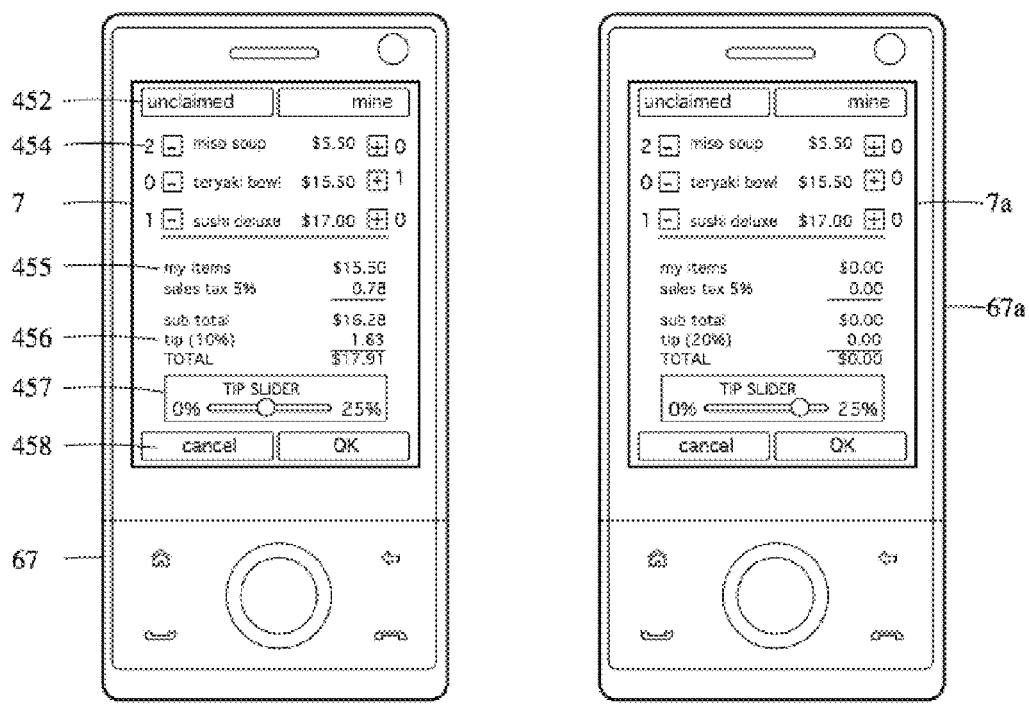
FIG. 31 illustrates an example embodiment of an interface that enables two buyers to share a transaction in a restaurant.

As previously noted, transaction authority 102 provides a mechanism for splitting transactions between multiple buyers. FIG. 31 illustrates an example embodiment of an interface that enables two buyers to share a transaction in a restaurant. As previously described, the transaction authority sends the details of the shared transaction to each of the electronic wallets 7, 7a on mobile devices 67, 67a. At this point we will show how one buyer, the user of electronic wallet 7, interacts with the interface, and the other buyer, the user of electronic wallet 7a has not yet made any selections.

The user selects items from the displayed transaction details 417 which show all items associated with the transaction. Initially the items are displayed under a heading "unclaimed" 416. When an item is chosen, the number of unclaimed items of that type is decremented by one, and the number of claimed items of that type under the heading "mine" is incremented by one. Also, a message is sent to the transaction authority (not shown), which instructs the transaction authority to associate that item with the user of electronic wallet 7, updates the transaction details displayed in the electronic wallets of all the buyers in the shared transaction to reflect this change, including the cost summary 418 on the electronic wallet 7. At any point in the transaction, the buyer can also determine a tip, if applicable, which can be done through a graphical slider 420 which changes the tip portion 419 of cost summary 418.

The user can select to cancel their participation in the transaction or proceed with the transaction by selecting from controls 421. From that point, the transaction can proceed as described elsewhere in this disclosure, with a payment receptacle being displayed on the electronic wallet, or alternatively, by an automated sequence where the selection of the OK button causes the electronic wallet to conclude the transaction with a pre-selected form of payment. The other buyer in the transaction follows the same process to select and pay for items from the unclaimed list, which this figure shows as having been decremented by the items previously chosen by the user of electronic wallet 7.

Alternate Payment Process

An alternate payment process is configured so that the payment instrument's true data is stored with the graphical representation of that payment instrument. In this configuration dragging and dropping the graphical representation actually transmits the actual account information into the payment receptacle 220. The payment receptacle 220 transmits this data directly to the seller system rather than through the payment authority 102. To help secure the transaction, either the user computer 100 or the seller system can initiate establishment of a secured communication channel prior to transmission of the data between the two entities. Moreover, the data itself can be encrypted prior to transmission with decoding data sent separately from the encrypted actual account information.

Upfront Currency Conversion:

Each payment instrument which represents some form of financial account or gift card has an associated currency. Every transaction also has an associated currency specified by the currency of the account which the vendor has chosen to use to receive the funds required to complete the transaction. When a user selects through the electronic wallet 7 a payment instrument of a type which has an associated currency, the currency associated with the instrument is compared with the currency of the transaction. In response, an upfront currency conversion is shown in the payment receptacle 220. That is, data such as the outstanding balance is shown in both currencies, allowing the user to accurately gauge the price of the transaction. Once the payment instrument is applied, the value of the payment it represents is shown in both currencies which may be shown as, for example, a tool-tip when the user rests the user cursor's hotspot over the instrument.

The currency conversion can be performed dynamically by having the system communicatively coupled with a foreign exchange system. Depending on the length of time that a currency conversion remains static, and the amount of risk the system is willing to withstand, different rates can be used. A rate may potentially change many times per second, which can be reflected in a fluctuating valuation. It is unlikely that a currency conversion rate could fluctuate so dramatically over the course of a consumer purchase that the actual price changes, but if it does the user can be notified explicitly of the event to help keep the user informed.

Wireless Cash Register

The electronic wallet 7 in some embodiments may be configured to function as a transaction access point. The configuration is created by associating tables (e.g., in a database or file in the storage device 8) of the user account to now allow receipt of funds similar to a seller account. The user can further structure the configuration to select acceptable payment instruments for received incoming funds. The cash register could then accept incoming connections in the same manner any other real-world transaction access point to facilitate transactions. In one embodiment, the wireless device acts as an access point as described above. Similarly, the user can use other types of access points to make a transaction access point, such as geographical access point, manual input access point, or even an online access point.

Abstraction of True Account Details so that the Transaction Authority does not Store any Real Account Information for a User's Payment Instruments The electronic wallet 7 does not necessarily hold the actual underlying account's information for the instances of payment instruments it contains. The electronic wallet 7 may just hold an identifier which points to each payment instrument's actual data including underlying account information, which is securely stored at a server in the transaction authority 102. Actual account numbers can even be abstracted away entirely, so that even the transaction authority does not store the user's real account number or related information. For the example of a credit card, to initialize the payment instrument, the user inputs credit card details into the electronic wallet 7 including, for example, the credit card number, expiry date, and other pertinent credit card details. The electronic wallet 7 transmits those details to the transaction authority 102 in a secure manner, e.g., over a secured communication channel.

The transaction authority 102 contacts the credit card company which determines the validity of the information. Once verified, the credit card company uses an API or some other means, to associate the user's real card number with a newly generated special identifier that is meaningless other than as a means to look up the real credit card number in the credit card company's database. The credit card company returns the new identifier to the transaction authority 102, which associates it with the user account. The transaction authority 102 then transmits to the electronic wallet 7 either the new identifier, or alternately an internal identifier that points to the new identifier securely stored at the transaction authority 102. The transaction authority 102 may also transmit potential other pieces of data such as an image of the card to be displayed in the user interface of the electronic wallet 7. In one embodiment this is done by issuing an instance of the credit card company's appropriate credit card definition. The special identifier can be associated as instance specific data.

The credit card company can configured with a special gateway to the transaction authority 102. This gateway can be configured to admit data connections from the transaction authority 102 by checking the incoming data's source IP address, by requiring the data to be signed, by having a special dedicated physical network connection, or any other known means, or any combination of means of doing so. When the user applies the credit card to a transaction in the manner described above, it instructs the transaction authority 102 to charge the card by using the special identifier. The transaction authority 102 can send the details of the charge to the credit card company, with the special identifier stored at the transaction authority 102 substituted in for the real credit card number. Because the instruction is being sent from the transaction authority 102, the credit card company allows the connection and uses the transmitted identifier to look up the actual credit card number from the table and charges the specified amount. The recipient of the charge could be the entity in control of the server which could then forward funds to the seller, or be the direct seller. The principles noted can also be applied to debit cards or payment configurations that include some sort of account number or other information that is best kept secret, for example a checking or savings account underlying account number and routing number.

The system can also store account numbers, such as the aforementioned credit card numbers, directly and operate in a more traditional manner. The value of operating in the other manner noted immediately above is that if the main data server is hacked, the hacker cannot steal real account numbers. The hacker will only get information that is completely meaningless to anyone who can not communicate with the credit card company, in this example as the transaction authority 102.

Cash, Credit Card, Debit Card, Gift Card, and Receipt Editors

The configurations disclosed can be further structured to supply web-based or stand-alone editors which can be used by users, banks, credit card companies, stores, and other businesses and entities to create and modify the definitions of their various draggable objects. These editors provide the graphical and grammatical means to edit the shape, graphics, media, and internal logic of the draggable objects as previously described. For example, a store can use a cash editor to create its own currency similar to the 'Canadian Tire Money' issued by CANADIAN TIRE stores. Stores can similarly use a receipt editor to edit the appearance of the receipt header or to modify the behavior of a receipt to contain an embedded program which tracks the shipping location of the items on the receipt. Once again these examples should not be construed as limiting.

Access Point Managers for Cash, Credit Cards, Debit Cards, Gift Cards and Receipts The configurations disclosed can be further structured to supply web-based or stand-alone editors which can be used by banks, credit card companies, stores, and other businesses and entities to define and manage the behavior of an access point by using a grammar or editor as previously described. For example, the owner of an online video website can define a payment receptacle to act as a video micropayment receptacle so that it contains a video player which displays a preview or freeze frame of a video as well as a small price. Once a user drags a sufficient payment onto the payment receptacle, the video starts to play, and the user receives a receipt. Another example involves placing a coupon dispenser into a video player so that advertising can be delivered during a television show or movie. Alternatively, a store can define a receipt receptacle access point to act as a processing initiator for returning an item for a refund. Another example consists of a payment receptacle which is integrated with an Internet phone company such as SKYPE to create an Internet payphone. Once again, these examples should not be construed as limiting.

Coupon and Advertising Configurations

The configuration disclosed can integrate a digital coupon and advertising process. This configuration includes simple methods for downloading coupons to the electronic wallet 7, and simple methods for spending coupons by, for instance, dragging and dropping them into payment receptacles In one embodiment the coupons are digital objects with coupon definitions associated with the advertiser's account, and coupon instances associated with the coupon holder's accounts. All information related to coupons and their definitions is managed by a coupon authority, which can be an integrated subsystem of the transaction authority 102. All instances based on the coupon definitions are minted by the coupon authority. Whether coupons have been applied to transactions is recorded by the coupon authority, as are coupons' chains of custody from the time they are minted to the time they are spent, including all data related to how and when they were shared. As will be understood by someone skilled in the art of relational databases, the data known to the coupon authority can be used in many different ways, including statistical analysis for targeted advertising and user profiling.

The roles in this configuration include customers who download, share, and spend coupons, advertisers who use the system to advertise their goods or services by creating coupons which are disseminated to users of the system, and advertising access point owners who deploy the coupons. (These owners may also be advertisers, in which case they can use their access points to deploy their own coupons as well as those belonging to others. Otherwise they can rent out their access points to the system, which determines the coupons to be displayed on a case-by-case basis whenever a user interfaces with that access point.)

The configuration has a number of advantages over conventional coupon systems. Current coupon systems rely on codes which are typically typed into a text field in order to be used. This is a clumsy user interface, because it requires users to type what are sometimes long and complicated codes, and it is easy to make typographical errors during the code entry. The current configuration allows for simple drag and drop operations and automatic downloads and coupon applications making the interface much more user friendly. In addition, they can be associated with graphics, sounds, and videos, giving them functionality and appeal which conventional coupon codes and SMS coupons lack.

Another advantage of this configuration has to do with coupon stigma. Many people don't like to use coupons because they don't want to be seen as cheapskates. Conventional systems allow the details of the payment to be seen by a cashier or anyone else, which has historically created a stigma, and the presently described configuration avoids this problem because its transactions are performed entirely privately, beyond the scrutiny of a cashier or anyone else, thereby solving the problem of coupon stigma. The payment system is trusted by both the vendor and the coupon user to determine the coupon's applicability and value and apply it to the transaction.

In addition, the integrated digital coupon and advertising subsystem delivers coupons and other targeted advertising both online and in public. The system has many 'advertising access points' which are associated with websites, signs, billboards, store fronts, geographical areas, etc., letting users access the system at various locations, both online and in public. This allows targeted advertising in the form of coupons and other information to be delivered to the user's electronic wallet 7 within a variety of different contexts.

In addition, since the system uses the same accounts both online and in the real-world, it allows the user to not only receive coupons both online and in the real-world, but also to spend coupons both online and in the real-world. This unifies the area of advertising across these currently disjoint domains and enables an entirely new type of advertising which cross-fertilizes them.

Another major benefit gained from integrating the coupon and advertising system with a payment system and social network is that this enables targeted advertising to a level of accuracy which isn't otherwise feasible. Current advertising, both online and in the real world attempts to target its audience using broad brush strokes. For example, television commercials advertising certain products are scheduled during shows which appeal to the demographic most likely to buy that product. Current online advertising is similarly targeted by advertising products which are most likely to appeal to the demographic which would be interested in the web page that the advertising appears on.

Because the coupon and advertising system is integrated with the payment system, it is able to target and deliver advertising on an individual basis rather than on a demographic basis. The payment system has a complete record of all the purchases ever made by a user, and because the payment system is also integrated with a social network, it can also know the purchases made by all of the user's friends. In addition, it has access to many other streams of data providing information about a user such as the user explicitly entered preferences and wish lists, which coupons the user's friends have shared, which coupons the user currently has, etc. The system is therefore able to build a much more accurate user profile than standard advertising techniques, and this user profile can in turn be used to deliver advertising which is customized on an individual basis.

The configuration also determines the context in which advertising is being delivered to the user. Since the advertising context can strongly affect which types of advertising might be appropriate under the circumstances, this is a very important ability. Current advertising methods such as online banner ads, television commercials, posters, and billboards are all very limited in their ability to customize their advertising for specific users based on the context that they are in.

Whether the user is accessing the advertising online or in the real world, whether the user has actively solicited the advertising or not, whether the user is out with friends, at a sporting event, and even weather conditions are all examples of contextual information which can strongly influence which advertising should be delivered by the system to the user. The presently-designed configuration tracks a coupon from its point of deployment all the way through to the point of sale. This allows the system to bill advertisers only for the advertising which led to a sale, rather than for all of the advertising, providing a much more accurate method for billing, and allowing the system to avoid click fraud. In addition, this ability makes it possible to provide advertisers with a detailed accounting of how much they spent on each advertising campaign compared with how much revenue that campaign generated, as well as detailed statistics on the demographics of the web sites and the users associated with successful sales.

It is noted that the coupons are also viral. If the advertiser who defined the coupon allows it, users of the system can transfer or share those coupons with the contacts in their social network, adding a strong viral component to the advertising system. The ability to share coupons leverages the knowledge that people have about the tastes and proclivities of their friends and family, also providing another dimension to the system's capacity for targeted advertising. In addition, since the system keeps track of the chain of custody of each coupon, it is able to reward users who shared coupons that led to sales.

The configuration also uses different grammars (described in more detail elsewhere in this disclosure) or the purposes of defining the behavior of coupons, the properties of advertising campaigns, and the behavior of advertising access points. These grammars can be implemented as programming languages, scripting languages, or various other ways, and they provide advertisers and access point owners with complete power and flexibility over their coupons, advertising campaigns, and access points, which stands in contrast with the way in which current coupon systems are implemented in which the fields in the coupons are much more rigid.

Figure 32:
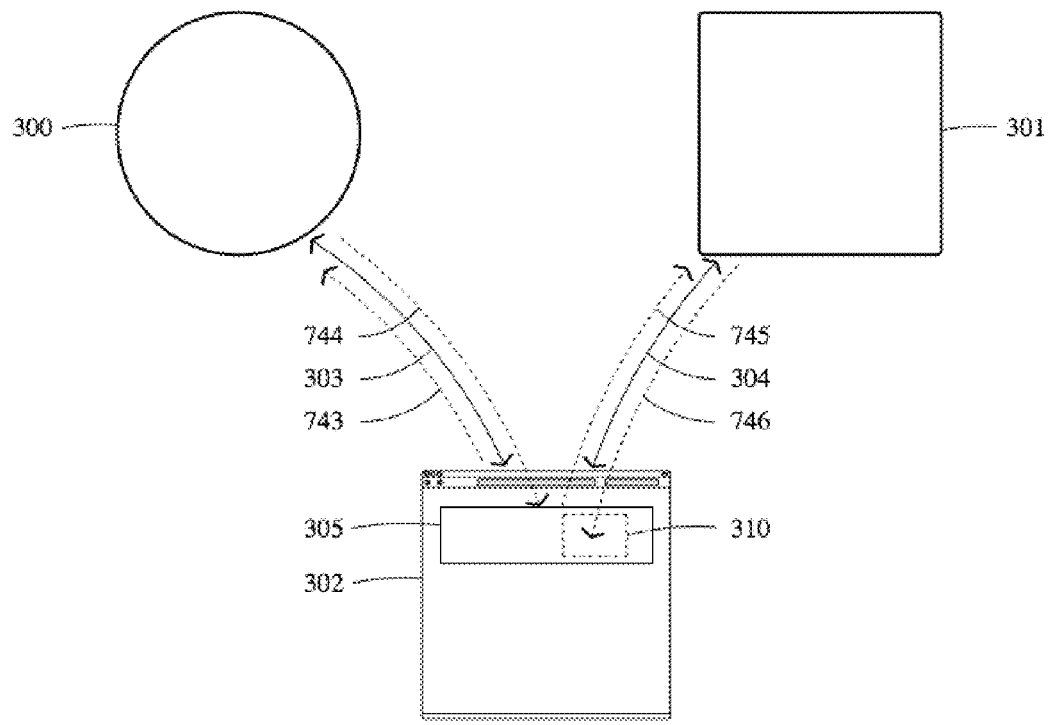
FIG. 32 illustrates an example embodiment of a process for presenting a coupon on a webpage displayed on a screen of a user computer in the case where the coupon system has no access to information about the user.

FIG. 32 illustrates an example embodiment of a process for presenting a coupon on a webpage displayed on a screen of a user computer 100 in the case where the coupon system has no access to information about the user. A user opens a web browser and sends request 743 over communication channel 303 to web server 300 to display webpage 302. Advertising access point 300 returns message 744 containing web page 302, a non-initialized coupon dispenser 305, and advertising access point 300's ID, over communication channel 303 to the user's web browser. Coupon dispenser 305 then looks on the user's computer (not shown) for contextual information that the user has permitted the coupon system to read, such as the user's identity and other data found in an open electronic wallet 7, the URL of web page 302, cookies, etc. Coupon dispenser 305 then sends message 745 containing contextual information if any, along with advertising access point 300's ID to coupon authority 301 over communication channel 304, requesting a coupon. Coupon authority 301 then picks, according to a pre-arranged set of rules taking into account the access point's logic, the user's identity and profile, the website's identity and profile, etc., a coupon definition associated with advertising access point 300's account, then mints a coupon complete with a coupon identifier, registers the coupon as unclaimed in the database, registers the coupon as originating from advertising access point 300, and sends the details of the coupon in message 746 over communication channel 304 to coupon dispenser 305, where it is displayed as coupon 310. In addition, the coupon authority can also fill the dispenser with more than one coupon.

In this embodiment, the details of the coupon(s) sent by coupon authority 301 to coupon dispenser 305 may be in one of several forms, depending on the manner in which the coupon system is enabled. For example, the coupon details can include only a coupon identifier and the display media. In another example, the coupon details can include the coupon identifier, the display media, and some or all of the coupon data. And in another example, the coupon details can include the coupon ID, display media and the coupon definition.

Figure 33:
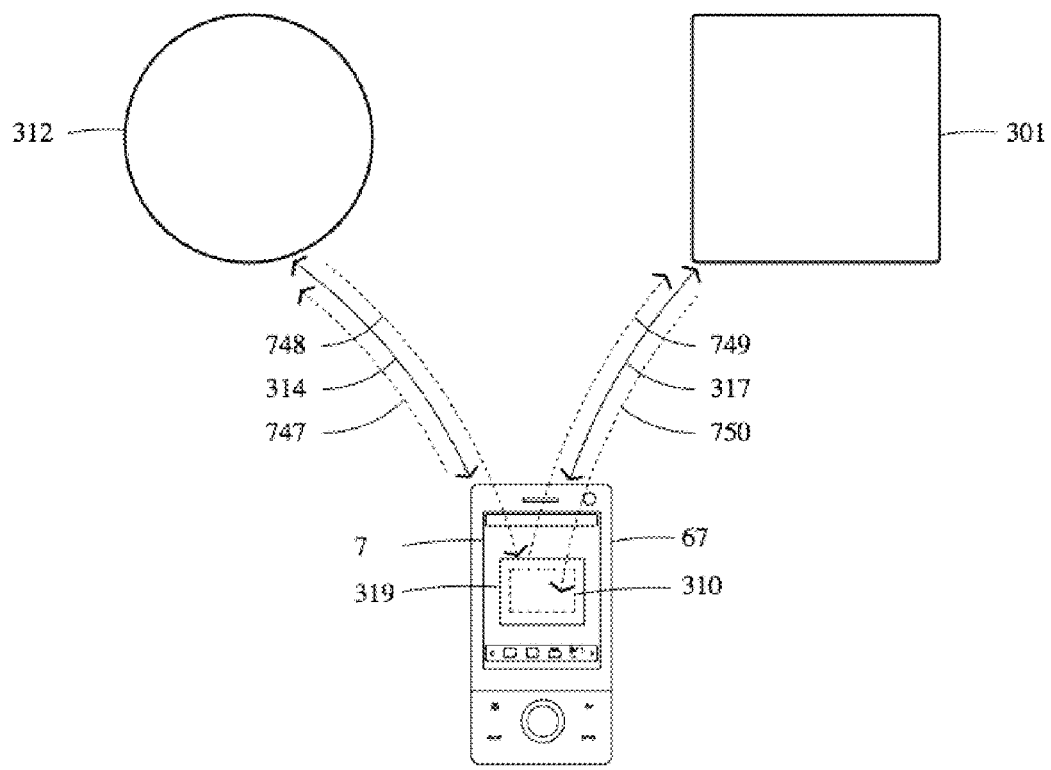
FIG. 33 illustrates an example embodiment of a process by which a user elects to download a coupon to a mobile phone from an advertising access point.

FIG. 33 illustrates an example embodiment of a process by which a user elects to download a coupon to a mobile phone from an advertising access point. The user finds an advertisement of a visible or audible kind that offers a coupon downloadable to a mobile phone. The user opens electronic wallet 7 on mobile device 67 and selects to send message 747 requesting a coupon over communication channel 314 to advertising access point 312. Advertising access point 312 then returns message 748, which includes non-initialized coupon dispenser 319 and advertising access point 312's ID, over communication channel 314 to electronic wallet 7. Coupon dispenser 319 then looks on mobile device 67 for contextual information about the user that, by prior selection, has the coupon system has been permitted to read. Coupon dispenser 319 then sends message 749 containing contextual information if any, along with advertising access point 312's ID, to coupon authority 301 over communication channel 317, requesting a coupon. Coupon authority 301 then picks, according to a pre-arranged set of rules, a coupon definition associated with advertising access point 312's account, then mints a coupon complete with a coupon identifier, registers the coupon as unclaimed in the database, registers the coupon as originating from advertising access point 312, and sends the details of the coupon in message 750 over communication channel 317 to coupon dispenser 319, where it is displayed as coupon 310.

In this embodiment, the advertisement which the user finds and which offers a downloadable coupon, can occur in many and varied forms. For example, the advertisement can be a billboard, a television program, an announcement over a public address system at a shopping mall, a poster at a bus stop, or even a message spoken by a person, as long as there is an associated wireless device capable of communicating with a mobile device.

Figure 34:
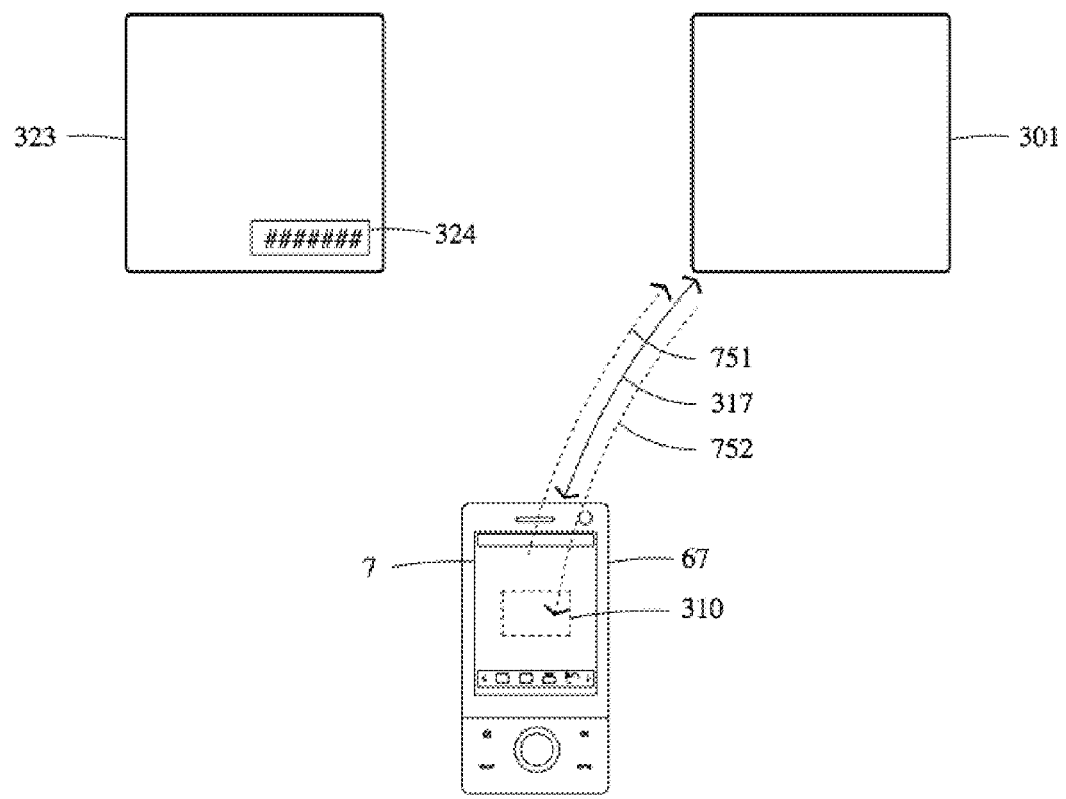
FIG. 34 illustrates an example embodiment of a process by which a user elects to download a coupon to a mobile phone directly from the coupon authority through the input of a coupon code.

FIG. 34 illustrates an example embodiment of a process by which a user elects to download a coupon to a mobile phone directly from the coupon authority through the input of a coupon code. This code, though referred to here as a coupon code, could either be the identifier of a coupon definition, the identifier of a pre-minted coupon, or the identifier of a coupon access point. The user finds an advertisement of a visible or audible kind which offers a coupon that is downloadable to a mobile phone and which contains a coupon code. The user observes advertisement 323 containing coupon code 324. The user then opens electronic wallet 7 on mobile device 67, enters coupon code 324 into a portion of electronic wallet 7 that is arranged for that purpose, and selects to send message 751 containing coupon code 324 over communication channel 317 to coupon authority 301, requesting a coupon.

Depending on the nature of the coupon code, different events occur next. If the coupon code is the identifier of a coupon definition, coupon authority 301 uses the coupon definition to mint a coupon and registers with the coupon authority that the coupon has been claimed by the user of the electronic wallet 7. If the coupon code is the identifier of a pre-minted coupon, the coupon authority registers with the coupon authority that the coupon has been claimed by the user of electronic wallet 7. Finally, if the coupon code is the identifier of the access point, the coupon authority may mint a new coupon and associate it with the user's account or may associate a pre-minted coupon with the account, but in either case can register the coupon as originating from the account associated with the access point owner associated with the access point identifier. Finally, the coupon authority sends the details of the coupon in message 752 over communication channel 317 electronic wallet 7, where it is displayed as coupon 310.

In this embodiment, the coupon code can be represented in any form that the user can recognize and repeat, such as an audible sound, a visible set of numbers, letters or symbols, or even a barcode or other such symbol which can be photographed by a mobile device's camera. In this embodiment, as in all embodiments of the coupon system, the details of the coupon sent by coupon authority 301 to the electronic wallet 7 may be in one of several forms, depending on the manner in which the coupon system is enabled. For example, the coupon details can include only a coupon identifier and the display media. In another example, the coupon details can include the coupon identifier, the display media, and some or all of the coupon data. And in another example, the coupon details can include the coupon ID, display media and the coupon definition.

Figure 35:
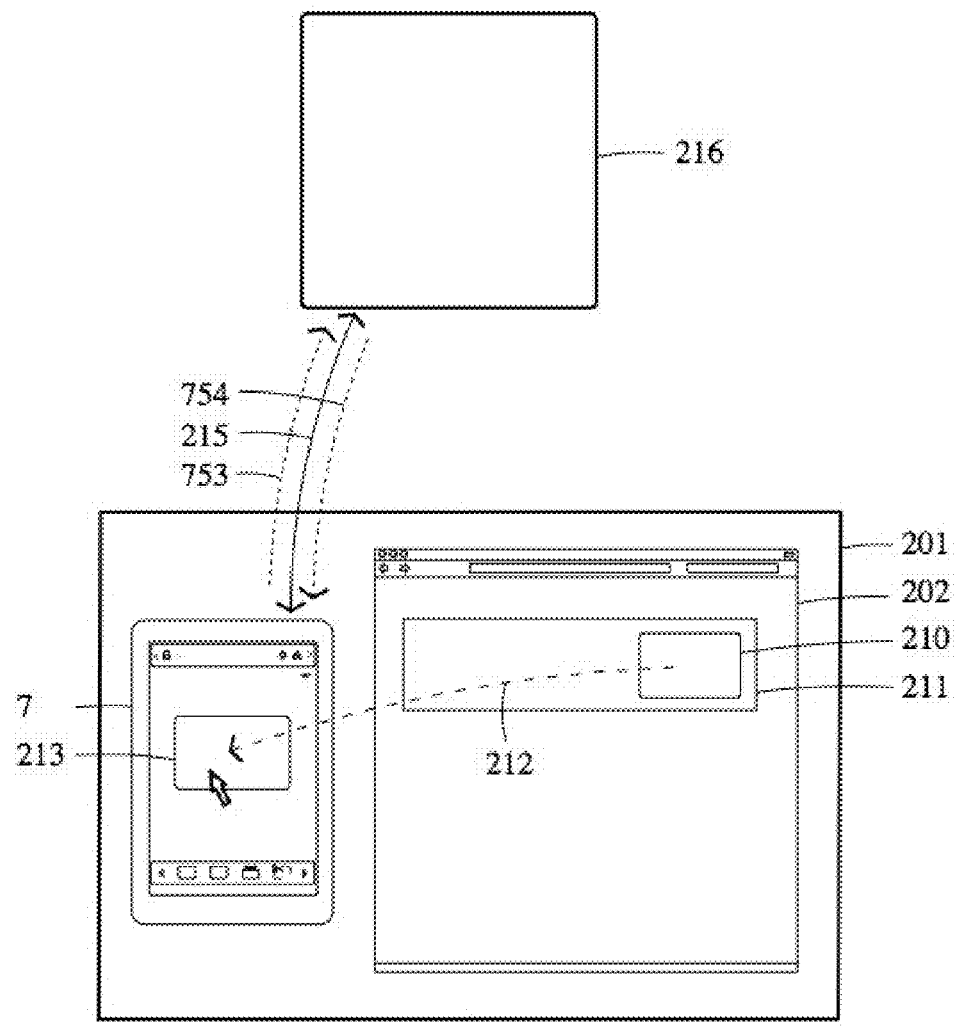
FIG. 35 illustrates an example embodiment of a process for downloading a coupled from a webpage to an electronic wallet 7.

FIG. 35 illustrates an example embodiment of a process for downloading a coupon from a webpage to an electronic wallet 7. A user finds coupon 210 in coupon dispenser 211 on web page 202 displayed on computer display 201. The user selects the graphical image of coupon 210 and drags it with drag 212 to drop target 213 in electronic wallet 7 which is also open on computer display 201. When the graphical image of coupon 210 is dropped on drop target 213, electronic wallet program sends instruction 753 over communication channel 215 to coupon authority 216, causing coupon authority 216 to change entries in its coupon data base to show that coupon 210 has been claimed from coupon dispenser 211 by the account associated with electronic wallet 7. At that point coupon authority 216 can send message 754 containing the details of coupon 210 to electronic wallet 7 over communication channel 215, such that coupon 210 can be displayed by the electronic wallet. Once downloaded and associated with the user's account, the coupons can be spent in any type of payment transaction such as an online or mobile payment, or shared, deleted, just held, etc.

Figure 36:
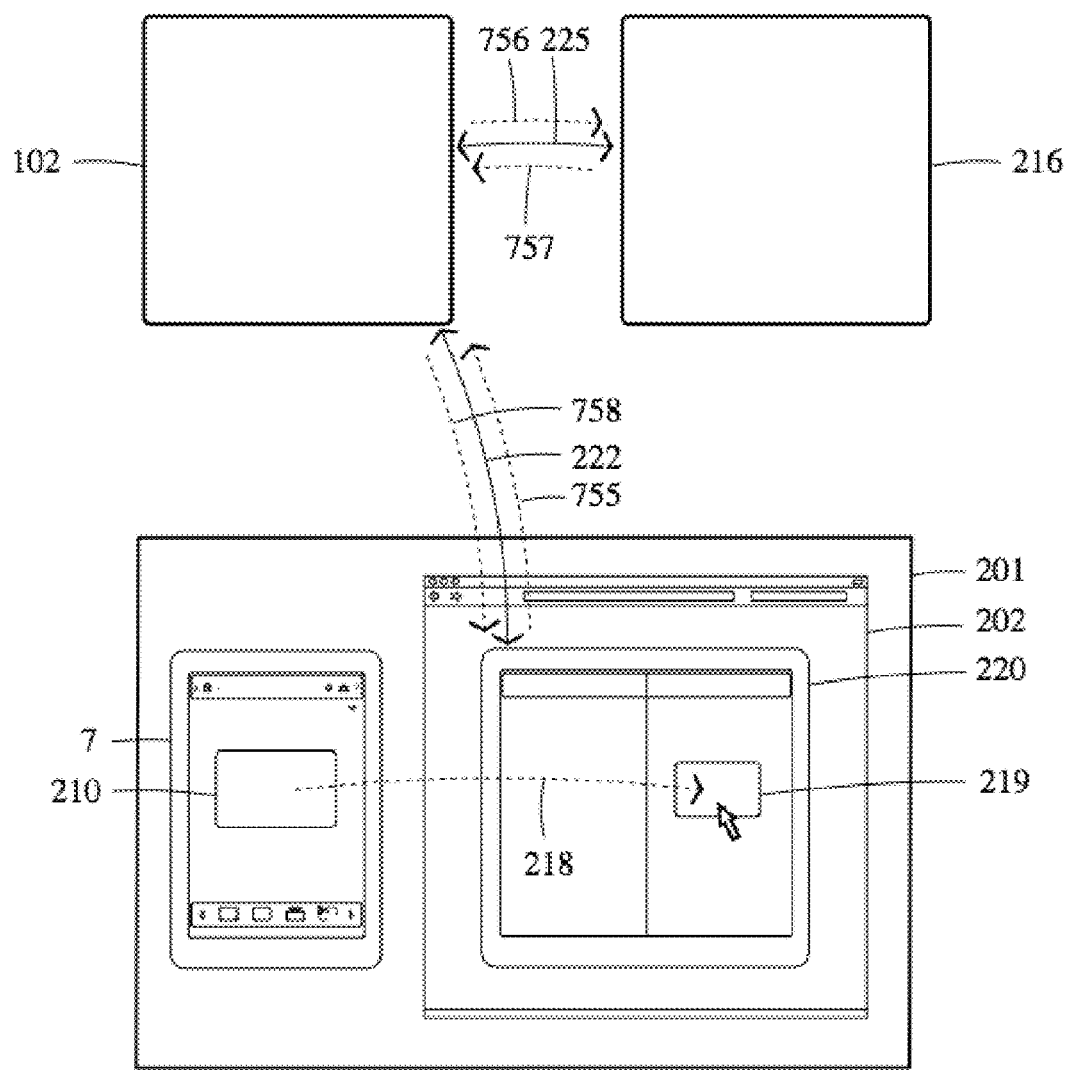
FIG. 36 illustrates an example for applying a digital coupon to a transaction with an online seller.

FIG. 36 illustrates an example for applying a digital coupon to a transaction with an online seller. The user selects the graphical image of coupon 210 displayed in digital wallet 7 and moves it by drag 218 to drop target 219, which is located in payment receptacle 220 displayed in conjunction with web page 202 on computer display 201. When the graphical image of coupon 210 is dropped on drop target 219, payment receptacle applet 220 sends instruction 755 containing coupon 210's ID over communication channel 222 to the transaction authority 102, instructing it to apply coupon 210 to the pending transaction being facilitated by payment receptacle 220.

The transaction authority 102 sends message 756 over communication channel 225 to coupon authority 216 containing coupon 210's ID and details of the pending transaction. Coupon authority 216 finds coupon 210 in its database, carries out a sequence of steps according to a pre-arranged set of rules to determine the value of the coupon in the pending transaction, registers a pending change in the status of coupon 210 in the coupon database, and returns a message 757 including the determined value of coupon 210 over communication channel 225 to the transaction authority 102.

The transaction authority 102 applies the determined value of coupon 210 to the pending transaction and returns instruction 758 to payment receptacle 220 over communication channel 222 to display a graphical representation of coupon 210 along with the determined value of coupon 210 in the details of the pending transaction.

If the transaction proceeds to completion through further successful interaction between the user and the transaction authority 102, the transaction authority sends an additional message (not shown) to coupon authority 216 instructing it to change the custody of the coupon according to a series of pre-arranged steps determined by the coupon's grammar.

Figure 37:
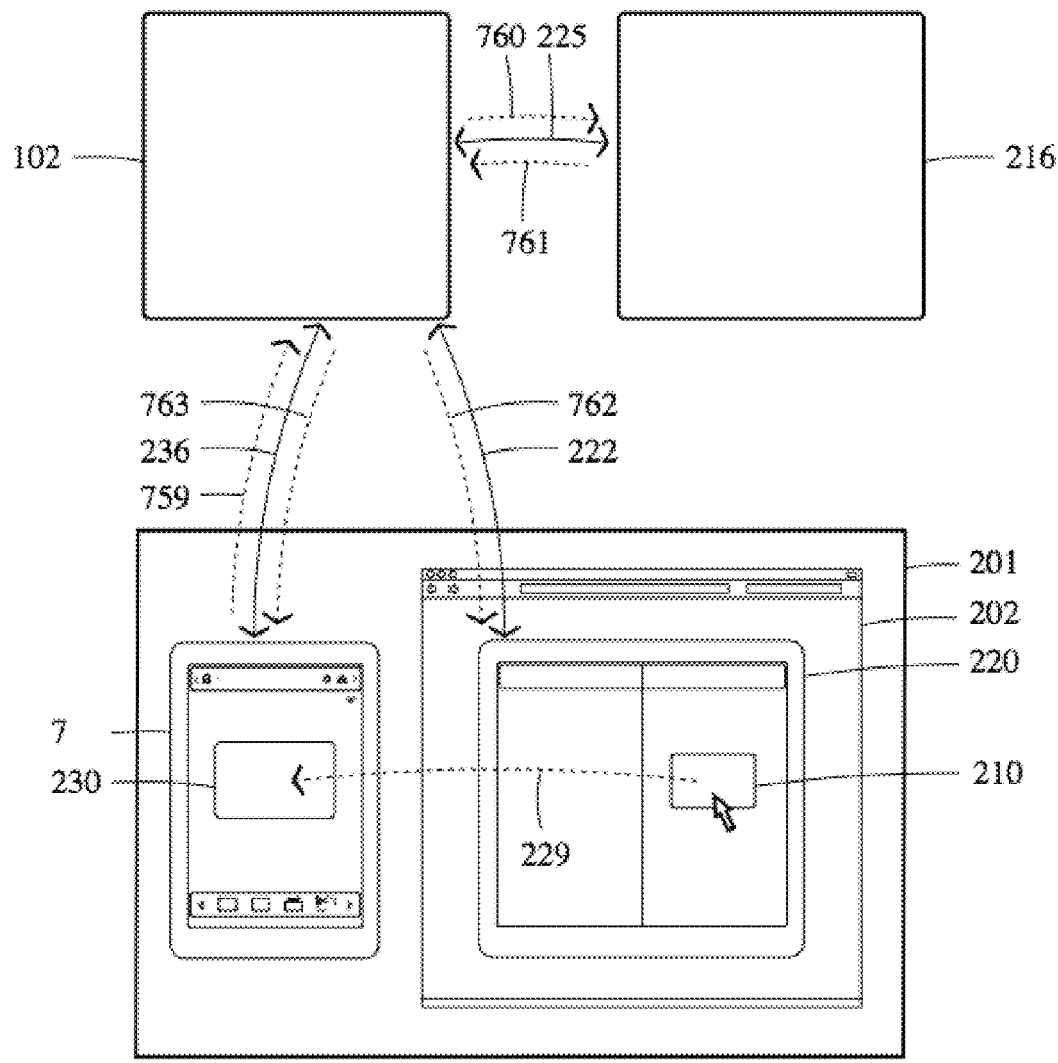
FIG. 37 illustrates an example for applying a digital coupon to a transaction with an online seller.

FIG. 37 illustrates an example embodiment for canceling application of a coupon to an online transaction before completion of the transaction. The user selects the graphical representation of coupon 210 displayed in payment receptacle 220 shown in conjunction with web page 202. The user moves the selection with drag 229 to drop target 230 in the electronic wallet 7, which is displayed on the same computer display 201 as web page 202. When the graphical representation of coupon 210 is dropped on drop target 230, electronic wallet 7 sends instruction 758 containing coupon 210's identifier over communication channel 236 to the transaction authority 102, instructing it to cancel the application of coupon 210 to the pending transaction.

The transaction authority 102 transmits a message 760 over communication channel 225 instructing coupon authority 216 to cancel the pending change in the status of coupon 210. Coupon authority 216 restores the database entry for coupon 210 to its status prior to the pending transaction, and sends message 761 to the transaction authority 102 confirming the cancellation. The transaction authority 102 deducts the previously determined value of coupon 210 from the amount tendered to that point in the pending transaction, and sends instruction 762 over communication channel 222 to payment receptacle 220 to display the revised status of pending payment. The transaction authority 102 also sends message 763 over communication channel 236 to the electronic wallet 7 instructing it to display a graphical representation of coupon 210, confirming that the application of coupon 210 to the pending transaction has been cancelled. The cancelling of the application of other types of digital objects during transactions is carried out similarly.

The components of the digital coupon and advertising configuration will now be described. A coupon authority can be an integrated subsystem of the transaction authority 102. It has one or more servers that is/are responsible for storing and manipulating all of the information pertaining to coupons, including accounts, coupon definitions used to create coupons, which coupons are unclaimed, which users own which coupons, which coupon dispensers contain which coupons, which coupons have been applied to which transactions, etc. The transaction authority 102 is integrated with the coupon and advertising subsystem.

A coupon editor can be accessed online or downloaded and used as a standalone program. The coupon editor is used by advertisers to create coupon definitions which are created using a coupon definition grammar, and then stored by the coupon authority. Coupon definitions are not coupons, but rather are used to mint the coupon instances that can be stored in dispensers or downloaded by users. A single advertiser may have multiple coupon definitions which are all stored in the advertiser's account parsimoniously so that information is not duplicated. For example, instead of each coupon definition containing the advertiser's identity, this is stored only once in the account, and all coupon definitions in the account are automatically associated with it. An advertiser account can have multiple subaccounts allowing many employees with various permissions to generate coupons for the same entity.

Advertising access points are the interface points at which a user can access the digital coupon and advertising subsystem in order to load dispensers from which to download coupons. Advertising access points exist both online and in public in the real-world. Examples of advertising access points include web sites, real-world billboards, posters, signs, store fronts, and predefined geographical areas, all of which and more are described elsewhere in this disclosure. This allows these standard visual advertising methods to be turned into a means of matching the electronic wallet 7 running on a mobile device in public with the account of an advertiser in order to deliver advertising. In some cases this is done by mounting a device capable of communicating wirelessly over relatively short ranges by mounting Internet-connected Bluetooth, radio frequency, WiFi, or other appropriate transmitters in them. Ideally, the range of the transmitter is calibrated to be roughly equal to the visual range of the sign, but this is not absolutely necessary. An Internet hotspot, cellular phone Internet connection, or enabled cash register can also act as a mechanism to interface with the user's wallet program. The signs, posters, billboards, etc. may themselves contain the hardware, or these may simply be located nearby. Access points also need not be stationary, but can be located on busses, subway cars, street cars, planes, or other vehicles. Several other types and paradigms of access points are described elsewhere in this disclosure.

Each advertising access point gives credit to its owner for any coupon downloaded from it which leads to a sale. The system therefore associates an access point with every coupon downloaded from it. If that coupon is spent, then the access point owner is rewarded. In the case where the access point is a web page, the web page owner or representative uses an API to embed a coupon dispenser in that web page. The API translates a simple server-side tag such as <coupon dispenser username="name" password="password"> into an embedded applet or program with a code retrieved from the server by a quick automated access point login performed during server side page generation. Alternatively, the coupon dispenser may be initialized with this code, which is used to tell the coupon dispenser where it came from in order to give the right access point credit for coupon downloads which come from it. Once the page has been loaded onto a client's web browser, the coupon dispenser applet or program runs, which uses the access point code to download the details of the first advertisement and coupon it will display to the user from the server. The coupon dispenser can be implemented as an applet, ActiveX control, using Ajax, Flash, or any other similar technology. In the real-world setting, the access point is generally already logged in, and sends the identification code to the mobile device which is running the electronic wallet program, which then loads the coupon dispenser.

Advertising access points are owned by businesses or individuals, and there are at least two fundamental types, including those in which the coupons to be displayed are defined by the access point owner, as well as those in which the coupons being displayed are chosen by the transaction authority 102.

Coupon dispensers are the programs associated with advertising access points which hold the coupons that a user can download into the user account using the electronic wallet 7. When accessing the system using a device containing a sufficiently large screen, coupon dispensers are displayed external to the electronic wallet 7 and can take the form of banner ads, widgets, applets, or other programs, and can also exist in web pages or other programs. Similarly, if the user accesses the system using a device containing a smaller screen, such as is found on a typical smart phone, the coupon dispenser is shown within the mobile electronic wallet 7. A coupon dispenser can display one or more coupons simultaneously and also change which coupons are displayed dynamically.

Advertising access points can host several coupon dispensers and receptacles at once, typically one per person. This may apply to dispensers and receptacles for all types of digital objects in the system. Dispensers may be set by their owners to contain a particular coupon, or they may be designated to be filled with whichever coupons the system deems appropriate, based on the user who is accessing it.

A context determination system determines the main aspects of the context within which the user is accessing the system, including but not limited to the following scenarios: Whether the user is accessing the system online or in the real world, if the user is accessing the system from a home desktop computer, a laptop computer at home, a laptop computer in public, or a mobile device, where the user is located, whether or not the user is soliciting the advertising, etc. In addition, external factors such as the weather, the user's birthday, and any other accessible pertinent facts can be considered by the context determination system. This is an important step because the context of the user's interaction with the system often has a strong effect on the type of advertising which is offered. For example, the coupon(s) that might be displayed in a banner ad online which the user hasn't explicitly solicited would be very different from the coupons which are displayed when the user walks up to a sign and presses the 'download nearest coupon now' button in electronic wallet 7 on the user mobile device 67, which in turn would be very different from the coupons and maps which are displayed when the user is standing in public and presses a 'recommend restaurants near me' button.

The user's location can be determined by the system using one or more well-understood methods such as GPS, triangulation, or by determining if they are near parts of the system such as short range transmitter access points which have had their locations determined, either by some automated means such as global positioning system (GPS) or by having had its location entered into the system manually. The system also contains a categorization of various goods and services such as a hierarchy of product categories at various levels of granularity such as 'home electronics' with sub-categories such as 'home theatre', 'computers', 'stereo systems', etc. where sub-categories such as 'computers' can have further sub-categories such as 'monitors', 'peripherals', 'hard drives', etc. Dishes in restaurants can be similarly categorized into 'Italian', 'Chinese', 'Greek', etc., with Italian food being further sub-categorized into 'pasta', 'pizza', 'Italian wines', 'Italian meat dishes', etc. Items or dishes can belong in more than one category. For example, a dish might fall in the 'vegetarian' category as well as the 'pasta' category. This categorization may be stored as a tree, a hypergraph, or some other appropriate data structure, and it is used to help stores, restaurants, advertisers, and other businesses to enter products, dishes, services, etc. into the system so that the system has a strong semantic understanding of the relationships between these products and services which it can then use to build strong user profiles. The user interface to this categorization engine allows users to enter products by their universal product codes (UPC), to place them in the hierarchy, tag them, add descriptions, etc. It similarly allows restaurants to specify which type of food they serve, whether they allow smoking, define their menus, categorize their dishes, etc.

Another sub-component of the advertising determination system, the system's user profiling/correlation/recommender engine is responsible for determining the products and services that a user prefers. Because the advertising system is integrated with transaction authority 102 and identity systems, it has full access to all of the user's personal information, including the contents and settings of the user's electronic wallets, a complete record of all purchases made, which coupons have been downloaded, transferred, or shared, where they came from, at which websites, health clubs, and the like. Other information that can be accessed include determining whether a user is a member, a list of the user's contacts, as well as a complete record of all of their purchases, coupon, and membership information, as well as those of everyone else who has ever used the system in any way. The system can therefore correlate any user's tastes and proclivities with those of everyone else, allowing for a very accurate user profile to be built. For instance, if person A and person B have very similar tastes in restaurants, and the system is able to determine based on purchase frequencies that person B likes a certain restaurant or even a particular dish, then it can extrapolate that person A will probably like that restaurant or dish as well, even if that person has never tried it, and subsequently advertise it. The same techniques can be used for movies, shows, products, vacations, and almost any other product or service. This system can be built using well-understood techniques for correlating sets of data.

The correlation of people's tastes can be done in general, or specific to a domain. For example, music profiling can be done completely independently from restaurant profiling. In addition, these independent profiles can also be composited to create an even more accurate profile. For example, if two people have highly correlated tastes in both restaurants and entertainment, then that may be a stronger overall correlation than if they had similar tastes in food, but completely different tastes in entertainment.

The coupon authority 301 may include a user profiling and recommender engine. Such an engine is able to utilize a user's purchase history as recorded by the transaction authority and profile to predict which future products and services the user will likely be interested in based on user past choices as well of those of close relations and other people who are deemed to have similar tastes. This ability to predict the individual tastes and desires of a user is extremely valuable to any advertising system. A coupon dispenser is configured to identify a user by communicating with the user's electronic wallet 7, looking at cookies stored on the user's system and other details to identify the user. This allows the profiling engine to learn valuable information about a user's taste in advertising. For example, the download of a coupon that is displayed to a user tells the system that such advertising causes the user to react in a positive way. If the user subsequently shares the coupon and then deletes it, spends it, or eventually lets it expire, then the system gains valuable knowledge about the user. The coupons can also contain explicit feedback mechanisms such as a thumbs up button and a thumbs down button or a 'show me more like this' button with which the user can explicitly signal the user tastes.

In addition, the user profiling and recommender engine can make further use of a user's purchase history in order to learn about the user's tastes. For example, the strength of a user's fondness of a certain product, dish, store, restaurant, or type of restaurant can be automatically calculated by how frequently they buy that product, order that dish, or frequent the store or restaurant.

The configuration described by the present disclosure also makes use of other data streams and correlations which come from the system and are used as input for determining the user profile. For example, the membership cards which a user has can be used in the construction of a profile. A user's interests may become clear, if for example he/she has accounts at 10 different recipe websites. Similarly the types of coupons which a user's friends send to a user can be helpful to understand that user, since people know their friends. If a friend shares a coupon with a user, it suggests that the coupon that was sent is the sort of advertisement the user would like to see. The system can therefore also consider coupon sharing while producing a profile. The system can also consider data related to a user's own coupons, for example which coupons the user saw and did not touch; which the user interacted with but did not download; which the user downloaded; which the user downloaded and then deleted; which the user downloaded and then shared and then deleted; how long the coupon was in the electronic wallet 7 before it was deleted; how often the user shared a coupon and with whom; which coupons the user actually spent and who the purchase was for if shipping information was involved; which were allowed to expire; which were spent only after the user was informed that they were about to expire, how often a user looked at a coupon once it was downloaded; how often a user interacted with a coupon once it was downloaded, etc.

In addition, the time and place that these events occurred can be considered. For example, if a user always downloads food related coupons right before mealtimes or even just looks through them at that point, but never touches them first thing in the morning, this could affect when certain coupons should be presented to the user. The system is capable of combining and correlating data from these various sources when producing a user profile. The correlation engine can use any statistics garnered from any of the various aspects of the overall configuration in order to learn about the user's habits and correlate them with those of anyone/everyone else.

In addition to being able to computationally predict a user's future tastes and desires, the transaction authority 102 also has the ability for the user to explicitly enter a wish list. The user defines a wish list or shopping list by using a convenient interface within the electronic wallet 7 to add or remove items which he/she wishes to buy. These items may be selected from lists, entered via UPC, or some other standard means. In addition, the wish list acts like a wedding gift registry so that people buying gifts for a user purchase products or services which the wish list creator wants. Users define which parts of the wish list are visible to which friends, and establish a deadline (e.g., birthday/wedding), if applicable. The wish lists also need not be entered by the user with the wishes. People often know what their friends and family want, so it is also possible to create (potentially secret) wish lists for others. In addition, instead of entering specific items or services onto a wish list, users or friends can enter item or service categories. For example, instead of entering the UPC code of a specific MP3 player, they can just specify that the user wants an MP3 player.

Users can select and pay for items on the wish lists of their friends through an interface in the electronic wallet 7, but can also split wish list items. For example if someone has a $500 item on their wish list, several friends can get together and claim parts of the cost, similar to claiming parts of a bill at a restaurant described elsewhere in this disclosure. Active wish lists can act like inverse marketplace auctions, and vendors can compete with each other, driving down the prices of items. For example, if $490 out of a $500 present has been tendered in a transaction, then a different vendor selling the same item can undercut the price, and sell immediately. A convenient user interface allows users who are buying items with the registry to pick their first, second, third, etc. choices so that if an item doesn't receive enough pledges to reach the selling price, the system can re-allocate pledges so that the optimum solution (that is, the maximum number of items which the wish list creator wants most) are purchased. If there is a deadlock, and some money is not spent, then the relevant users are informed in time to make adjustments before the time limit on the registry (if any) expires. When partial pledges are made, the money can be held in escrow, or handled in some other convenient manner (e.g., if a credit card is used, then an immediate escrow payment may not be necessary).

The wish list interface can organize the items and services on the list in several visually distinct ways; for example, if the user already has one or more coupons (potentially from different stores) which can be applied to a purchase, then items can be coupled with coupons. If a user downloads a coupon which is applicable to an item on the wish list of one of the user's contacts, then the system can inform the user of this and suggest that he/she share the coupon with the contact. This can also be set so that it occurs automatically, without prompting the user. In addition, a user's wish list is a valuable source of information for the recommender engine.

The transaction authority 102 may also provide for a convenient user interface through which a user can define personal preferences in several categories. For example, a user might explicitly state which types of music he/she prefers, as well as which types of music he/she distinctly dislikes so that the system is better able to recommend relevant concerts and songs. Determining the user's tastes in music can also be automated by allowing the program to search through the user MP3 collection, either by inspecting ID3 tags for genre information, or by comparing the names of songs and artists with a previously defined database containing genre information. Restaurants are another category in which the user can explicitly define likes and dislikes. For example, if a user specifies that he/she is allergic to (or dislikes) a certain type of food, then the system can immediately cull those items when delivering recommendations for restaurants or dishes. The preferences need not even be related to food; for example, the ability to label and avoid restaurants which allow smoking is a valuable service to many non-smokers. Explicitly defined personal preferences are another valuable source of information for the recommender engine.

The store inventory of every seller which uses the transaction authority 102 as a payment service can be connected to a server of the transaction authority 102 so that the transaction authority knows at all times which items are in stock at each store. Store inventory is ideally updated in real time as purchases are made, but in cases where this is impossible, updates can be done intermittently.

The advertising determination system is responsible for determining which coupons a coupon dispenser receives after a user has made contact with an advertising access point. If the coupon dispenser has been set by the owner via the advertising manager program described below to contain certain coupons, then there is no choice to be made, and the determination system issues the appropriate coupons to the dispenser.

However, if the advertising access point has been set to allow the advertising determination system to choose which advertising is displayed, then a more complicated series of steps takes place. The advertising determination system contains a context determination system as well as a user profiling/correlation/recommender engine, the wish list system, explicitly defined user preferences, and linked store inventory as subsystems. From these it determines the context within which the user is accessing the system as well as the user's tastes, which it uses to create a shortlist of coupons. An auction is then held among the advertisers who made the relevant coupons to determine which coupon(s) are displayed, and in which order. The auction algorithms and techniques required for building such a system are well-understood and can be implemented by anyone skilled in the art.

The advertising campaign manager is an interface in a web page or a standalone program which allows advertisers to manage all aspects of their advertising campaigns. It provides a grammar and interface similar to those of the definition editor programs and access point management programs described elsewhere in this disclosure to advertisers allowing them to set certain parameters such as how much they're willing to bid, where they would like to advertise, if they prefer certain times of the day or other conditions, etc. In addition, it lets them specify if, when, and how they would like the system to handle coupon selection.

The advertising campaign management program allows all advertisers to define advertising access points which belong to the transaction authority 102 as polygonal geographic areas in public as well as gradients or polytope heights within them determining how much they value advertising in different parts of that polygon. The advertising campaign management program can also be integrated with the coupon editor so that advertisers can perform all of their creation and management within the same program.

The advertising access point manager is an interface in a web page or a standalone program which allows advertising access point owners to manage their settings. The advertising access point management program allows them to specify and set up their access points. It lets them define which coupons are associated with which of their advertising access points (in the case where the access point owner is also an advertiser, these may be their own coupons), and under which conditions those coupons are associated with the access points. For example, certain coupons may be designated to be displayed on certain access points during specific hours of specific days, specific seasons, or under other circumstances such as weather conditions, special events, the local sports team winning, or any other criteria which can be easily transmitted, calculated, parsed, or otherwise gleaned from electronic sources such as the Internet.

This is all defined by the access point owner using a grammar, allowing for the maximum flexibility and control possible. The grammar is a formal programming/scripting language which allows the access point owner to formally define the behavior of the access point in all cases, including specification of time, gender, age, etc., as well as profiling variables contained in a user's profile.

The access point management grammar also allows access points to be managed by the transaction authority 102, in which case the overall system makes all of the decisions concerning which coupons to display, and when to display them. The access point owner can also use the grammar to specify that an access point deliver certain coupons to certain demographics at certain times, and that the system makes the decision during other times. The access point management program and grammar are described in more detail elsewhere in this disclosure.

By way of example, to illustrate the use of an access point manager program, a business which runs two short-range transmitter access points, one at the store front, and one inside the store could program them so that the store front always issues a specific coupon to everyone, and that the access point inside the store behaves as follows: Between the hours of 1 pm and 2 pm, it can be instructed to give all women aged 35-42 who interface with it one type of coupon, all women younger than that a different coupon, and all men a third type of coupon, and that during all other times and for all other age groups the system manages it. This is just an example and should not be construed as limiting the power of the grammar. The access point management program has a simple graphical user interface so that store owners can rapidly change their settings in response to changing situations.

A subsystem of the coupon authority, the coupon tracking subsystem keeps track of the chain of custody of coupons when they are transferred or shared. The system stores the coupon transfer information as a directed acyclic graph or a tree. The complete record of where each coupon came from, who transferred which coupons to whom, and where they were spent is important for user profiling, for rewarding people who share coupons leading to sales, for being able to charge advertisers only for the advertising which led to sales, and for tracking how much an advertising campaign cost compared with how much revenue it generated.

The electronic wallet 7 provides the user interface through which the consumer accesses the system in order to download, delete, share, receive, reject, or spend coupons. The electronic wallet exists in both desktop and mobile versions, so coupons can be downloaded, shared, received, or spent both online and in the real world.

The advertising analysis and feedback interface provides advertisers with statistics detailing how many coupons were downloaded from each access point that they own or are bidding for, how many of those coupons were spent, how much they were charged, how much revenue it brought in, etc.

The digital coupon and advertising subsystem also has an interface for allowing advertisers to publish their coupons on a search engine which is integrated with the coupon authority. It allows users to search for coupons using any coupon criteria such as store name, value, item that it relates to, etc. The coupon search engine user interface can be hosted in a web page or the electronic wallet 7.

User Interface Architecture

The disclosed transaction configuration is highly-visual, intuitive, and secure. It includes a user interface that is rendered through for display on a screen of the user computer 100 through the electronic wallet. In one embodiment, it allows users to quickly pay for items using a fast and convenient drag-and-drop interface. The electronic wallet 7 contains digital representations of objects commonly found in real wallets such as cash, credit cards, debit cards, coupons, gift cards, business cards, etc. all of which can be used to perform transactions both online as well as in the physical world.

The electronic wallet 7 has an intuitive user interface which allows the user to manipulate many aspects of a user account directly. For example, the user can add new payment instruments by entering a credit or debit card number into the interface. Alternately, the user can examine the contents of the electronic wallet 7 and choose to delete objects such as coupons, membership cards, or even credit cards, etc. Similarly, the user can examine a transaction history or share coupons and business cards with contacts, or even set up new contacts and design new business cards. What a user can do directly with the electronic wallet 7 is described in greater detail herein. It is noted that in order to perform certain actions, for example, a purchase, a user must make the electronic wallet 7 interact with other dispensers and receptacles that represent websites/institutions.

The websites/institutions interface directly with the transaction system through management programs described in greater detail herein. However, in order to interact with electronic wallet 7 users to perform collaborative tasks like performing transactions, the websites/institutions interface with the system through one or more access points. An access point in the physical world can be associated with, for example, billboards, signs, posters, store-fronts, cash registers, predefined polygonal geographical areas, and digital codes. Each access point may have its own user interface, as further described below. Users also interact with these access points. A user computer communicatively coupled with an access point spawns one or more interfaces through which the electronic wallet 7 can communicate with the transaction system. This puts the user's account in communication with the website/institution's account at the transaction authority 102 and allows for interaction between the two, for example, to manipulate a transaction which the user and website/institution are participating in together.

It is noted that there can be an overlap in the roles of a user through the electronic wallet and website/institution. For example, as is further described below, a user can create an access point to function as a mobile cash register, or a user can create an access point to dispense business cards or share other digital objects. In each instance, one party to a transaction is an electronic wallet and another party is an access point provider, and the transaction system facilitates a secure transaction between them.

In one embodiment, the access point communicates with the system's server-side components to set up a transaction of a certain type, for example a payment, login or a coupon download, and receives a transaction identifier from the transaction system. If the transaction is occurring online (e.g., through a live web connection), then the access point delivers a webpage to the user's browser that contains one or more embedded controls. The one or more embedded controls have access to the transaction identifier. The electronic wallet 7 receives the transaction identifier from the control and uses it to download the transaction data from the system. Thereafter, the transaction is performed by the user generally by dragging and dropping the graphical representations of digital objects such as payment instruments, business cards, membership cards, and coupons between the embedded controls and the electronic wallet 7. When successful these drags cause instructions to be issued to the system, thereby manipulating the digital objects and the underlying transactions.

The data flow for some transactions also is described in greater detail earlier. At a high level, the transaction is as follows: (1) user and website/institution want to participate in a transaction; (2) the electronic wallet may be used to initiate the transaction; (3) the website/institution's access point spawns an interface with which the electronic wallet can interact to securely perform the transaction after sharing a transaction identifier that one of them has acquired from the system; and (4) the website/institution optionally can be informed of the transaction's outcome. Some transactions may be implicit so no explicit record of the transaction need be created at the transaction authority 102. For example, in a coupon download transaction the coupon's identifier can just be used instead of a transaction identifier, which may allow for greater security.

Some of the embedded controls may be dispensers of draggable objects. An example of dispenser of a digital object is, for example, a banner ad from which the user can drag and drop a coupon to the electronic wallet to download the coupon. Other examples of dispensers of draggable objects include business card, gift card, and membership card dispensers, etc. In other cases, the embedded controls can be receptacles for draggable objects such as membership or business cards. A receptacle may accept more than one type of draggable object. For example, a payment receptacle accepts all draggable objects pertaining to payments, as well as business cards if the transaction requires shipping information. In some cases, an embedded user control can play the role of both dispensers and receptacles. For example, the aforementioned payment receptacle can also act as a receptacle, because the user can also drag objects back from them to the electronic wallet 7 in order to roll back the transaction.

Furthermore, the embedded controls can be embedded in third party-websites and third-party programs. For example, APPLE ITUNES program could hold a payment receptacle allowing electronic wallet users to pay for a music download without entry of credit card numbers. The embedding can be done by embedding the user control directly into the third-party program via an API which the third-part program's developers implement, or by having them embed a web browser control in the third=party program which then loads the payment receptacle in an embedded web page as described for the case of the browser. The embedded controls can also be in the electronic wallet 7 itself. For example, an access point may convey the transaction identifier to the electronic wallet, which then opens a payment receptacle inside of it rather than opening in a webpage or third-party program. It is noted that such embodiments may be particularly beneficial for electronic wallets executing on a portable device (e.g., mobile phone or netbook computer form factor), which generally has a very small screen.

With respect to the electronic wallet itself, digital objects can be displayed in the electronic wallet 7 as two-dimensional (2D) image objects (e.g., pictures or graphics) or three-dimensional (3D) textured mesh. The objects can be displayed in any number of ways, for example, as cards floating in 3D space, and can animated from side to side when the user selects between them (e.g., APPLE COVERFLOW). Alternately, the object may be flipped over one another to simulate the way a real person flips through a stack of physical credit cards, debit cards, and/or business cards. There are many potential variations, such as rotating the representations to view them from a different angle etc. Each card itself can be a drag origin, so clicking and dragging the card can initiate the object's movement out of the electronic wallet 7.

In addition, a user of an electronic wallet can customize the look of the user electronic wallet 7 using skins. The user also can customize the look of various other pieces of the system such as the various receptacles and even the payment instruments and other digital objects. The system can provide a convenient tool within the wallet or outside of it which can allow the user to customize the wallet in this way. Graphical elements from the electronic wallet can then be reflected in the graphics of the embedded user controls. The embedded user controls can communicate with the electronic wallet 7 and transfer elements of the skin so that the system's receptacles and dispensers fit graphically with a user's customized electronic wallet 7. The electronic wallet 7 can automatically choose pieces of the skin to transfer or the skinning user interface can allow the user to explicitly skin some or all of the other controls as well. The skins can be animated, either by associating an animation or video file with the skin, or by defining the skin as a vector graphic and defining motion paths for the various vector graphics.

The electronic wallet 7 can also contain customized graphics for digital objects. These graphics can be 2D images or 3D textured meshes. For example, a user may produce a version of U.S. dollars in which images of various denomination coins are replaced by images of various seashells and images of various denomination bills are replaced by images of various fish. The graphics would be uploaded to the system's server and associated with the user account and the payment instrument they are meant to skin. The graphics can also be animated and contain simple logic governing the animation. For example, if the image of the fish represents a $20 bill within a 3D model, it may appear to swim around until the user drags and drops the image onto a receptacle that corresponds to a payment aspect of a transaction. At that time, the logic associated with the digital object may cause the 3D model of the fish to be displayed in a way that illustrates the fish wriggling and squirming as it is being dragged.

Special currencies can also be set up which may only be admissible in specific transactions with specific parties. For example, poker chips can be added as a limited for of payment instrument in which the chips may or may not be associated with accounts which contain real value. An access point can then spawn a user control that is displayed to resemble a poker table into which the user can drag and drop the chips and from which the user can retrieve the user winnings by dragging and dropping the chips back into the electronic wallet 7. The chips can be associated with an account from a specific website or organization. Purchasing and redeeming chips could then be as simple as performing a transfer from one account to another, where the currency exchange rate between the chip-currency is set specially to reflect the face value of the chips. In another embodiment, chips may be digital objects of the custom type stored in a digital inventory.

Electronic Wallet Setup Configuration

To use an electronic wallet 7, a user must first create an account with the transaction authority 102. The account set up can include obtaining user name, address details, telephone number, electronic mail details and the like. Upon first initializing an account, the user must fill the electronic wallet with useful payment instruments. The electronic wallet 7 may come pre-filled with coupons and/or gift cards, but generally, credit and debit accounts will have to be associated with the account.

To associate accounts such as credit or debit accounts with the electronic wallet 7, a user enters the details of the credit or debit account into the electronic wallet account that is created in the transaction authority 102. The transaction authority 102 determines if a financial institution associated with the credit or debit account is a member of the transaction system. If it is not, a message can be sent to the user instructing the user to try another credit or debit account. If the financial institution is a member, the financial institution can transmit to the transaction system a graphic associated with the physical credit or debit card of that account. Alternately, it can transmit a custom graphic, for example, a skinned credit or debit card or an image of a card in instances when no physical card exists for the account. Alternately, it can define a digital object definition for the payment instrument with appropriate graphics, and an instance thereof can be minted and associated with the user's account if user's account details are validated by the financial institution.

In another alternate aspect, the financial institution can return an identifier to the type of card and the transaction system can associate with identifier with pre-stored images for rendering at the user computer. This configuration is established by providing an application programming interface (API) to build a look up table, and a tool that allows the institution to input the graphic into the table, either in the financial institution's own system, or in the system described herein. The image chosen can then represent the instrument graphically in the electronic wallet, though minor changes can be made to the image to display it. For example, a user name could be drawn onto the card or reflections can be rendered to make the card look glossy and reflective as it is dragged over the display, etc.

It is noted that the term financial institution includes, for example, a gateway, a bank, a credit card company, a data storage company entrusted by another financial institution to transfer financial data. However, it can also be extended to include other entities that maintain and transmit confidential or private user data, for example, medical record companies or membership organizations (e.g., a retail entity holding retail data of specific customers). In such instances, rather than a credit or debit card, a medical record or a membership card may be used.

When the user logs into the electronic wallet account, the electronic wallet 7 is filled with the up-to-date information and digital object instances from the user's account. As noted previously, the objects are rendered for display at the user computer user interface in response to appropriate account information details being set up within the transaction system. The object instances can be cached locally and synchronized with the user online account to save bandwidth and time. Synchronization can occur in any number of well understood ways. For example, each digital object instance can have an associated field in the database which stores the date/time at which it was last updated or modified in some way.

During synchronization, the electronic wallet 7 can send the identifiers of each of the digital object instances it contains along with the 'last modified' date/times which these objects have back to the transaction authority, which can check whether the object instance has been changed more recently than the one the electronic wallet 7 has cached, and can download the updated version if needed. Similarly, the synchronization can check whether the user should still have the objects, since for example a coupon may have been deleted on the electronic wallet (7a) on a mobile device and the electronic wallet (7) on a desktop computer must synchronize to reflect this. It can do this simply by checking if there is an identifier in the list which is not longer associated with the user's account or is in some other way marked as not downloadable.

Similarly, the synchronization can check whether there are any digital object instances associated with the user's account at the server that are not in the list. This can occur if, for example, the user downloads a coupon to the user electronic wallet 7 residing in the memory of a desktop computer and then logs into the electronic wallet 7 residing on the user mobile device afterwards. When downloading an object to the electronic wallet 7, only the data fields are downloaded which are needed by the user interface. For example, a credit card object may download a graphic and an identifier and a "last updated" date/time and even its balance or total available credit, but it would not download the account number since the user never actually needs this data, and neither do any local functions of the electronic wallet 7 because actual payments are performed on the server-side at the transaction authority 102.

Drag and Drop Configuration

The user can interact (or interface) with digital objects in ways other than applying them to various types of transactions. The graphical representations of the digital objects contain user interfaces of their own, allowing the user to interact with them richly. For example, shareable digital objects like coupons and business cards can be shared with contacts simply by selecting the appropriate options in the objects interface. One embodiment of this includes using a context menu which pops up with options when the user right-clicks on the object. One option for a shareable object can be "Share" or "Transfer" which when selected can bring up another interface allowing the user to select the intended recipients as illustrated in FIG. 18. Similarly a membership card, gift card, or coupon's context menu can include the option to go to the website associated with the card. Selecting that option can then open a browser window and navigate to the website. A debit or credit card could similarly send the user to the card's underlying financial institution's website.

The digital object can be structured as rich interactive objects. For example, a coupon can contains video and controls can be displayed on the coupon for playing the video and changing the volume etc. Also, digital objects can contain games which can execute right on the surface of their graphical representations in the electronic wallet 7 and can be interactive, depending on how the logic of their underlying definitions is specified. Some coupons can be combined with other coupons as in the MONOPOLY coupon game which MCDONALDS fast food restaurants have run as promotions in which a user collects game pieces incrementally over time. A coupon can also contain a button or an option in the context menu which allows it to display its rules. A string generated by the system in the electronic wallet 7 user's localized language from the rules defined in the coupon's coupon definition. These rules can be accompanied by a feedback mechanism which can be used to report if the coupon's graphic does not seem to reflect its rules. Such rules can be displayed for all objects which can have logic associated with them.

An example of more mundane interaction is with a receipt whose shopping cart is longer than what is displayable in the electronic wallet 7. The receipt can contain sliders which allow the user to scroll through its contents. Also, clicking on an item in the receipt may bring up information related to that object such as an image, a consumer guide, a review, a feedback screen for the user to rate the item with, or even link to the manufacturer's website, or the vendors warranty and return policy for that item. This can easily be done based on the item universal product code (UPC) stored in the shopping cart. A receipt can also contain a map with which the user could track the shipping status of the order the receipt represents. This map could be interactive in a manner similar to what can currently be found on the postal service's website. A receipt can also contain a feedback mechanism for rating any aspect of the transaction, from vendor to the shipping to the quality of the products and services delivered.

Similarly, receipts can be linked to third-party databases or databases within the system which cross-reference items such as groceries by their nutritional value, pesticide levels, environmental impact etc. in order to show this information in a column next to the items on the receipts. Alternatively, the system can allow third parties to write plug-ins for the electronic wallet program which analyze the user's profile and spending history. For example, an accounting company could write a budgeting plug-in which helps to categorize, budget, and report on a user's spending habits, or for a website such as GOODGUIDE.COM or some other health-related website or business to analyze and rate a user's grocery purchases according to toxicity, nutritional value, etc. The electronic wallet 7 can also use a mobile device 67's built in camera to take pictures of UPC codes and download and display information in a similar manner to manual input access points.

Another digital object can represent a business card, which also can be interactive. Selecting an email-address entry in a contact business card instances provided by a contact can cause an email program to open to compose an email to that contact with the email address filled in. Selecting a phone number could open a program like SKYPE to call it on the computer, or could call the number directly on a mobile phone if it is running the electronic wallet 7. Another example of possible interaction with a business card is an interface for allowing a user to write notes onto cards. These notes are associated with the user instance of the digital object, and are therefore private to the user's account. A note can be displayed, for example, as being handwritten on the object either because the user did write the message by hand using some sort of tablet or because of the system or the user font selection, or can be displayed as a post-it note drawn on the object, etc. The user can also associate verbal notes or even photos or video notes with an object. This may be a more convenient way of taking notes with a portable device than writing them. Such notes are also applicable to other cards, e.g., notes with respect to medical record objects or membership cards.

Some of the controls used to interact with the digital objects can still be used when a digital object is not in the electronic wallet 7 but is in a dispenser or receptacle. For example, a video coupon or game coupon can still be used when the coupon is in the coupon dispenser. Account specific controls can be restricted for security and privacy purposed. If a user makes the user business card available in a business card dispenser, it could be possible to send and email to that user, or call them, etc. based on an interaction with the card in the dispenser.

The electronic wallet 7 contains graphical representations of digital objects stored at the transaction authority 102. A user can manipulate these graphical representations using drag and drop operations to send instructions to a server in the transaction authority 102 to manipulate the digital objects and transaction related to them. The details of these manipulations are given in the various sections below. The user can initiate the drag of the graphical representation of a digital object by initiating a drag operation while the user cursor hotspot is inside the boundaries of the representation, an area we call a drag source. The graphical representation then can graphically appear to move with the cursor until the user finishes the drag operation. If the drag operation is successful, meaning that the drag terminates with the cursor's hotspot over a drop target which accepts the current drag, then this initiates a set of events which cause the system to be instructed to take some actions with respect to the digital object. Otherwise, the graphical representation of the object can boomerang from the point at which it was dropped back to the point at which the drag was initiated.

When the dragging operation begins, the graphical representation can otherwise disappear out of view within the user interface of the electronic wallet while it is being displayed with the cursor. Thereafter, it may reappear after a successful drag or after the boomerang of an unsuccessful drag completes. It may also remain in place, depending on the type of object. For items such as coupons which can generally only be used once, the graphical representation can be removed from the electronic wallet 7 while the drag is ongoing and may only be able to return after an unsuccessful drag or a later cancellation of the transaction.

During a dragging operation the graphical representation being dragged can appear graphically with the cursor, so that it appears to be moving with the drag operation. This can be done in a number of well understood ways, for example by setting the cursor image to be a composite of the cursor and the graphical representation. Another method is to create a special window whose only graphic is the graphic representation and to move this window along programmatically as the mouse moves during the drag. In any such case, some details of the graphical representation might be altered. For example, it may appear smaller than in the electronic wallet 7 or it may appear slightly transparent, so that the image of the graphical representation that is moving with the cursor does not visually obscure the drop target of the receptacle which the user is trying to drop it into. The cursor itself may also be left out entirely or modified in some way.

On a touch screen the drag can operate in the way customary on touch screens. So the drag is initiated when the user presses on the drag origin with the user finger or stylus and then moves a user finger or stylus along the screen while never lifting the finger or stylus. The drag proceeds for the length of time that the user's finger or stylus remains in uninterrupted contact with the screen. Finally the drop occurs when the user's finger or stylus is lifted. The hotspot is calculated based on the area of contact which the finger makes with the screen. There are other ways to do a drag and drop on a touch screen and this example should not be construed as limiting. In any case, these methods are widely understood. Also on a touch screen, there is no explicit graphical cursor, and it should be understood that any of the description above can easily be modified to reflect this.

Though drag and drop operations are discussed repeatedly throughout the disclosure as the preferred method for a user to interact with the system, they should not be construed as being limiting. They are a very clear way for the user to indicate the intent to apply a digital object to a transaction, but other methods can work too, like double clicking, or selecting an object and hitting a certain key like "Enter" or an "Apply" button of some form. This is true for an electronic wallet 7 running on a computer but on some cell phones which have no touch screens or other methods of performing a drag and drop operation it is necessary.

Both the computer-based electronic wallet and the phone-based electronic wallet can be contextually aware. Contextual awareness can be structured so that the electronic wallet application is configured to determine which web page the user is currently viewing, or which vendor the user is currently in a transaction with, and appropriately filter items such as membership cards, gift cards, and coupons based on this information to only render for display possible relevant choices for selection. For example, if a user is shopping for shoes at Adidas.com, the electronic wallet will not render MCDONALDS hamburger coupons in a user interface of the electronic wallet 7. The electronic wallet 7 can therefore filter out all coupons, which are not applicable during such a transaction.

In order to save the user time and effort, and make sure that the user does not forget to use a coupon, any relevant coupon(s) can be automatically applied to an applicable purchase. If the user has two or more mutually exclusive coupons, then the system can be set to automatically apply the one determined to provide the larger benefit. The electronic wallet can also display an icon or remind the user at the start of the transaction if there is an applicable coupon within it. Alternatively, if the user finishes a transaction, and has not applied a coupon, the system can remind the user of that fact. Any of these settings can be turned on or off at the user's discretion. Similar techniques can be applied to the other digital objects in the system, such as automatically applying a membership card to the appropriate website's receptacle, automatically applying a gift card to a purchase, automatically applying a default business card to fill out a shipping address, and the like.

The electronic wallet 7 can also filter out membership cards that are not applicable when the user is at a webpage or is connecting to a physical location that allows logins, such as a fitness club. Determining which webpage a user is at can be done in many ways. For example, a receptacle can feed this data back to the electronic wallet 7 or a browser plug in could inform the electronic wallet 7 of the current location. The electronic wallet 7 running on a mobile device may be configured to determine location from its physical coordinates if it is location-aware.

Automatic culling can be completely customizable and its aggressiveness can be set by the user. For example, it may simply be set to cull coupons which are not applicable at the store or webpage where the purchase is taking place, but may leave coupons which are applicable at the store, but other purchase conditions have not been met in order to remind the user that they might want to add some more items to the shopping basket in order to have the coupon apply.

User Interfaces for Creating and Editing Digital Object Definitions:

The presently-described system contains many different types of digital objects such as credit cards, debit cards, business cards, etc., which are highly-customizable, either by the user of the electronic wallet 7 program, or by the business or other institution which issued the digital object. The system must therefore have a variety of editing programs available to the relevant parties which make it possible for them to create new customized digital object definitions. For example, since business card definitions can be created and customized by the user, the system provides a business card editor which any electronic wallet 7 user can access and use for this purpose. As another example, coupons are highly specific to the different advertisers issuing them and even to the circumstances under which they are issued, so the system provides an editor for advertisers to define and create fully customizable coupons. The system provides editors for all of the different types of draggable objects in the system, even including cash so that companies and other institutions can define their own internal currencies which can be used with the system.

These editors have a graphical component as well as a logical component. Editors can be used to change the look and feel of their corresponding draggable object definitions by allowing the issuer to edit the shape, the image displayed on the card, or whether it contains video, sound or a computer puzzle or game, but they can also be used to change the logical behavior of the object definition. For example, the issuer of a credit or debit card may wish for the user to have to enter an extra PIN number when using the card in the electronic wallet 7 program, or even that they have to enter seven PIN numbers and a thumb print scan. This type of behavior is defined and manipulated in component of the editor responsible for the logic of the object.

The component of each editor which is responsible for editing its graphics and media can be implemented using standard practices such as providing a graphical user interface which allows the designer to import images, videos, sounds, simple computer programs written in languages such as JAVASCRIPT, FLASH, SCRATCH, or some other programming or scripting language, and to place, scale, stretch the imported media onto the object. It similarly allows the designer to edit the shape of the digital object by allowing for the definition of an arbitrary shape. The designer can choose if the object is one-sided, or whether it can be flipped over, and if so, what should appear on the other side. The graphical component of the editor is also linked to the logical component in that the designer can designate that certain logical fields such as the name and expiry date of a credit card be printed in a designated area in a designated font on the card.

The component of each editor which is responsible for editing its logic can also be implemented using similar standard practices, allowing the designer to define the information fields, variables, and constants as well as logical behavior in the digital object definition. For example, a membership card can be defined to act like a ticket by limiting the number of times it can be used to one, by defining the specifics of the movie, show, play, concert, game, etc. to which it grants access, as well as a seat number that is set when the ticket is sold, if applicable. Other membership cards in other circumstances may contain fewer information fields.

For more flexibility, the component responsible for the editing of the digital object definition's logic also provides a grammar which can be used in conjunction or in lieu of defining information fields. The grammar is a simple but well-defined formal programming or scripting language which could be implemented in any number of standard ways by someone skilled in the art of computer programming languages or compiler design. Such a grammar can be used to define the behavior of a draggable object definition. It contains standard programming language elements and control structures such as constants, variables, types, functions, methods, IF . . . THEN statements, IF . . . THEN . . . ELSE statements, SWITCH statements, FOR loops, WHILE loops, etc. This grammar allows the designer to create arbitrarily complex statements, provided that they are grammatically well-formed. The grammar has access to the fields within the digital object definition, additional variables which are instantiated at the time when the digital object is used, information external to the card but internal to the system such as the user's profile, as well as information external to the system but accessible elsewhere on the Internet. Editors may also provide simple front-end interfaces which allow the user to program using the grammar using simple visual tools as is commonly done in modern integrated development environments.

By way of example, a designer of a particular coupon definition may configure a program so that if the user is a woman and spends a coupon at a specific retail store, e.g., a NIKE store, between the dates of Jan. 1, 2009 and Jan. 1, 2011, and if she makes the purchase before noon and if she is also buying a pair of specific sneakers, then the coupon will be worth 25% off the total purchase. If, however, the coupon is being spent by a man during the year 2012 at the online NIKE store, and if the man is also buying a specific T-shirt, then the coupon is worth a free second T-shirt of the same type.

The grammar can also be used to define the look and feel of the digital object instances associated with the digital object definition. For example, the designer may specify that if the owner of a gift card is a woman, then the gift card is colored pink, and if the owner is a man, then it is colored blue.

Similarly, it could specify that before a certain date, a membership card should be triangular, and after that date it should be circular, but only if the user lives in the U.S. (United States); otherwise it should be hexagonal and contain a specific embedded game. The designer can choose to what extent to use fields and to what extent to use the grammar for defining the logic and graphics of the object definition on a case-by-case basis.

In addition, the system provides editors and grammars for defining new types/categories of objects. For example, if a business wishes to create a type of draggable object which is completely different from any of the types of object within the system such as cash, credit cards, debit cards, business cards, membership cards, etc., it can opt to use one of these editors to create a new type/category of object, as well as a specification for a grammar that other people could use to create custom definitions of that object type. The system allows for custom definitions to be based on the notion of 'inheritance', which is a standard feature of object-oriented programming languages. For example, a custom type can be based on and inherit its functionality from the credit card type, but also include extra specifications, characteristics, or abilities. Similarly, an object definition can be based on and inherit its functionality from a different object which has been previously defined.

Note there is a differentiation between a digital object's type, its definition, and the object instance itself. The type of an object is its category such as credit card, business card, receipt, etc. By contrast, its definition specifies a blueprint within a type. For example, US Dollars are definition within the cash type, BANK OF AMERICA Platinum Plus VISA cards are a definition within the credit card type, FACEBOOK membership cards are a definition within the membership card type. With the exception of the custom type, the system does not provide editors for types. However, definition editors are used by designers to create custom digital object definitions. Those definitions are then used to 'mint' the actual objects which can be possessed by users or businesses. Editors can be embedded in web pages, or can exist as standalone programs which communicate with the system. They can similarly be embedded in the electronic wallet program or other programs.

User Interfaces for Managing Access Points

Digital objects can interact with the system by being dragged to and from specific dispensers and receptacles at predefined access points. Therefore, the transaction authority 102 provides management programs to control the behavior of the access points, dispensers, and receptacles of each of the different types of digital objects in the system.

Management programs allow access point owners to define the characteristics of access points for all types of access points. These characteristics include the paradigm, type, and behavior of each access point, including whether the access point is centered on a specific Bluetooth, radio, infra red, or other transmitter connected to a computer or other device, which in turn is connected to the system, or whether the access point is a geographical area located on a map, etc. The program provides a graphical user interface for managing access points. The user interface allows an owner to associate specific transmitters connected to one of the user computers or other devices with an access point. In addition, it provides an aerial map or schematic allowing the owner to define exactly where each access point is located, and also to define access points on a map as polygonal areas with gradients or as polytopes in which the gradients or height of the polytope reflects the value that the owner places on each point in the defined area, for the purpose of competing in an auction.

Alternatively, access point locations can be defined by entering a street address into the system, which then translates that address into a geographical location. This method is useful for access points which are located in store fronts.

In addition, the management program also provides the user with templates as well as a grammar for defining the behavior of the access point which are similar to the techniques and grammars described previously for defining the logical behavior of digital objects. For example, an owner may choose to set up a business card access point associated with the user web page which dispenses the business cards of all employees working at the user store during work hours, but it dispenses alternative business cards containing their off-hour phone numbers at all other times. Similarly, a business owner can use a manager program to define a business card access point centered on a transmitter in the user store which issues a certain business card to male customers, and a different business card to female customers or any number of possible variations made possible by linking various variables from various aspects of the system, like the user profile, inventory contents, external factors such as data from a website, etc. to the logic defined using the grammars.

Alternatively, a restaurant owner can use a manager program to specify an entire series of access points aimed at attracting more business. For example, he/she might define a polygon in nearby plazas and other locations which are popular with tourists with coupon dispensers that issue coupon packages containing interactive maps (customized for the locations of their dispensers) that can lead the recipient straight to the user restaurant such that different coupons are delivered during different times. For example, during the hour before meal times, the coupons can contain discounts for items on the menu which are chosen on an individual basis depending on the recipient's user profile. A business owner may also set up a business card receptacle in his store allowing users to give their business cards for the purposes of a raffle.

The transaction system access point manager programs can be embedded in web pages, or can exist as standalone programs which communicate with the system. They can similarly be embedded in or other programs, or unified into a single program so that the owner can manage all of his or her access points for the different types of digital objects which he/she wishes to deploy all within one program.

Additional Wallet Program User Interface Configurations

In addition to the primary drag-and-drop interface with dispensers and receptacles, the electronic wallet is configured to allow other actions which can be performed by the user, including but not limited to: browsing the contents of the electronic wallet, including the digital inventory, searching, adding, and removing currencies, searching, adding, and removing contacts, customizing the electronic wallet skin, customizing digital object instances graphics, adding new credit/debit cards, adding or removing business cards, deleting membership cards, designing, editing, deleting, and revoking business cards, adding, modifying, or deleting business card data fields, watching coupon videos, tracking shipping progress from a receipt, examining past transactions, copying items from the digital inventory to or from the desktop, changing the skin of the electronic wallet 7, entering and changing passwords, changing security questions, initiating transfers of money, coupons, and/or any other transferable objects, changing the public picture, sending a text message to a contact, manipulating the presence and order of buttons in the menu, setting the timeout period of the electronic wallet 7, minimizing, closing, logging out, locking, unlocking, moving the window, and the like.

In addition, the electronic wallet may be configured for short-range mobile applications. For example, the electronic wallet can be configured for short range mobile electronic wallet 7 coupon or business card broadcasting. For example, if one is with a group of around five friends all going to a movie or restaurant, and one person has a coupon, some of the friends might not yet be contacts, so it would be tedious to first give them all business cards, and then individually share the coupon with them one at a time. Instead, a useful feature would be a 'coupon broadcast', where you select a coupon, and hit the broadcast button. This immediately sends a copy of the coupon (providing it is shareable) to everyone within a certain radius who has a mobile device or laptop which has the electronic wallet running on it, with coupon broadcast reception turned on. This can be done using BLUETOOTH, other radio frequency protocols, GPS in conjunction with a connection to the server, or some other means, and it saves a considerable amount of time and effort. In one embodiment this can be accomplished by acting as a remote transmitter access point or even creating another kind of access point like a geographical area access point to share the coupon.

Similarly, the electronic wallet 7 can be configured for a digital object search. The electronic wallet can be configured with a feature which allows digital objects to be searched according to any one of their fields. For example, if the user selects coupons and then selects the 'Store' field, and types in 'a', all of the coupons from stores not containing the substring 'a' are immediately culled.

In addition, the electronic wallet 7 can contain an installer module with which the user can install an electronic wallet on another computing device when the user's device is connected to the other computing device via a wired or wireless connection. This process can be triggered automatically upon making the connection or can be initiated by the user once the connection has been established. The process could proceed as simply as copying an executable over to the other device which installs the electronic wallet 7 when run, or as complex as completely installing the electronic wallet 7 remotely. For example, the user can plug a mobile device containing the electronic wallet into a desktop computer not containing the electronic wallet with a USB cable, which causes the electronic wallet to be installed on the desktop. The same process can install the electronic wallet 7 from a mobile device to a desktop computer, a mobile device to another mobile device, or from a desktop computer to another desktop computer.

Business Cards Management Processes

As disclosed above, the processes described can integrate a digital business card and include identity management. Such configuration can further be used to allow frictionless completion of web forms with a drag-and-drop operation. Moreover, the cards also fulfill the traditional role of business cards in the physical world by allowing users to create and share digital business cards with other users or institutions, and therefore also share the contact information contained on the cards such as addresses, phone numbers, e-mail addresses, and the like. In this incarnation the information on the business cards is managed such that the user can update any piece of information on a business card, and that change is immediately seen by everyone who has a copy of the card.

Business cards are objects in the electronic wallet 7 program and they fulfill at least three important functions: The first is that they can be shared with contacts in order to give them the right to see the managed information on the card. The second is that they can be dragged and dropped onto web pages and other programs in order to fill out text fields. Finally, they act as a form of personal advertisement and mechanism of sharing contact information, just like in real life.

Business cards can function similarly in their methods of application to cash, credit, and debit cards and can be dragged to and from the electronic wallet 7. The cards are not tokens, but like other items in the wallet, the cards are entries in the database of the business card authority. Each one has a graphical representation in the electronic wallet 7 program, allowing it to be used and manipulated. The shared copies of these cards contain pointers to the original card's description and data so that when the user changes a piece of data such as the aforementioned address, everyone who has been given a copy of the card learns of the change almost immediately.

The business cards as disclosed can be integrated in processes having different roles. For example, business card owners are the people or businesses that create a business card definitions representing. Business card holders are the people or businesses that are in possession of an instance of a business card. These may be the cards of other people which have been given to them, or they may be cards of which they themselves are the owner. Similar to advertising access point owners, business card access point owners are the people or businesses who own the access points such as web pages and real-world access points which spawn business card dispensers and receptacles. Identity data providers are people or businesses which host personal information that can be embedded on a business card. If this information is changed, then it is immediately updated on all of the business cards which have been given to others that contain it. Identity data consumers are people or businesses which make use of the information contained on business cards. For example, a real-world magazine which offers subscriptions may be a data consumer on the system by using business cards to manage the addresses of its subscribers. When a subscriber moves to a new home and they update their address, the magazine automatically receives the update.

The business card configuration as disclosed may be applied in a number of unique processes. For example, business cards can be dragged onto forms in order to fill them out. This is particularly useful when filling out shipping information during a purchase. This not only saves the time and effort that would have gone into typing the address, but it also eliminates the possibility of typographical errors. Users can also drag and drop any business cards which have been given to them by their contacts, provided that the contact who shared the card with them enabled this ability. This operation does not share the card but rather only copies the information it contains.

Another major problem which exists both online and in the real world is that user identity and contact information is not centralized, but rather is duplicated in many disjoint sources. The result is that when a user moves to a new home, changes a phone number or e-mail address, or any other important piece of personal information that others might need, everyone who requires that information is immediately out of date. Further, the business card as configured herein creates a network of centralized information sources that can be put onto business cards and then shared with others. When one's contact information changes, it only needs to be updated in one place, and the change is immediately seen by everyone who has been given a business card containing that information.

The business cards may be shared to allow for managed business cards and building a managed address book. The managed address book includes information of each user through a union of all of the information on all of the business cards received from that contact. Further, the business card system is structured to work with all of the different data providers rather than being the sole authority. This open framework is made possible because the information fields on the individual business cards can be hosted at different sources. For example, a business card might contain a phone number hosted by one information service provider, and an address hosted by another. This allows each field to be centralized, but for the sources of the different fields on a card to be distributed. In addition, the business card and identity management system provide full control over creating new and fully-customized business cards. The electronic wallet 7 contains a business card editor containing a graphical user interface that allows the user to create business cards that have the look and contain the information which the user desires.

Figure 23:
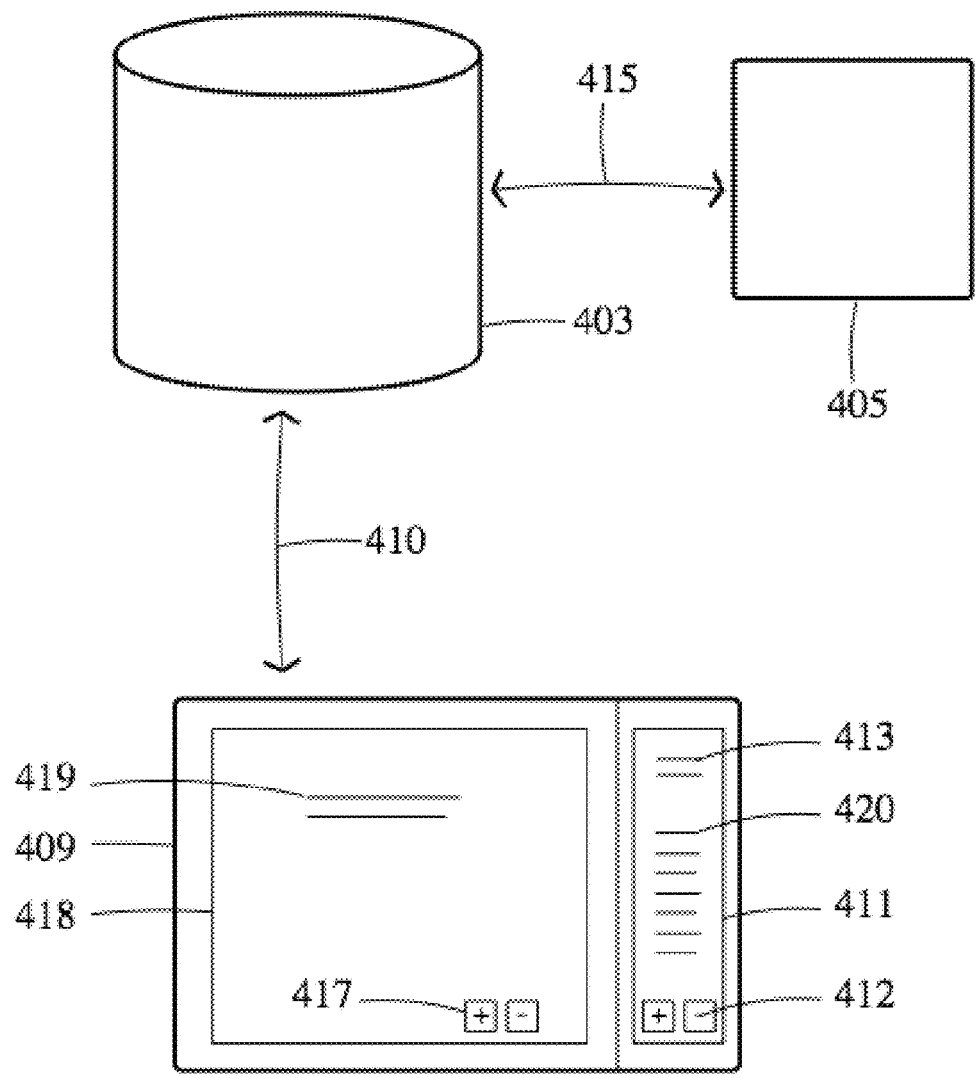
FIG. 23 shows an example embodiment of a process to link separate data sources to an electronic business card editor associated with a business card authority.

FIG. 23 shows an example embodiment of a process to link separate data sources to an electronic business card editor associated with a business card authority. The user opens the business card editor 409 which is connected over network connection 410 to the business card authority 403. The user then selects to populate the data palette 411 of the business card editor 409, which can be done in two ways, either by adding data locally or by importing data from a separate data source.

To add data locally, the user selects from controls 412 to add data, causing business card editor 409 to present a data entry user interface (not shown) which allows the user to add data, choose the kind of information it represents, add images, add other visual or audible media and other such data. Upon completion of the data entry event, the business card editor 409 sends the entered data to business card authority 403 over network connection 410, and business card authority 403 stores the data and associates it with the user's account. The data is also displayed in the business card editor 409 data palette 411 as graphical representation 413.

To import data from a separate data source, the user selects from controls 417 in business card editor 409's data linking tool 418, causing business card editor 409 to present a data source specification user interface (not shown) which allows the user to specify a data source and the user's access information (for example, a user name and password). Upon completion of the data entry event, the business card editor 409 sends a message to business card authority 403 over network connection 410 requesting that business card authority 403 associates the user's account with the account of the user at the separate data source 405. When the association is complete, business card authority 403 communicates over network connection 415 with separate data source 405 to access the user's account and retrieves all of the user's data that it has authority to retrieve. Business card authority 403 then associates each piece of retrieved data with the user's account, and also associates each piece of retrieved data with the account of the user at the separate data source 405. This second association serves to enable business card authority 403 to access separate data source 405 to refresh the user's data each time a request is made for it. The retrieved data is then sent by business card authority over network connection 410 to business card editor 409 where it is displayed in business card editor 409's data palette 411 as graphical representation 420.

Figure 24:
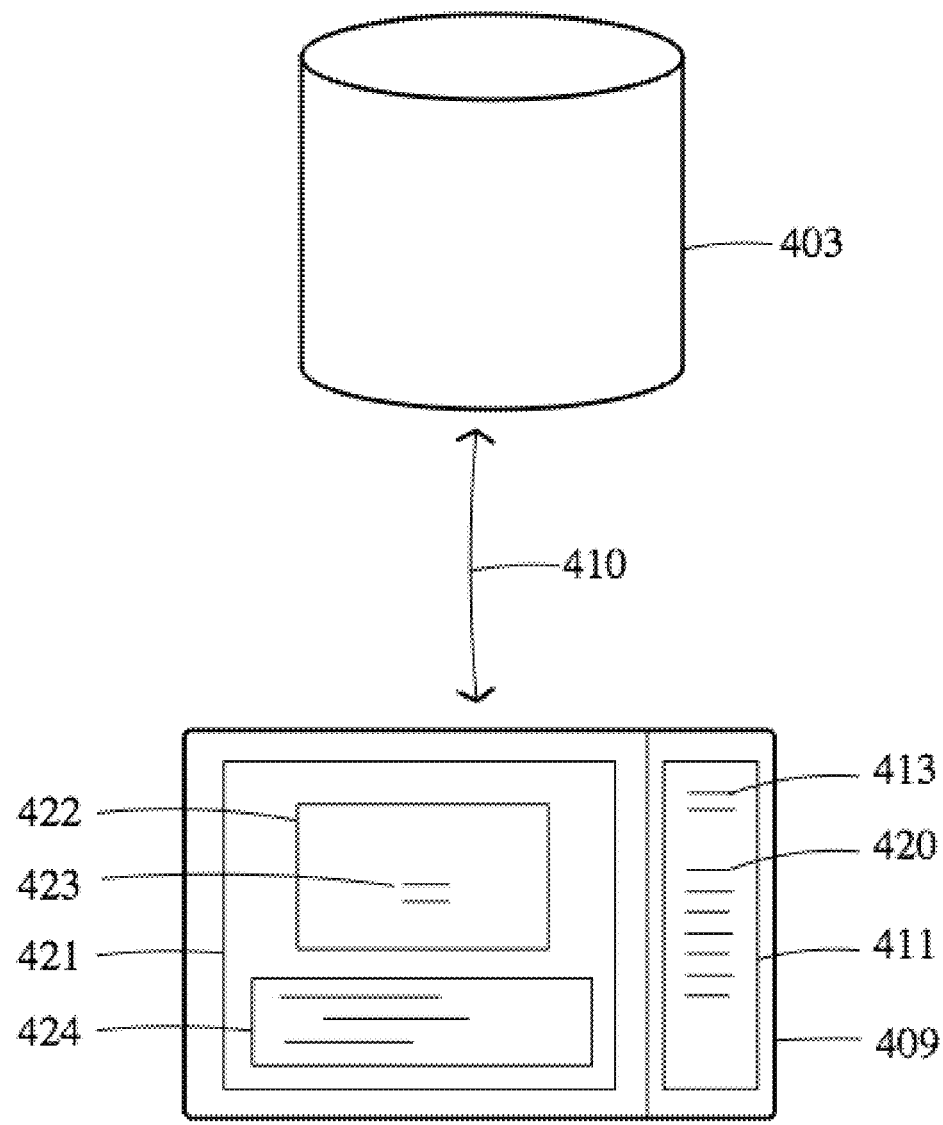
FIG. 24 shows an example embodiment of a process to create a business card definition by defining its data and logic in a business card editor.

FIG. 24 shows an example embodiment of a process to create a business card definition by defining its data and logic in a business card editor. The user opens the business card editor 409 which is connected over network connection 410 to business card authority 403. The user then selects to create a new business card definition, and business card authority 403 then automatically populates the data palette 411 of the business card editor 409 with all data that has been previously associated with the user's account. The business card editor then opens creation tool 421 which presents a blank graphical representation 422 of a new business card definition. This sends a message over network connection 410 to business card authority 403 instructing it to associate the new business card definition with the user's account. The user then selects a piece of data (here shown as data 413 or data 420) from the data palette 411 and drags and drops it onto the graphical representation 422 of the new business card definition. This sends a message over network connection 410 to instruct business card authority 403 to associate the dragged data with the new business card definition. The data is then displayed as a graphical representation 423 on the graphical representation 422 of the new business card. The user is then able to select to associate logic with the new business card definition governing its behavior by selecting logic tool 424 and inputting a script or program based on a grammar linked to variables associated with the new business card.

Figure 25:
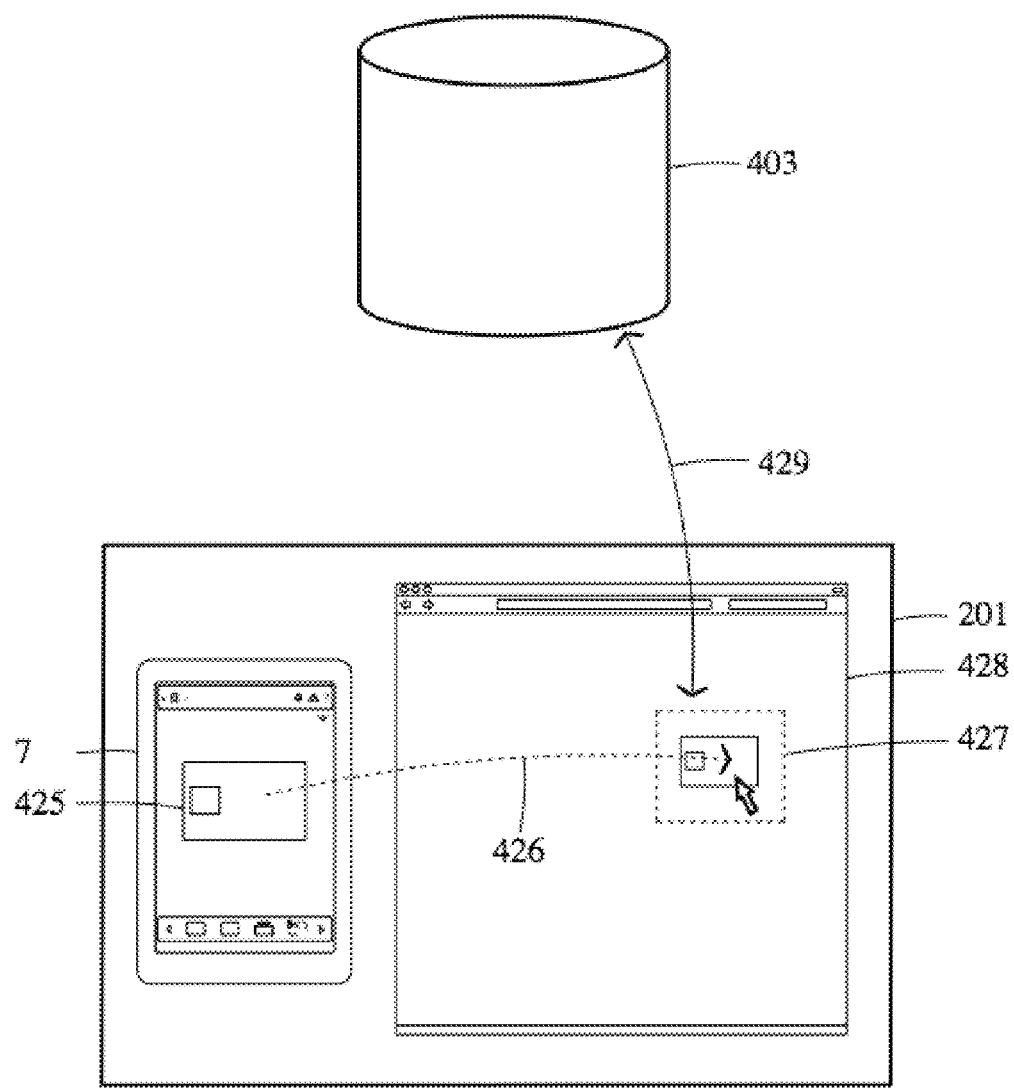
FIG. 25 illustrates an example embodiment of a process to upload a business card from an electronic wallet 7 to a webpage.

FIG. 25 illustrates an example embodiment of a process to upload a business card from an electronic wallet 7 to a webpage. The user selects a graphical representation of a business card 425 which he wishes to share and moves it with drag 426 from electronic wallet 7 to a drop target in business card receptacle 427 embedded in webpage 428, displayed on computer display 201 which also displays electronic wallet 7. When the graphical representation of business card 425 is dropped on the drop target, a message is sent over network connection 429 to business card authority 403 instructing it carry out a sequence of operations associated with the access point (not shown) which generated business card receptacle 427. (Network connection 429 is shown here generally connecting business card authority 403 with business card receptacle 427, but this connection could also be achieved by communication through the electronic wallet 7.) One of two events can occur. Either the business card authority 403 returns information to business card receptacle 427 informing web page 428 of the data in a one-time-use manner, in order for example to fill out a form, or business card authority 403 determines the business card definition of the business card and if the user has authority to share the business card 425, the business card authority 403 mints a new instance of the business card from the associated definition and associates the new instance of the card with the account of the owner of business card receptacle 427.

Integrated Business Card

The integrated business card system includes a business card authority that may be integrated with the payment process as previously described. It has one or more servers that is/are responsible for storing and manipulating all of the information pertaining to business cards, including accounts, business card definitions, which users have been given which business cards, which business card dispensers contain which business cards, which business cards have been used, and under which circumstances, etc. The business card authority is responsible for minting new business card objects from their definitions.

Business cards can contain any number of data fields from any number of data sources. Users can design their own cards, create their own data fields and field entries, import and link data from third party data providers and drag and drop it into the card. This is all done through a business card editor which may be provided by the system either through the electronic wallet 7, in a web page, or as a standalone program. It allows the user to create new categories such as addresses, phone numbers, website URLs, etc., as well as specific instances of those categories, which can then be put onto a business card. The user can also make superficial changes to the data field, such as changing the font, size, style, position, and color in order to achieve a desired look. The user can import and manipulate graphics to decorate the user cards as well as different paper types, shapes, and styles. The system can come preloaded with card templates to help users who may be less inclined to design their own. Cards can also be predefined by some entity such as government to hold certain pieces of data from trusted locations, and have a certain graphical look. Such cards might be used as official government ID like a driver's license. The business card editor is not only used to create categories, instances, and cards, but can also be used to go back and edit or delete any of these types of information as well.

There are two different types of business card access points. The first is an access point for hosting a business card dispenser, and the second is an access point for hosting a business card receptacle. A single access point can also play both of these roles. The behavior of business card dispenser access points can be defined very simply or using a business card access point management program.

Business card access points of both types can be located online or in public. For example, an office might contain a dispenser access point at the front desk, on its website, or even located in public in a sign or billboard which allows people to download business cards. Similarly, it might have a receptacle access point allowing people to give their business cards. This can be used for business purposes or promotions such as raffles.

Business card dispensers are the programs associated with business card dispenser access points which hold the business card identifiers which allow a user to download a business card instance into the user account using the electronic wallet 7. When accessing the system using a device containing a sufficiently large screen, business card dispensers are displayed external to the electronic wallet 7 and can take the form of widgets, applets, or other programs, and can also exist in web pages or other programs. Similarly, if the user accessed the system using a device containing a smaller screen, such as is found on a typical smart phone, the business card dispenser is shown within the mobile electronic wallet 7 program. Business card dispenser access points can host several business card dispensers at once, typically one per person. Dispensers can be set by their owners to contain one or more specific business cards.

Another way a user can share a business card with another user or institution is by way of dragging and dropping the card into an online or real-world business card receptacle which is hosted on a business card receptacle access point. This is very much like a payment receptacle, except that when the user drags and drops a business card into it, it associates the user's card and the data fields in that card with the owner of the receptacle's account on the system's server, giving them the right to access the data. If the receptacle owner is another individual user, the system gives that individual a copy of the user's identity card by minting it and associating it with the individual's account. If the receptacle owner is a company/institution, the system still provides the owner with a copy of the user's identity card, but it may also notify the owner's database, prompting an up-to-date data download for the owner's internal records. In either case, the website in which the receptacle is embedded may be updated to reflect the new data. This may be achieved by for example making an AJAX call or by the receptacle itself causing the page to refresh after it receives confirmation that the card sharing request was processed by the system.

As previously noted the business cards may be applied to a managed address book. Business cards can also be shared with contacts from the user's social network, as well as other electronic wallet users. These cards can be used to create a universal, managed address book. A user can receive multiple cards from a single contact. The user's address book entry for such a contact can contain the union of all the data from all the cards which that contact gave the user. This address book can be displayed within the electronic wallet 7 program. Whenever the user clicks on or in some other way manipulates a data entry in the address book an appropriate action (which may also be custom-defined by the user) can take place. For example if the electronic wallet is run on a mobile phone and the user selects a contact's phone number in the address book, the electronic wallet 7 program could make the phone dial that number. Similarly, the electronic wallet 7 running on a desktop computer can allow the user to click on an email address on a business card, thereby opening the user's default email program to a new message that is to be sent to that email address. The fields can also be voice activated. In addition, the address book also has the capacity to store unmanaged contacts and fields, so that users can enter the contact information of people who do not use the system, as well as extra information for already-existing contacts.

The business card access point management program is a web-based or standalone program which allows the owner of the access point to define the behavior of both business card dispenser and receptacle access points using a grammar specifically designed for this purpose. For example, it can be used to define which business cards should be used to populate the business card dispenser associated with a business card dispenser access point, and whether a business card receptacle access point should run a receptacle program allowing a user to fill out text fields with their business card, or whether it should instead take possession of any business card dropped into it.

A business card tracking subsystem, within the business card authority, keeps track of the chain of custody of business cards when they are transferred or shared. The system stores the business card transfer information as a directed acyclic graph or a tree. This information can be used by the user profiling engine described earlier to build the user's profile. The complete record of where each business card came from, who transferred which business cards to whom, and where they were used to fill out information is stored by the system.

Sharing can be performed through an interface of the electronic wallet interface, by selecting a card and then selecting a contact from the user's contact list. This can be done in numerous ways such as right-clicking on the graphical representation of the card and then selecting the contact from a context menu, by dragging and dropping the graphical representation of a card onto a contact in the contact list, by dragging and dropping it onto a business card receptacle on a website, or by performing another user interface action such as clicking a button in the electronic wallet 7 when the user is standing near or connected to a real-world business card receptacle. These contacts can be other users or institutions. These user interface actions, or others of a similar nature and intent, then issue a command to the server to associate a newly-minted copy of the card with the receiver's account. If the receiver does not want the card, then he/she can reject the transfer, in which case a newly-minted copy of the card is not associated with the recipient's account.

Figure 26:
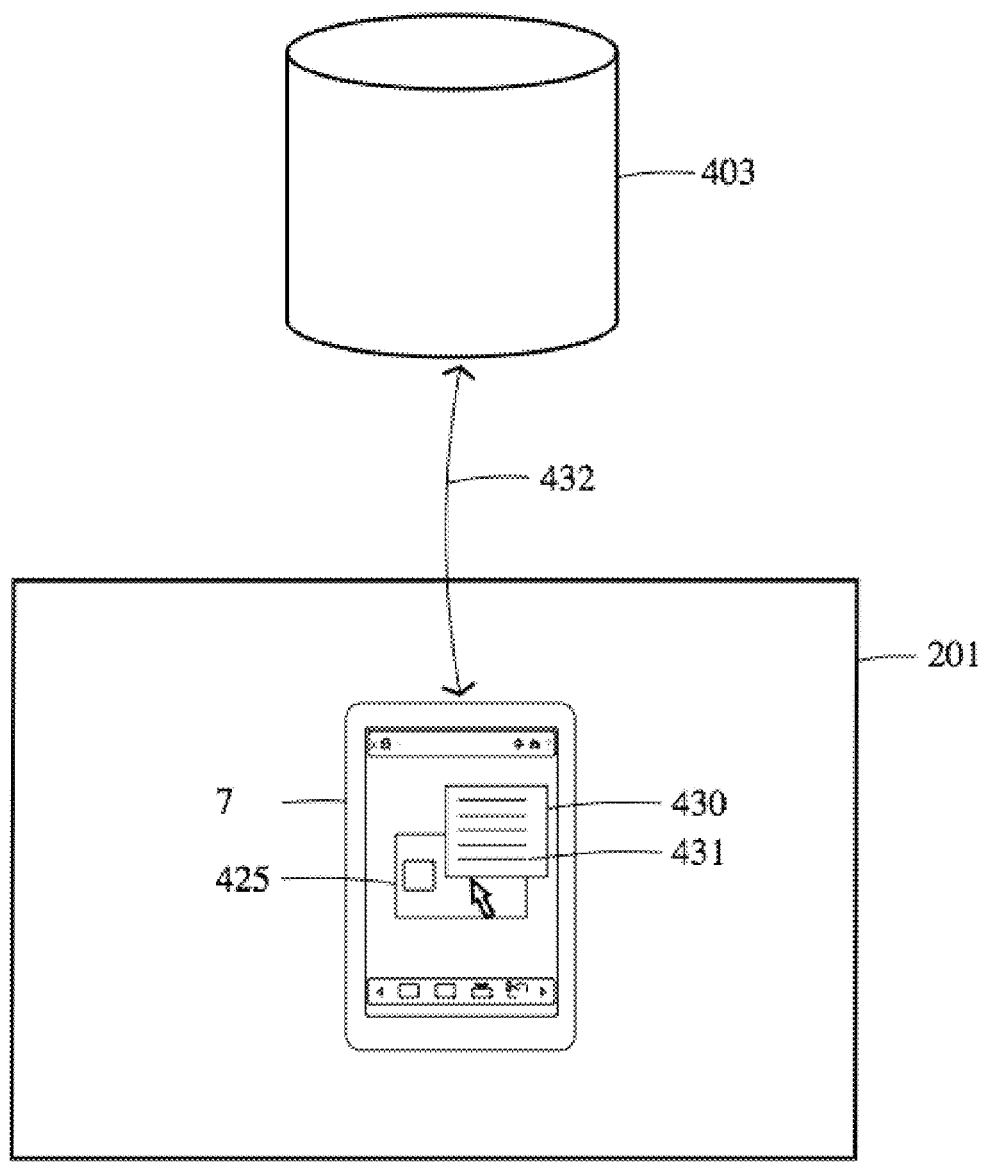
FIG. 26 illustrates an example embodiment of a process to share a business card with a contact in a user's social network.

FIG. 26 illustrates an example embodiment of a process to share a business card with a contact in a user's social network. The user selects a graphical representation of business card 425 which he wishes to share with a member of his social network. The user opens a context menu 430 containing a list of all of his social network contacts (for example by right-clicking on the graphical representation of business card 425) and selects a contact 431. This causes an instruction to be sent to business card authority 403 requesting that business card 425 be registered as a pending transfer from the user to the selected contact. If the business card authority 403 determines that the user has permission to share the card, a pending transfer is registered. If the transfer is accepted by the selected contact through an instruction form the selected contact's electronic wallet program (not shown), then business card authority 403 determines the business card definition of the business card associated with the transfer and if the user has authority to share the business card 425, the business card authority 403 mints a new instance of the business card from the associated definition and associates the new instance of the card with the account of the selected contact.

Similar techniques can be used to share cards with multiple contacts simultaneously. On a mobile phone, it is possible to put one's electronic wallet into card receiving mode as well as card sending mode, thereby allowing a user to rapidly transfer a card to everyone standing near the user whose phone-based electronic wallet 7 is in receiving mode. There could be an intermediate step which allows the user to remove any potential nearby recipients from the list of recipients before sending the sharing instructions. This would be useful in public where you may want to exclude strangers from receiving your data. As in the other case, when the shared card is accepted, the business card authority associates a new instance of the shared card with the recipient's account. Any card recipient could also choose not to accept the card, in which case no new copy of the shared card is associated with the recipient's account. Herein we have described the transfer in the manner in which it is perceived by the user. The actual transfer of business card information occurs at the business card authority as is noted elsewhere.

Business cards may also be revoked. The electronic wallet 7 can contain a user interface which displays which cards have been given to which other users and which companies and institutions. In this view, the user can revoke a card from a specific cardholder or a group of cardholders. Similarly, the user can even delete the card entirely, revoking the card from all of its holders. Once the card is revoked the former cardholders can no longer access the data via the system.

A user or business/institution may also choose to delete the cards it has received from other users or businesses/institutions. This either removes the association of the card with the remover's account or makes a note the association that does exist is no longer active. Some forms of identity such as government identification might not be deleteable.

Business card definitions are distinct from business card object instances. Business card definitions are created by users or businesses, whereas business card objects are the actual business card instances which can be used, transferred, and shared by users of the system. Business card definitions are associated with several pieces of information. For example, it may be associated with an identity of an entity that created the business card. Every business card is associated with the identity of its creator. This information is not necessarily even contained directly in the business card definition, but rather can be obtained by linking to the account which contains the business card definition. In addition, every business card contains the identity of its current holder. A business card can contain any arbitrary graphics such as portraits, logos, or paper types uploaded by its creator. These graphics can also be supplied by the creator's company. A business card can contain any number of managed data fields. Examples of some data fields are given below.

Another business card definition may be a business card's data fields and graphics contain layout data. This includes position, scaling, font, color, boldness, italics, and any other common formatting options. In addition, certain fields such as addresses can have several layout templates associated with them which can be selected from the users. These templates format the address so that it is on one line, several lines, and the like.

The business card is shareable. Business cards can be defined so that they are generally sharable or restricted. If a sharable business card is given to someone, they can pass it on to a third party without the owner's explicit permission. They can also be set so that a owner is notified and their permission must be given when transferring the business card to a third party. Finally, they can be restricted so that they cannot be shared by anyone who is not the owner. Shareability can be set at the time when the coupon is defined or edited, or embedded as a control on the coupon which is set when the owner shares it. Business cards can contain many different managed data fields, for example, Names, Nicknames, Job Titles, Street Addresses, E-Mail Addresses, Websites, Instant Messenger IDs, Social Network IDs, Managed Portraits, Corporate Logos, or Other Graphics, Custom-Defined Fields.

The disclosed configuration also includes business card instances bundled with other objects. For example, such a business card which may be associated with a receipt when a user makes a purchase at a store. This card may then be added to a user's address book in the electronic wallet and can be cross-referenced with coupons and receipts received from the vendor. Business cards may be associated with other forms of rich media as well, for example, if the store is a bricks and mortar store, then a map may be associated with the card which, on a location-aware device, may always tell the user how to get from their current location to the store either vocally or by displaying an interactive map. In one embodiment the map can be an instance of a custom type of digital object. Such business cards may be given out when a coupon is downloaded, allowing the user to efficiently find the location where the coupon can be redeemed.

Users or businesses/institutions may also choose to associate videos or audio or even computer games or 3D models with the cards they distribute and the cards can be interactive. A card may contain a puzzle which needs to be solved before the card issuer's information may be seen or used. A similar grammar to that described for coupons can be used to define complex identity card rules. The games and puzzles can be defined in a simple visual scripting language such as ADOBE FLASH, MIT's SCRATCH, or a specific programming language designed for the purpose. The outcomes of these games can be linked to the card logic defined by the grammar in order to make the card responsive to the games. Certain card receptacles can have limits on the types of logic permissible by the cards that can be shared through them, for example, it would not work well if a user shared a card which required the recipient to get out of a maze before the information would be visible with a company such as Sport Illustrated that intends to use the cards in an automated way to put addresses on magazines. However, such card might be very fun to share between friends.

Standard techniques can be used to import social network contacts from other social networks and instant messengers, as well as for creating contacts within the system. For example, the electronic wallet 7 can provide a simple interface for searching for known users and soliciting them for inclusion as a personal contact. Business cards allow for a much richer experience. A professional's business card can be tagged with their profession from a predefined list of tags, to which any user could add or request that new tags be added to it. If a user receives a business card from a professional, for example by downloading a realtor's business card from a business card access point enabled house-for-sale-sign, that realtor can be added to the user's social network as a special kind of contact defined by the tag, in this case a 'Realtor' tag. In this way a user's rolodex could contain a full list of all the professionals the user interacts with. In another example, when a user pays at the dentist, the dentist's business card may be associated with the receipt, giving the user a way to stay in touch with that dentist. The user's social network can then be searched not just for friends and family but for a much richer variety of economic and other relationships which a user may need to make use of at some later date. This data can be used by the user profiling engine when compiling a user's profile.

A point of note is that business cards being used to fill out online forms can be implemented without even involving business card receptacles managed by the system. Instead, a browser or other program can be configured to accept business card drags themselves directly in order to make the business card's data available to the browser or other program. A similar configuration can allow any of the digital objects in the system to behave this way, supplying their data directly.

Permissible Inter-Domain Communication

The data displayed on cards can originate at a third-party website. For example, instead of the identity information being stored on a server in the system, it can be stored in a user's social network site, account, e.g., FACEBOOK. Using an application programming interface (API) associated with this disclosure, FACEBOOK could allow the user to link this personal identification information from the user's FACEBOOK account into the user's business card. When the user shares the card, it now acts as a permission to download that data from FACEBOOK, and when the user updates the user address at the third-party website (in this case the user name, address, etc. in FACEBOOK), cardholders see the update the next time their card's data is refreshed.

There are many criteria which can cause the data refresh on the cardholder's system, such as an explicit command by the cardholder or by the system, or a time period after which data is considered stale and is refreshed, or any such obvious method. The data records themselves can be considered the managed aspects of the system and cards can be refreshed whenever a record they contain is updated.

Since users can share cards with organizations, the system described in this disclosure includes an API which the organizations can use in their servers to make use of the card permissions. A cardholder requests a piece of data, for example Sports Illustrated might request a user's address in order to send a magazine in the mail to the user's current address. The request could comprise a number of elements. In this example the identifier of the address field of the card which the user gave to Sport Illustrated. The system uses the identifier to check to make sure that Sports Illustrated is supposed to have access to the record by checking that the user has really given them a card which includes it. The system then checks to see which service is the provider of the record Sports Illustrated is requesting, in this case the address. If the system is the provider of the data, it just transmits the data to Sport Illustrated. If the record is provided by a third-party, the system either instructs the third-part to send the data to the cardholder directly, or gets the data itself and then transmits it back to the cardholder. The last case is the most private and can be used to increase the privacy of the data transaction. The system can check digitally signed data, log in information, and/or the requester's IP address to ensure that the system can only be accessed by valid cardholders.

Figure 22:
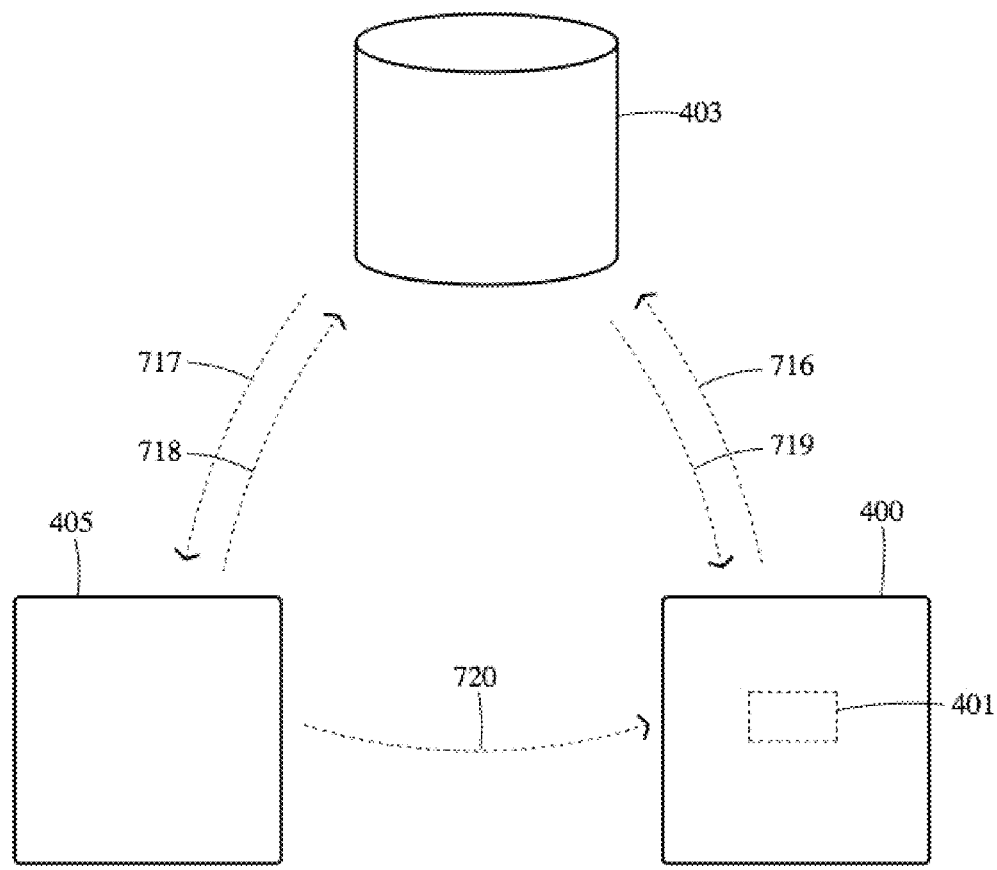
FIG. 22 illustrates one example embodiment of accessing identity data from a business card authority.

FIG. 22 illustrates one example embodiment of accessing identity data from a business card authority, which in this example is provided as reference 403. Business card holder 400 sends message 716 to business card authority 403 requesting one piece of current information associated with business card 401, of which business card holder 400 holds an instance which has been previously been received from business card 401's issuer through business card authority 403. Business card authority 403 checks its database to determine if business card holder 400 has permission by the issuer of business card 401 to access current information associated with that card. If permission is current, business card authority 403 checks its database for the source of the requested data. If the requested data is held by business card authority 403 itself, business card authority 403 retrieves the data and sends the data in message 719 to business card holder 400. If the requested data is not held by business card authority 403 but instead by a separate data source 405, then business card authority 403, sends message 717 to separate data source 405 requesting the data. Separate data source 405 authenticates business card authority's identity and determines whether business card authority 403 has permission to receive the requested data, and if so, sends message 718 to business card authority 403 with the requested data, and business card authority 403 forwards the data to business card holder 400.

Because the card issuer (not shown) has previously determined the permissions associated with business card 401, the business card authority 403 may determine that the data requested by business card holder 400 can be sent directly from separate data source 405 to business card holder 400 in message 720, instead of being sent to business card authority 406 to be forwarded to business card holder 400.

If business card holder 400 requires more than one piece of information associated with business card 401, each piece of information can be requested individually as described above. If different pieces of information requested are held by different separate data sources, business card authority 403 can make separate requests to each separate data source, and each request can be handled as described above.

Business card dispensers and receptacles are initialized in a manner similar to the other dispenser and receptacles disclosed herein.

Membership Card Management Processes

The configurations disclosed may also apply to a digital membership card subsystem. In such configurations, the membership card is represented in digital format as an integrated component so that they can be used to both log in to websites and also fulfill the traditional roles of membership cards in the real world.

Membership cards are digital objects in the electronic wallet 7 program. They have the same user interface as cash, credit, debit, and business cards and can be dragged to and from the electronic wallet 7. There are two roles in this configuration: membership card owners and membership card access point owners. Membership card owners are the users to whom instances membership card objects have been issued. The owner can use the membership card by dragging it into a membership card receptacle in order to log in to a web site, or gain physical access to a real world venue. Membership card access point owners are the people or businesses which specify membership card definitions. They are typically also the owners of the web sites or venues to which the membership cards that they issue grant access.

The membership card system beneficially the user's electronic wallet can contain membership cards which have a similar function to real world membership cards of this kind. The electronic membership cards found in a user's electronic wallet 7 graphically represent username and password data stored at the membership card authority. As such, this system acts as a universal login manager which stores user name and password data so that users don't have to. In addition, the electronic wallet 7 contains a convenient list of all membership cards which can be easily searched, allowing the user to browse all of the websites at which he/she is a member or to quickly find a desired card. The membership cards also speed up the login process considerably. Even if the user could remember the user user names and passwords, typing them out requires considerably more time and effort than dragging and dropping a membership card. The electronic wallet 7 makes it easy to quickly create an account and receive a membership card by dragging and dropping a business card in order to fill out the text fields required by account creation. The membership card system is capable of handling login and membership functionality both online and in the real-world in one unified system, thereby solving this problem. The membership cards can be limited to a fixed number of uses, which, when put in conjunction with mobile membership card receptacles provides a feasible means of electronic ticket management.

Figure 38:
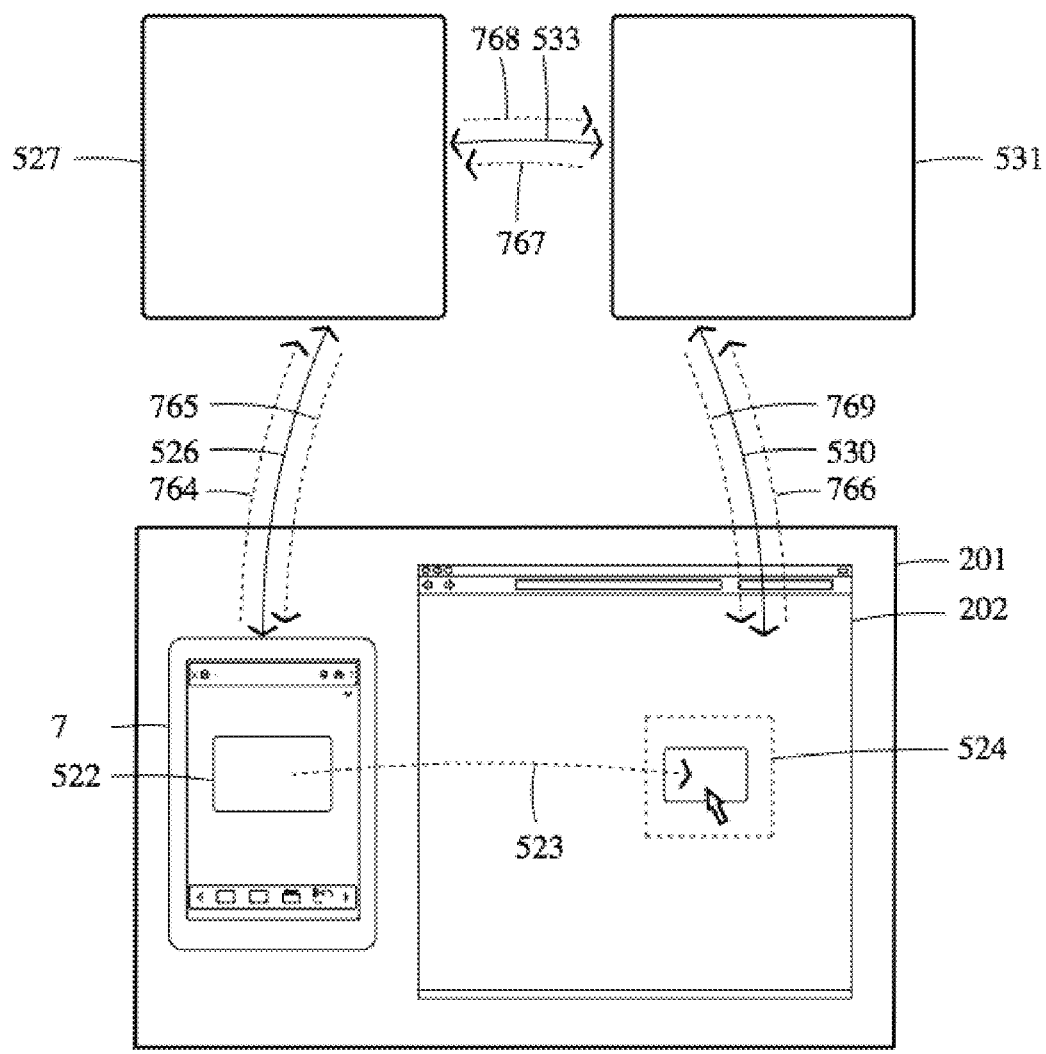
FIG. 38 illustrates an example embodiment of a configuration for using an electronic membership card to log in to a third-party website.

FIG. 38 illustrates an example embodiment of a configuration for using an electronic membership card to log in to a third-party website. The user selects the graphical representation of membership card 522 displayed in the electronic wallet 7 and moves it with drag 523, and drops it on membership receptacle 524, which sends an operating system message (not shown) back to the electronic wallet 7 confirming the drag. Electronic wallet 7 then sends message 764 across communication channel 526 to membership authority 527 including the identifier of the dragged membership card and instructing the system to create a new login transaction. Membership authority 527 then registers a new pending login transaction, generates a transaction identifier, associates the identifier of the dragged membership card with the pending transaction, and returns the transaction identifier to electronic wallet 7 in message 765 over communication channel 526.

Electronic wallet 7 then sends the transaction identifier in an operating system message (not shown) to membership receptacle 524 which then sends message 766 over communication channel 530 to website 531. Website 531 sends the transaction identifier and its own website identifier in message 767 over communication channel 533 to membership authority 527. Membership authority 527 then finds the pending transaction associated with the transaction identifier, confirms that website 531 is correctly associated with the membership card definition of the membership card 522 associated with the login transaction, and returns message 768 over communication channel 533 to website 531. This message contains the true log in information associated with membership card 522. When website 531 has performed its own internal steps to verify that the log in information is for an actual account on the website 531's system, website 531 then logs membership card owner in and responds to message 769 with a message causing the user's web browser to display the appropriate webpage.

The components of a membership card configuration include a membership card authority: The membership card authority may be integrated with a payment process. It has one or more servers that is/are responsible for storing and manipulating all of the information pertaining to membership cards, including accounts, membership card definitions used to create membership cards, which membership cards are unclaimed, which users own which membership cards, which membership card dispensers contain which membership cards, etc.

Another component is a membership card editor. The website defines a membership card definition which the system then uses to mint membership cards for the website's account holders as the system is requested to do. Like other digital objects in the system, the system provides an editor to set membership card definitions using a grammar similar to the ones previously described, either as a standalone program or some sort of web-based tool, which a website owner or the user representative can use to produce the graphical representation of membership cards that can be used to log into the user website. The editor can allow the website to associate graphics with the cards and allow the website to define other visual aspects of the card definition, for example whether or not to display the user's name, which colors and fonts to use in the display, where to display it on the card's surface, and even the card's shape. The editor can also be used to define other characteristics of a membership card, such as expiry date or how many times it can be used. This can be useful at venues such as sports clubs in the case where a user buys a season pass or a pack of ten 'entrances'. Alternatively, a ticket to a movie, play, concert, or show can be viewed as a one-time use membership card. As another example, a membership card definition may be as simple as just the graphic and the information defining a user name, a password, and the identity of the website to which it gains access. These are only meant to be examples and should not be construed as limiting; clearly there are many simple variations of graphical and logical elements which the website can define.

The same website could define many different membership card definitions for different purposes. For example, users with a paid subscription to a website which offers more services could be presented with a card of one type and appearance while users with a free account could be presented with another type of card. The website could also choose to change the look of a set of membership cards minted from a specified membership card definition, either permanently or temporarily. For example, on Valentine's Day a website's free members could have a heart graphic added to their cards, or during the Christmas Season, the cards could look snowy, etc. Similarly, if the website's general look and feel changes, the cards could be altered permanently to reflect this change. This can be done by using the editor to modify a membership card definition associated with the account logged into by the editor. When the modified definition is saved, a message can be associated with the user accounts in the system of all the users who hold a membership card minted from that definition. Those users' electronic wallets could update the graphics of those membership cards immediately upon receiving the message, or if they are not logged in at the moment when the message is generated, then the update can occur next time the user logs into the electronic wallet 7. The user can be presented with an explicit message telling him/her that the membership card graphic has been updated, so that they are not surprised or confused by the change, and can also be presented with the option to retain the old graphics, if they prefer.

Still another component is a membership card access point. The system contains two different types of membership card access points. The first is an access point for hosting a membership card dispenser, and the second is an access point for hosting a membership card receptacle. A single access point can also play both of these roles. The behavior of membership card dispenser access points can be defined very simply by using the business card access point management program.

Membership card access points of both types can be located online or in public. For example, a website can contain a membership card dispenser access point as well as a receptacle access point on its web page. Similarly, a gym, movie theatre, sports stadium, or concert hall might contain a membership card dispenser access point at the box office, and a receptacle point nearby, at the entrance.

Yet another component are membership card dispensers. Membership card dispensers are similar to the dispensers for the other objects in the system. They are the programs associated with membership card dispenser access points which issue the membership cards that a user can download into the user account using the electronic wallet 7 program. When accessing the system using a device containing a sufficiently large screen, membership card dispensers are displayed external to the electronic wallet 7 program and can take the form of widgets, applets, or other programs, and can also exist in web pages or other programs. Similarly, if the user accessed the system using a device containing a smaller screen, such as is found on a typical smart phone, the membership card dispenser is shown within the mobile electronic wallet 7 program.

Another component is a membership card receptacle. Similar to the receptacles of the other objects in the system, membership card receptacles are the programs associated with membership card receptacle access points both online and in the real world which allow the user to drag and drop membership cards onto them in order to log in to a website or gain entrance to a gym, club, show, concert, etc.

The next component is a membership card access point management program. The membership card access point management program is a web-based or standalone program which allows the owner of the access point to define the behavior of both membership card dispenser and receptacle access points using a grammar specifically designed for this purpose. For example, it can be used to define whether the membership cards have a price associated with them, and if so, to integrate the dispenser with a payment receptacle to be used by the payment system so that the user can pay for the membership card using the electronic wallet 7 program or mobile electronic wallet 7 program. It can also define whether a membership card dispenser should add additional user-specific data onto a membership card, which is useful in cases such as when the membership card is a ticket and the owner requires additional information such as a seat number which is different from that of all other tickets. These examples should not be construed as limiting.

There is also a membership card tracking subsystem. A subsystem of the membership card authority, the membership card tracking subsystem keeps track of where the membership card originated, a log of when it was used, whether the membership status has changed or expired, etc. The user can also delete a membership card from the user account which removes the graphical representation thereof from the user's electronic wallet 7 and also either removes the association of the card with the user's account or marks that the association which does exist as being inactive. This may or may not cause the website to be notified of the removal. The website can also revoke a membership card from a user. This may remove the association of the card from the user's account or may marks that the association that does exist has been revoked. This may cause the user to be notified explicitly, or may cause the card simply to disappear from the electronic wallet 7. Information from the membership card tracking subsystem can be used by the user profiling engine described earlier when compiling a user's profile.

As with financial account numbers, the username and password associated with membership cards and stored at the server do not have to be the same as the username and password a user knows and generally has to remember today. Rather, they can be abstracted away and can be a very long random string which the website can match to its accounts when the login request comes from the system, in a manner similar to that used for the financial accounts described in above. In fact, even if a malicious person is able to determine the password on a membership card, he/she can't use it.

The website issuing a membership card must inform the membership card authority that a particular user should be given an instance of a particular membership card definition. In one particular embodiment, the website issuing the card embeds an 'Issue Card' button in the site at a location which is aware of the user's identity on that site. The button is passed information identifying both the site and the user identity on that site. When the user clicks the 'Issue Card' Button, the website contacts the membership card authority and instructs it to mint a new card from a specified membership card definition which is associated with that site, and associate a specified username and password with the newly-minted card. The 'Issue Card' button can be a piece of the membership card authority which can securely communicate with the user's electronic wallet 7 running on the local machine. If no electronic wallet 7 is running, or the electronic wallet 7 is not logged in, the button can instruct the user to start the electronic wallet and log in. Once the electronic wallet 7 is logged in, the 'Issue Card' button can communicate with the user's electronic wallet 7 to identify the user, or to identify the newly-minted card to the electronic wallet. In the first case, the user's identity can be sent to the membership card authority by the button which can associate the user's identity with the new card. In the second case, the newly-minted, unclaimed card's identity can be transmitted by the electronic wallet 7 to the membership card authority which can be instructed to associate it with the electronic wallet 7 user's account.

Security measures can be taken to ensure that one site cannot instruct the membership card authority to mint membership cards for another site. The most obvious way to do this is to only allow message that are coming from the website to contain the instructions required to mint cards for that sites explicitly affiliated in a specific membership sharing manner to that site in the membership card authority. Messages from all other sources that try to mint a card in a site's name are ignored. As discussed earlier, there are many known ways to ensure that the end points of a communication are who they are supposed to be. Such measures can be employed for all digital objects. Also, the 'Issue Card' button, which sends a message back to the website to start the minting process may contain a code that is only meaningful to that website's server because it is associated with a session variable, so that the code embedding the button in the user's browser page cannot just be cut and pasted into another page. The code can be an identifier to more meaningful data in the session variables. The user's session ID at the website can be used as this code.

In another embodiment, instead of just associating the card with the user's account automatically, the button could open a membership d dispenser, embedded in the same website. The download control could display a graphical representation of the card which was minted for the user. The user can then drag and drop that image to the electronic wallet 7 which could then transfer the newly-minted card's identifier to the electronic wallet 7 which could prompt the association of the card with the user's account.

In order to use a membership card to log in, the user simply drags and drops the membership card from the user electronic wallet 7 program onto a login receptacle that is embedded in the website. Upon a successful drop the user is logged into the website using the username and password that is associated with the membership card in the membership card authority's server.

There are many ways in which the data can be transferred from the system to the website. The simplest is when the membership card is dragged and dropped into the receptacle, the login information is transmitted to the receptacle via the clipboard or by some other means. This is the simplest pattern, but has security limitations.

A more complex arrangement allows the drag to transfer the membership card's identifier to the receptacle. The receptacle conveys the identifier to the website which then transmits it to the membership card authority which uses it to look up the login data and return it to the website which then logs the user in. If this operation is successful, the receptacle can cause the page to redirect to reflect the log in. For security, the system can only let the specific website which issued the membership card instance, or is a specific kind of affiliate of the website defined in the membership card definition associated with the instance, download the login data. This can be done by checking the membership card's definition's owner and comparing it to the identity of the website making the request. This is a superior method to the previous one, but still requires the user to give the identity of a digital object that the user controls to a third-party, which might not be considered totally secure.

Yet another option is for the drag operation to prompt the start of a login transaction associated with the user's membership card. The transaction identifier can then be returned to the electronic wallet 7 and conveyed to the receptacle, which in turn conveys it to the website. This transaction identifier can then be used to lookup the log in data associated with the membership card using the same security precautions described in the previous version. This version of events is superior to the last in that the only data that is transmitted is a one-time use transaction identifier which becomes meaningless after it is used, or even after some other type of event such as a timer running out.

Membership cards can also be issued by real-world business/institutions for use in a mobile electronic wallet 7 for the purpose of logging into physical locations, like a fitness club or the library, student-sponsored event, etc. The process is similar to the online version except that the login information/membership card identifier/login transaction identifier is conveyed wirelessly to a terminal running a special login program which admits the user. In one embodiment, the program is a short-range transmitter access point but may also be any other type of access point coupled with some means to inform the locale of the login transaction's outcome.

Tickets are another type of object that can be stored in the electronic wallet 7 and used graphically. Tickets are similar to membership cards in that they can be used to admit a user into some sort of function, though they have more limited conditions and also can have other metadata associated with them such as seat numbers, performance time and date, a map of the function leading the user to the seat, or even an electronic program for an event like an opera, or anything which can normally be thought of as being associated with tickets in the offline world. Tickets can also be associated with contacts, if the contact is specified as attending the function with the user. In addition, tickets can be transferred, though not necessarily duplicated like a business card. In one embodiment, the ticket is transferred from the sender's account to the recipient's by changing the ticket's ownership in the membership card authority's database.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, relational databases, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure herein. This description should be read to include one or at least one and the singular also includes the plural unless it is obvious that it is meant otherwise.

Upon reading this disclosure, those of skill in the art will appreciate still additional alternative structural and functional designs for a system and a process for transaction processing system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method to add digital objects to electronic wallets on user computing devices, comprising:
   interacting with an access point associated with a digital object by a user computing device, the user computing device receiving an input of a query, obtaining an access point identifier and obtaining a dispenser executable by the user computing device to dispense the digital object to an electronic wallet, wherein the dispenser comprises a type of dispenser associated with an object type of the digital object, the access point selecting the type of dispenser from a plurality of types of dispensers available based on the input of the query received from the user computing device;
   transmitting, by the user computing device, the access point identifier and the query to a transaction authority;
   receiving, via execution of the dispenser by the user computing device, the digital object from the transaction authority, the digital object associated with the access point and based on the access point identifier, and the digital object executable by the user computing device to interact with the user through customized functional behavior defined by an owner of the access point;
   receiving, by the user computing device, input to the dispenser indicating an instruction to add the digital object to the electronic wallet;
   adding, via execution of the dispenser by the user computing device, the digital object to the electronic wallet in response to receiving the input to the dispenser; and
   executing, by the user computing device, the customized functional behavior of the digital object.

2. The computer-implemented method of claim 1, wherein receiving the input to the dispenser comprises:
   displaying, via execution of within the dispenser by the user computing device, the digital object received from the transaction authority on a display of the user computing device; and
   receiving, by the user computing device, an input selecting the displayed digital object from the dispenser to add the digital object to the electronic wallet.

3. The computer-implemented method of claim 1, wherein the input to the dispenser comprises dragging and dropping the displayed digital object from a first location on a screen of the user computing device corresponding to a location of the dispenser to a second location on the screen of the user computing device corresponding to a location of the electronic wallet.

4. The computer-implemented method of claim 1, further comprising providing, by the user computing device, an indication to the transaction authority to store the digital object in an account that is associated with the user at a location that is remote from the user computing device.

5. The computer-implemented method of claim 1, wherein the digital object comprises an instance of a credit card digital object, the instance of the credit card digital object associated a name of a card holder, an account number associated with the credit card digital object, and expiry data associated with the credit card digital object.

6. The computer-implemented method of claim 1, wherein the digital object comprises an instance of a coupon digital object, the instance of the coupon digital object associated with at least a coupon identifier and the access point.

7. The computer-implemented method of claim 6, wherein the instance of the coupon digital object is further associated with a value of the coupon digital object, a claim status, expiry data, and terms and conditions of the coupon digital object.

8. The computer-implemented method of claim 1, wherein the digital object comprises an instance of a business card digital object that specifies information about an entity.

9. The computer-implemented method of claim 1, wherein the digital object comprises an instance of a membership card digital object, the instance associated with an identifier of the instance of the membership card digital object.

10. The computer-implemented method of claim 1, wherein the access point comprises a short-range transmitter access point.

11. The computer-implemented method of claim 10, wherein interacting with the access point comprises wirelessly connecting to the short-range transmitter access point using short-range wireless communication, the short-range transmitter access point coupled to a physical object.

12. The computer-implemented method of claim 1, wherein the access point comprises a geographical area access point that is associated with a predefined geographical area.

13. The computer-implemented method of claim 12, wherein interacting with the access point further comprises identifying, by the user ting device, a physical location of the user computing device, wherein the physical location is transmitted to the transaction authority by the user computing device to identify the access point identifier associated with the physical location.

14. The computer-implemented method of claim 1, wherein the access point comprises a manual code input access point.

15. The computer-implemented method of claim 14, wherein interacting with the access point comprises receiving, by the user computing device, input comprising the access point identifier visually indicated by the manual code input access point, wherein the access point identifier is transmitted to the transaction authority by the user computing device.

16. The computer-implemented method of claim 15, wherein receiving the user-input comprises receiving an image including the access point identifier.

17. The computer-implemented method of claim 15, wherein receiving the but comprises:
   receiving, by the user computing device, an audio signal of the user's voice speaking the access point identifier; and
   translating, by the user computing device, the audio signal to identify the access point identifier in the audio signal.

18. The computer-implemented method of claim 16, wherein the image comprises a barcode and the user computing device interprets the barcode to identify the access point identifier.

19. The computer-implemented method of claim 1, wherein the digital object represents a physical object found in a physical wallet.

20. The computer-implemented method of claim 1, wherein the digital object comprises a multi-part coupon digital object that includes a plurality of coupon digital objects, the multi-part coupon digital object formed from a combination of the plurality of coupon digital objects.

21. The computer-implemented method of claim 20, further comprising receiving, by the user computing device, each of the plurality of coupon digital objects incrementally over time from the transaction authority.

22. The computer-implemented method of claim 20, further comprising receiving, by the user computing device, the plurality of coupon digital objects from the transaction authority, each of the plurality of coupon digital objects received responsive to interaction with a distinct access point.

23. A system for adding digital objects to electronic wallets on user computing devices, comprising:
- a storage device; and
- a processor communicatively coupled to the storage device, wherein the processor executes application code instructions that are stored in the storage device to cause the system to:
  - interact with an access point associated with a digital object by a user computing device, the user computing device receiving an input of a query and obtaining an access point identifier and a dispenser executable by the user computing device to dispense the digital object to an electronic wallet, wherein the dispenser comprises a type of dispenser associated with an object type of the digital object, the access point selecting the type of dispenser from a plurality of types of dispensers available based on the query received from the user computing device;
  - transmit the access point identifier and the query to a transaction authority;
  - receive, via execution of the dispenser, the digital object from the transaction authority, the digital object associated with the access point and based on the access point identifier and the digital object executable by the user computing device to interact with the user through customized functional behavior defined by an owner of the access point;
  - receive input to the dispenser indicating an instruction to add the digital object to the electronic wallet;
  - add, via execution of the dispenser, the digital object to the electronic wallet in response to receiving the user-input to the dispenser; and
  - execute the customized functional behavior of the digital object.

24. The system of claim of claim 23, wherein receiving the input to the dispenser comprises:
- displaying, via execution of within the dispenser, the digital object received from the transaction authority on a display of the user computing device; and
- receiving user input selecting the displayed digital object from the dispenser to add the digital object to the electronic wallet.

25. A computer program product, comprising:
- a non-transitory computer-readable medium having computer-readable program instructions embodied therein that when executed by a computer cause the computer to add digital objects to electronic wallets on user computing devices, the computer-readable program instructions comprising:
  - computer-readable program instructions to interact with an access point associated with a digital object by a user computing device, the user computing device receiving an input of a query and obtaining an access point identifier and a dispenser executable by the user computing device to dispense the digital object to an electronic wallet, wherein the dispenser comprises a type of dispenser associated with an object type of the digital object, the access point selecting the type of dispenser from a plurality of types of dispensers available based on the query received from the user computing device;
  - computer-readable program instructions to transmit the access point identifier and the query to a transaction authority;
  - computer-readable program instructions to receive, via execution of the dispenser by the user computing device, the digital object from the transaction authority, the digital object associated with the access point and based on the access point identifier, and the digital object executable by the user computing device to interact with the user through customized functional behavior defined by an owner of the access point;
  - computer-readable program instructions to receive input to the dispenser indicating an instruction to add the digital object to the electronic wallet;
  - computer-readable program instructions to add via execution of the dispenser, the digital object to the electronic wallet in response to receiving the input to the dispenser; and
  - computer-readable program instructions to execute the customized functional behavior of the digital object.

26. The computer program product of claim 25, further comprising computer-readable program instructions to receive, via execution of the dispenser, the access point identifier from the access point.

27. The computer program product of claim 25, wherein receiving the user input comprises:
- computer-readable program instructions to display, within the dispenser, the digital object received from the transaction authority on a display of the computing device; and
- computer-readable program instructions to receive user input selecting the displayed digital object from the dispenser to add the digital object to the electronic wallet.

28. The computer-implemented method of claim 1, wherein transmitting, the access point identifier to the transaction authority comprises:
- identifying, by the user computing device via execution of the dispenser, contextual information associated with the user that is stored on the user computing device; and
- transmitting, by the user computing device via execution of the dispenser, the contextual information and the access point identifier to the transaction authority.

29. The computer-implemented method of claim 28, wherein the digital object received from the transaction authority is selected by the transaction authority based at least in part on the contextual information identified by the dispenser.

30. The system of claim of claim 23, wherein the access point comprises a geographical area access point that is associated with a predefined geographical area, and wherein interacting with the access point further comprises identifying a physical location of the user computing device, wherein the physical location is transmitted to the transaction authority by the user computing device to identify the access point identifier associated with the physical location.

31. The system of claim of claim 23, wherein the access point comprises a manual code input access point, and wherein interacting with the access point comprises receiving input comprising the access point identifier visually indicated by the manual code input access point, wherein the access point identifier is transmitted to the transaction authority by the user computing device.

32. The system of claim of claim 31, wherein receiving the input comprises receiving an image including the access point identifier.

33. The system of claim of claim 32, wherein the image comprises a barcode and the user computing device interprets the barcode to identify the access point identifier.

34. The system of claim of claim 31, wherein receiving the input comprises:

receiving an audio signal of the user's voice speaking the access point identifier; and translating the audio signal to identify the access point identifier in the audio signal.

35. The computer program product of claim 25, wherein the access point comprises a geographical area access point that is associated with a predefined geographical area, and wherein interacting with the access point further comprises computer-readable program instructions to identify a physical location of the user computing device, wherein the physical location is transmitted to the transaction authority by the user computing device to identify the access point identifier associated with the physical location.

36. The computer program product of claim 25, wherein the access point comprises a manual code input access point, and wherein interacting with the access point comprises computer-readable program instructions to receive input comprising the access point identifier visually indicated by the manual code input access point, wherein the access point identifier is transmitted to the transaction authority by the user computing device.

37. The computer program product of claim 36, wherein receiving the input comprises computer-readable program instructions to receive an image including the access point identifier.

38. The computer program product of claim 37, wherein the image comprises a barcode and the user computing device interprets the barcode to identify the access point identifier.

39. The computer program product of claim 36, wherein receiving the input comprises:

computer-readable program instructions to receive an audio signal of the user's voice speaking the access point identifier; and computer-readable program instructions to translate the audio signal to identify the access point identifier in the audio signal.

* * * * *

UNITED STATES PATENT AND TRADEMARK OFFICE
CERTIFICATE OF CORRECTION

PATENT NO. : 9,361,606 B2  
APPLICATION NO. : 13/032422  
DATED : June 7, 2016  
INVENTOR(S) : Philipp Frank Hermann Udo Hertel et al.

Page 1 of 1

It is certified that error appears in the above-identified patent and that said Letters Patent is hereby corrected as shown below:

In the Claims:

Column 94, Claim 13, Line 25 should read "--identifying, by the user computing device, a physical location of the--"

Column 95, Claim 23, Line 27 should read "--point identifier, and the digital object executable by the--"

Column 95, Claim 23, Line 34 should read "--the electronic wallet in response to receiving the input--"

Signed and Sealed this  
Twenty-third Day of August, 2016

Michelle K. Lee  
*Director of the United States Patent and Trademark Office*